(12) United States Patent
Watanabe et al.

(10) Patent No.: US 8,473,260 B2
(45) Date of Patent: Jun. 25, 2013

(54) MODEL CREATION SUPPORT SYSTEM, MODEL CREATION SUPPORT METHOD, AND MODEL CREATION SUPPORT PROGRAM

(75) Inventors: Satoru Watanabe, Kawasaki (JP); Yasuhide Matsumoto, Kawasaki (JP); Masashi Uyama, Kawasaki (JP); Masatomo Yasaki, Kawasaki (JP); Youji Kohda, Kawasaki (JP); Mitsuru Oda, Kawasaki (JP); Hiroki Ichiki, Kawasaki (JP); Madoka Mitsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 736 days.

(21) Appl. No.: 12/187,695

(22) Filed: Aug. 7, 2008

(65) Prior Publication Data

US 2009/0089023 A1   Apr. 2, 2009

(30) Foreign Application Priority Data

Sep. 27, 2007   (JP) ................. 2007-251667

(51) Int. Cl.
*G06F 7/60* (2006.01)
*G06F 17/10* (2006.01)

(52) U.S. Cl.
USPC .......................................................... 703/2

(58) Field of Classification Search
USPC .......................................................... 703/2
See application file for complete search history.

(56) References Cited

U.S. PATENT DOCUMENTS

| 2006/0025925 A1 | 2/2006 | Fushiki et al. |
| 2008/0103853 A1 | 5/2008 | Watanabe et al. |

FOREIGN PATENT DOCUMENTS

| JP | 7-93284 A | 4/1995 |
| JP | 9-95917 | 4/1997 |
| JP | 2000-270473 | 9/2000 |
| JP | 2001-22729 | 1/2001 |
| JP | 2006-120131 A | 5/2006 |
| JP | 2007-140965 A | 6/2007 |
| WO | WO 2006056024 A1 * | 6/2006 |

OTHER PUBLICATIONS

Otsubo, Goro et al., Information Recommendations Faced IEICE SIG Notes, WI2-2007-06 section 2.1-2.3 Mar. 23, 2007, pp. 31-36.
Resnick, Paul et al., "Recommender systems", Communications of the ACM, URL: http://portal.acm.org/citation Mar. 1997, 56-58.

* cited by examiner

*Primary Examiner* — Saif Alhija
(74) *Attorney, Agent, or Firm* — Fujitsu Patent Center

(57) ABSTRACT

A model creation support system includes a model managing part that acquires and accumulates an identifier of a model, data indicating a phenomenon, data indicating a regression equation, and evaluation data from an information processing apparatus that predicts or analyzes the phenomenon, using a model represented by the regression equation, a factor value extracting part that generates and records factor value data indicating the degree to which the factor contributes to the model from the accumulated data, and a model proposing part that refers to the factor value data based on a request for supporting model creation and model condition data received from the information processing apparatus, thereby generating and outputting support data containing a factor capable of contributing to the model to the information processing apparatus. Thus, information on factors of the model can be accumulated and utilized for enhancement of the fitting degree of the model.

13 Claims, 41 Drawing Sheets

A1

| Instance ID | 11256 |
|---|---|
| Phenomenon | Heating efficiency of Store A |
| Objective variable ID | m-005 |
| Explanatory variable ID | s-001,s-003.s-005,s-007 |
| Model | Y=f (X11,X12,X15,X19) |
| Analysis application period | 2003~2006 |
| Prediction application period | 2007 |
| Fitting degree of analyze- estimation | 0.64 |
| Fitting degree of prediction result | — |
| Significance of each factor | 0.30, 0.22, 0.24, 0.18 |

A2

| Instance ID | 56452 |
|---|---|
| Phenomenon | Number of system troubles in S branch of A credit association |
| Objective variable ID | m-002 |
| Explanatory variable ID | s-002,s-003.s-004,s-011 |
| Model | Y=f (X11,X12,X15,X19) |
| Analysis application period | 2004~2005 |
| Prediction application period | 2006 |
| Fitting degree of analyze- estimation | 0.68 |
| Fitting degree of prediction result | 0.34 |
| Significance of each factor | 0.24, 0.21, 0.44, 0.15 |

| Objective variable ID | m-005 |
|---|---|
| Phenomenon | Heating efficiency of Store A |
| Place of phenomenon | Store A |
| Kind of phenomenon | Store heating efficiency |
| Category (region) | A prefecture A village |
| Category (field) | Retail |
| Category (institution) | — |

B2

| Objective variable ID | m-002 |
|---|---|
| Phenomenon | Number of system troubles in S branch of A credit association |
| Place of phenomenon | S branch of S credit association |
| Kind of phenomenon | Number of system troubles in credit association |
| Category (region) | A prefecture |
| Category (field) | Finance |
| Category (institution) | A credit association |

FIG. 3

| | | C1 |
|---|---|---|
| Explanatory variable ID | s-001 | |
| Factor name | Beginning of next week | |
| Coordinate space | One year = 365 days | |
| | | |
| | | |
| | | |

| | | C2 |
|---|---|---|
| Explanatory variable ID | s-002 | |
| Factor name | Friday | |
| Coordinate space | One year = 365 days | |
| | | |
| | | |
| | | |

C100

| | Monday | Tuesday | Wednesday | Holiday/ Substitute holiday | Beginning of midwinter | Month days with a multiple of five of a month | January | ... |
|---|---|---|---|---|---|---|---|---|
| January 1 | 0 | 0 | 0 | 1 | 0 | 0 | 1 | ... |
| January 2 | 1 | 0 | 0 | 0 | 0 | 0 | 1 | ... |
| January 3 | 0 | 1 | 0 | 0 | 0 | 0 | 1 | ... |
| January 4 | 0 | 0 | 1 | 0 | 0 | 0 | 1 | ... |
| January 5 | 0 | 0 | 0 | 0 | 1 | 1 | 1 | ... |
| January 6 | 0 | 0 | 0 | 0 | 0 | 0 | 1 | ... |
| January 7 | 0 | 0 | 0 | 0 | 0 | 0 | 1 | ... |
| January 8 | 0 | 0 | 0 | 0 | 0 | 0 | 1 | ... |
| January 9 | 1 | 0 | 0 | 1 | 0 | 0 | 1 | ... |
| January 10 | 0 | 1 | 0 | 0 | 0 | 1 | 1 | ... |
| January 11 | 0 | 0 | 1 | 0 | 0 | 0 | 1 | ... |
| January 12 | 0 | 0 | 0 | 0 | 0 | 0 | 1 | ... |
| January 13 | 0 | 0 | 0 | 0 | 0 | 0 | 1 | ... |
| January 14 | 0 | 0 | 0 | 0 | 0 | 0 | 1 | ... |
| January 15 | 0 | 0 | 0 | 0 | 0 | 0 | 1 | ... |
| ... | ... | ... | ... | ... | ... | ... | ... | ... |
| December 31 | 0 | 0 | 0 | 0 | 0 | 0 | 0 | ... |

| Contribution factor (Explanatory variable ID) | Late June to mid-July |
|---|---|
| Attribute | Enhancement of precision (Factor change) |
| Objective variable ID | m-002 |
| Category (Field) | Finance |
| Model before change | 10003 |
| Model after change | 10001 |
| Analysis application period | 2007/1~3 |
| Enhancement performance | 0.11 |

D2

| Contribution factor (Explanatory variable ID) | Rainy season (s-021) |
|---|---|
| Attribute | Enhancement of precision (Application period change) |
| Objective variable ID | m-002 |
| Category (Field) | Finance |
| Application period before change | 2005 |
| Application period after change | 2006 |
| Model after change | 43002 |
| Kind of application period | Prediction application period |
| Enhancement performance | -0.07 |

D3

| Contribution factor (Explanatory variable ID) | Autumnal equinox weekend species, autumnal equinox Saturday species, autumnal equinox Sunday species (s-031, s-101, s-017) |
|---|---|
| Attribute | Long-term stability |
| Objective variable ID | m-006 |
| Category (Field) | Retail |
| Typical model | 30001 |
| Applicable period | 2000~2004 |
| Average fitting degree | 0.78 |
| Average t value of each contribution factor | 4.3, 6.2, 3.9 |

D4

| Contribution factor (Explanatory variable ID) | Autumnal equinox weekend species, autumnal equinox Saturday species (s-031, s-101) |
|---|---|
| Attribute | Commonness |
| Objective variable ID | m-006, m-042, m-046 |
| Category (Field) | Private management |
| Typical model | 40011 |
| Number of adopted spots | 351 |
| Field adoption ranking | First place |
| Average fitting degree | 0.74 |

FIG. 5

M1:
$$Y = b_0 \times X_0 + b_1 \times X_1 + b_2 \times X_2 + b_3 \times X_3$$

| | Weight Constant term | Weight Beginning of next week | Weight Rainy season | Weight Wednesday, Thursday, Friday in winter |
|---|---|---|---|---|
| Number of system troubles in credit association | (+2.2) | (+2.8) | (+1.8) | (+8.3) |

Analysis application period = 2004

Fitting degree of analyze-estimation = 0.64

M2:
$$Y = b_0 \times X_0 + b_1 \times X_1 + b_2 \times X_2 + b_3 \times X_3$$

| | Weight Constant term | Weight Beginning of next week | Weight Late June to mid-July | Weight Wednesday, Thursday, Friday in winter |
|---|---|---|---|---|
| Number of system troubles in credit association | (+2.0) | (+2.9) | (+13.2) | (+8.2) |

Analysis application period = 2004

Fitting degree of analyze-estimation = 0.75

$Y = b_0 \times X_0 + b_1 \times X_1 + b_2 \times X_2 + b_3 \times X_3$

- $b_0$: Weight, $X_0$: Constant term (Fitting degree by addition 0.30)
- $b_1$: Weight, $X_1$: Beginning of next week (Fitting degree by addition 0.22)
- $b_2$: Weight, $X_2$: Rainy season (Fitting degree by addition 0.24)
- $b_3$: Weight, $X_3$: Wednesday, Thursday, Friday in winter (Fitting degree by addition 0.18)

Y = Number of system troubles in credit association
Prediction application period = 2005
Fitting degree of prediction result = 0.65

M4:

$Y = b_0 \times X_0 + b_1 \times X_1 + b_2 \times X_2 + b_3 \times X_3$

- $b_0$: Weight, $X_0$: Constant term (Fitting degree by addition 0.23)
- $b_1$: Weight, $X_1$: Beginning of next week (Fitting degree by addition 0.20)
- $b_2$: Weight, $X_2$: Late June to mid-July (Fitting degree by addition 0.41)
- $b_3$: Weight, $X_3$: Wednesday, Thursday, Friday in winter (Fitting degree by addition 0.16)

Y = Number of system troubles in credit association
Prediction application period = 2006
Fitting degree of prediction result = 0.72

M5

$Y = b_0 \times X_0 + b_1 \times X_1 + b_2 \times X_2 + b_3 \times X_3$

Number of system troubles in credit association = Weight (+4.3) Constant term + Weight (+2.8) Beginning of next week + Weight (+1.8) Rainy season + Weight (+8.3) Wednesday, Thursday, Friday in winter Analysis application period=2004
Fitting degree of analyze-estimation=0.64

M6

$Y = b_0 \times X_0 + b_1 \times X_1 + b_2 \times X_2 + b_3 \times X_3$

Number of system troubles in credit association = Weight (+2.2) Constant term + Weight (+2.7) Beginning of next week + Weight (+10.6) Rainy season + Weight (+8.5) Wednesday, Thursday, Friday in winter Analysis application period=2005
Fitting degree of analyze-estimation=0.72

M7

$Y = b_0 \times X_0 + b_1 \times X_1 + b_2 \times X_2 + b_3 \times X_3$

Number of system troubles in credit association = Weight (Change of fitting degree by addition 0.30) Constant term + Weight (Change of fitting degree by addition 0.22) Beginning of next week + Weight (Change of fitting degree by addition 0.24) Rainy season + Weight (Change of fitting degree by addition 0.18) Wednesday, Thursday, Friday in winter Analysis application period=2004
Prediction application period=2005
Fitting degree of prediction result=0.65

M8

$Y = b_0 \times X_0 + b_1 \times X_1 + b_2 \times X_2 + b_3 \times X_3$

Number of system troubles in credit association = Weight (Change of fitting degree by addition 0.24) Constant term + Weight (Change of fitting degree by addition 0.21) Beginning of next week + Weight (Change of fitting degree by addition 0.44) Rainy season + Weight (Change of fitting degree by addition 0.15) Wednesday, Thursday, Friday in winter Analysis application period=2005
Prediction application period=2006
Fitting degree of prediction result=0.72

$Y = b_0 \times X_0 + b_1 \times X_1 + b_2 \times X_2 + b_3 \times X_3$

- $Y$: Number of system troubles in credit association
- $b_0$ Weight / $X_0$ Constant term (Change of fitting degree by addition 0.30)
- $b_1$ Weight / $X_1$ Beginning of next week (Change of fitting degree by addition 0.22)
- $b_2$ Weight / $X_2$ Rainy season (Change of fitting degree by addition 0.24)
- $b_3$ Weight / $X_3$ Wednesday, Thursday, Friday in winter (Change of fitting degree by addition 0.18)

Analysis application period = 2004
Prediction application period = 2005
Fitting degree of prediction result = 0.65

M10

$Y = b_0 \times X_0 + b_1 \times X_1 + b_2 \times X_2 + b_3 \times X_3$

- $Y$: Number of system troubles in credit association
- $b_0$ Weight / $X_0$ Constant term (Change of fitting degree by addition 0.24)
- $b_1$ Weight / $X_1$ Beginning of next week (Change of fitting degree by addition 0.21)
- $b_2$ Weight / $X_2$ Rainy season (Change of fitting degree by addition 0.44)
- $b_3$ Weight / $X_3$ Wednesday, Thursday, Friday in winter (Change of fitting degree by addition 0.15)

Analysis application period = 2004
Prediction application period = 2006
Fitting degree of prediction result = 0.70

FIG. 16

| | A3 |
|---|---|
| Instance ID | 11257 |
| Phenomenon | Number of system troubles in S branch of A credit association |
| Objective variable ID | m-002 |
| Explanatory variable ID | s_001,s_003.s_005,s_007 |
| Model | Y=f (X1,X2,X3,X4) |
| Inter-factor link | X1-X2、X2-X1 |
| Weight of a link | α12、α21 |
| Analysis application period | 2003〜2006 |
| Prediction application period | 2007 |
| Fitting degree of analyze- estimation | 0.64 |
| Fitting degree of prediction result | — |
| Significance of each factor | 0.30, 0.22, 0.24, 0.18 |

FIG. 37

| Late spring | iv257 |
|---|---|
| Event name | Grand festival in autumn |
| Period | October 24 – October 26 |
| Place | H prefecture B town |
| Institution | B town hall |
| Field | – |
| | |

| Day of week | Day of month | GW | Late spring | Beginning of summer | Late spring to beginning of summer |
|---|---|---|---|---|---|
| Thursday | January 1 | 0 | 0 | 0 | 0 |
| | ... | ... | ... | 0 | 0 |
| Monday | April 12 | 0 | 0 | 0 | 0 |
| Tuesday | April 13 | 0 | 0 | 0 | 0 |
| Wednesday | April 14 | 0 | 1 | 0 | 1 |
| Thursday | April 15 | 0 | 1 | 0 | 1 |
| Friday | April 16 | 0 | 1 | 0 | 1 |
| Saturday | April 17 | 0 | 1 | 0 | 1 |
| Sunday | April 18 | 0 | 1 | 0 | 1 |
| Monday | April 19 | 0 | 1 | 0 | 1 |
| Tuesday | April 20 | 0 | 1 | 0 | 1 |
| Wednesday | April 21 | 0 | 1 | 0 | 1 |
| Thursday | April 22 | 0 | 1 | 0 | 1 |
| Friday | April 23 | 0 | 1 | 0 | 1 |
| Saturday | April 24 | 0 | 1 | 0 | 1 |
| Sunday | April 25 | 0 | 1 | 0 | 1 |
| Monday | April 26 | 0 | 1 | 0 | 1 |
| Tuesday | April 27 | 0 | 0 | 0 | 1 |
| Wednesday | April 28 | 0 | 0 | 0 | 1 |
| Thursday | April 29 | 1 | 0 | 0 | 1 |
| Friday | April 30 | 1 | 0 | 1 | 1 |
| Saturday | May 1 | 1 | 0 | 1 | 1 |
| Sunday | May 2 | 1 | 0 | 1 | 1 |
| Monday | May 3 | 1 | 0 | 1 | 1 |
| Tuesday | May 4 | 1 | 0 | 1 | 1 |
| Wednesday | May 5 | 1 | 0 | 1 | 1 |
| Thursday | May 6 | 0 | 0 | 1 | 1 |
| Friday | May 7 | 0 | 0 | 1 | 1 |
| Saturday | May 8 | 0 | 0 | 1 | 1 |
| Sunday | May 9 | 0 | 0 | 1 | 1 |
| Monday | May 10 | 0 | 0 | 1 | 1 |
| Tuesday | May 11 | 0 | 0 | 1 | 1 |
| Wednesday | May 12 | 0 | 0 | 1 | 1 |
| Thursday | May 13 | 0 | 0 | 0 | 0 |
| | ... | ... | ... | 0 | 0 |

FIG. 42

MODEL CREATION SUPPORT SYSTEM, MODEL CREATION SUPPORT METHOD, AND MODEL CREATION SUPPORT PROGRAM

BACKGROUND OF THE INVENTION

1. Field of the Invention

The present invention relates to a computer system supporting the creation of a model used for predicting a phenomenon that changes with the passage of time, such as monthly sales in a store.

2. Description of Related Art

Recently, along with the proliferation of a sensor network, it is becoming easy to collect data indicating various industrial phenomena (for example, sales, environment, a machine, a vital phenomenon). Such data can be used as useful information in various spots such as a retail store and a maintenance spot. Then, an attempt has been made so as to apply a statistic model (mathematical expression) to such data, thereby understanding the nature of a phenomenon indicated by the data, and further predicting a future phenomenon and finding a change in characteristics in an early stage.

One example of such attempts is the creation of a model obtained by performing a regression analysis with respect to data indicating a past phenomenon and expressing the phenomenon by a regression equation. The use of the model enables a past phenomenon to be analyzed or a future phenomenon to be predicted. In the regression equation, a phenomenon to be a target is expressed by an objective variable, and a factor influencing the phenomenon is expressed by an explanatory variable. The objective variable is also referred to as a dependent variable, a response variable, an explained variable, or a criterion variable. The explanatory variable is also referred to as an independent variable or a covariate. The following Expression (1) is an example of a regression equation of linear multiple regression. In the following Expression (1), Y is an objective variable, X1 and X2 are explanatory variables, and a, b and c are constants. In particular, b and c are called partial regression coefficients.

$$Y = a + b \cdot X1 + c \cdot X2 \tag{1}$$

As an example, in the case of predicting sales in a store, the objective variable Y, the explanatory variable X1, and the explanatory variable X2 are respectively defined as a predicted value of sales, a numerical value representing an assortment degree of goods, and an average price of goods in the above Expression (1). In this case, the constants "a", "b", and "c" can be obtained, using data on past sales, assortments of goods, and average prices in a plurality of stores (for example, a plurality of chain stores). As a result, for example, a store keeper can compare the respective sales contribution degrees of an assortment and a price of goods in accordance with Expression (1), and can also predict a sales from the assortment and the price of goods.

Thus, in the case of creating a regression equation of a model for analyzing or predicting a phenomenon, it is important to determine what is used as an explanatory variable to be a factor for explaining the phenomenon. This is because a fitting degree varies depending upon how to select an explanatory variable. The determination of such an appropriate explanatory variable cannot help depending upon the experiment, hunch, and trial and error of an analyzer at a spot.

In order to obtain an optimum model, a prediction apparatus has been disclosed, which calculates an error between a predicted value and an actually measured value in a predicted model, and updates the predicted model when the error is large (see, for example, JP 9-95917 A). As another example, a method for selecting a predicted model to be provided, using prediction data in the case of applying time-series achievement data to a plurality of predicted models, has been disclosed (see, for example, JP 2001-22729 A).

However, JP 9-95917 A and JP 2001-22729 A disclose a prediction apparatus and method for modifying a predicted model regarding a particular phenomenon, and do not provide a mechanism of accumulating factors of a predicted model to be used in various information processing apparatuses and utilizing the factors for creating or modifying the predicted model in various information processing apparatuses. Furthermore, along with the recent proliferation of a network, it is expected that a system for accumulating and utilizing information on factors of a predicted model will be demanded more in the future.

SUMMARY OF THE INVENTION

Therefore, with the foregoing in mind, it is an object of the present invention to provide a model creation support system, a model creation support method, and a model creation support program that accumulate information on factors of a model and utilize the information for enhancing a fitting degree of the model.

A model creation support system disclosed herein is capable of accessing an information processing apparatus that predicts or analyzes a phenomenon to be a target for prediction or analysis, using a model that is data indicating the phenomenon as an objective variable in a regression equation utilizing an explanatory variable corresponding to a factor contributing to the phenomenon. The model creation support system includes: a model managing part that acquires an identifier of the model, phenomenon data indicating the phenomenon to be a target of the model, the regression equation of the model, factor data indicating the factor corresponding to the explanatory variable included in the regression equation, and evaluation data containing a fitting degree of the model from the information processing apparatus, and accumulates them in a model recording part accessible from the model creation support system; a factor value extracting part that, regarding at least one model, refers to the factor data corresponding to the explanatory variable in the regression equation of the model and the evaluation data on the model in the data accumulated in the model recording part, thereby generating factor value data indicating a degree to which the factor indicated by the factor data contributes to enhancement of the fitting degree of the model and recording the factor value data in a factor value recording part accessible from the model creation support system so that the factor value data is associated with the phenomenon data indicating the phenomenon to be a target of the model; a condition acquiring part that receives a request for supporting model creation from the information processing apparatus, and further receives an input of model condition data containing data indicating a phenomenon to be a target of a requested model; and a model proposing part that matches the data indicating the phenomenon to be a target of the requested model contained in the model condition data with the phenomenon data associated with the factor value data in the factor value recording part, thereby extracting a recommended factor capable of contributing to the enhancement of a fitting degree of the requested model and outputting support data containing data indicating the extracted recommended factor to the information processing apparatus.

The data on a model used in the information processing apparatus is acquired by the model managing part and accumulated in the model recording part. The data to be accumulated contains an identifier of the model, phenomenon data indicating a target phenomenon of the model, a regression equation, factor data, and evaluation data. The factor value extracting part refers to the accumulated factor data and the evaluation data, thereby generating factor value data indicating the degree to which a factor corresponding to the regression equation of the model contributes to the enhancement of a fitting degree of the model, and recording the factor value data in the factor value recording part so that the factor value data is associated with data indicating the target phenomenon of the model. Therefore, the model proposing part can refer to factor value data on a factor corresponding to a phenomenon specified by model condition data acquired by the condition acquiring part among the factor value data recorded in the factor value recording part. The model proposing part can obtain information indicating the contribution degree of a factor capable of contributing to the enhancement of a fitting degree of a requested model, with reference to the factor value data. Thus, the model proposing part can extract an appropriate recommended factor capable of contributing to the enhancement of a fitting degree of the requested model, and output the recommended factor to the information processing apparatus so that it is included in support data. Consequently, the information processing apparatus is likely to generate a model with the fitting degree enhanced, using the appropriate recommended factor contained in the support data. Thus, the model creation support system can accumulate information regarding the factors of a model and utilize the information for enhancing the fitting degree of the model.

The factor can be an event to be an element of a phenomenon, and the factor expressed as a variable in a regression equation is an explanatory variable (which may also be referred to as an explanatory variate).

According to the invention disclosed herein, information on the factors of a model can be shared and utilized.

BRIEF DESCRIPTION OF THE DRAWINGS

FIG. 2 is a diagram showing an example of a structure of data to be recorded in a model instance DB.

FIG. 3 is a diagram showing an example of a structure of data to be recorded in an objective variable DB.

FIG. 4 is a diagram showing an example of a structure of data to be recorded in an explanatory variable DB.

FIG. 5 is a diagram showing an example of a structure of data to be recorded in a factor value DB.

FIG. 12 is a diagram conceptually showing a model before a factor is changed and a model after the factor is changed.

FIG. 13 is a diagram conceptually showing a model before a factor is changed and a model after the factor is changed.

FIG. 15 is a diagram conceptually showing models before and after a change in the case where an analysis application period is changed.

FIG. 16 is a diagram showing models before and after a change in the case where only a predicted application period is changed.

FIG. 37 is a diagram showing an example of a record storing inter-factor links and link weights in a model instance DB.

FIG. 39 is a diagram showing an example of data contents to be recorded as event information.

FIG. 42 is a diagram showing examples of element values of "GW", "late spring" "beginning of summer" and "late spring to beginning of summer".

DETAILED DESCRIPTION OF THE INVENTION

Figure 1:
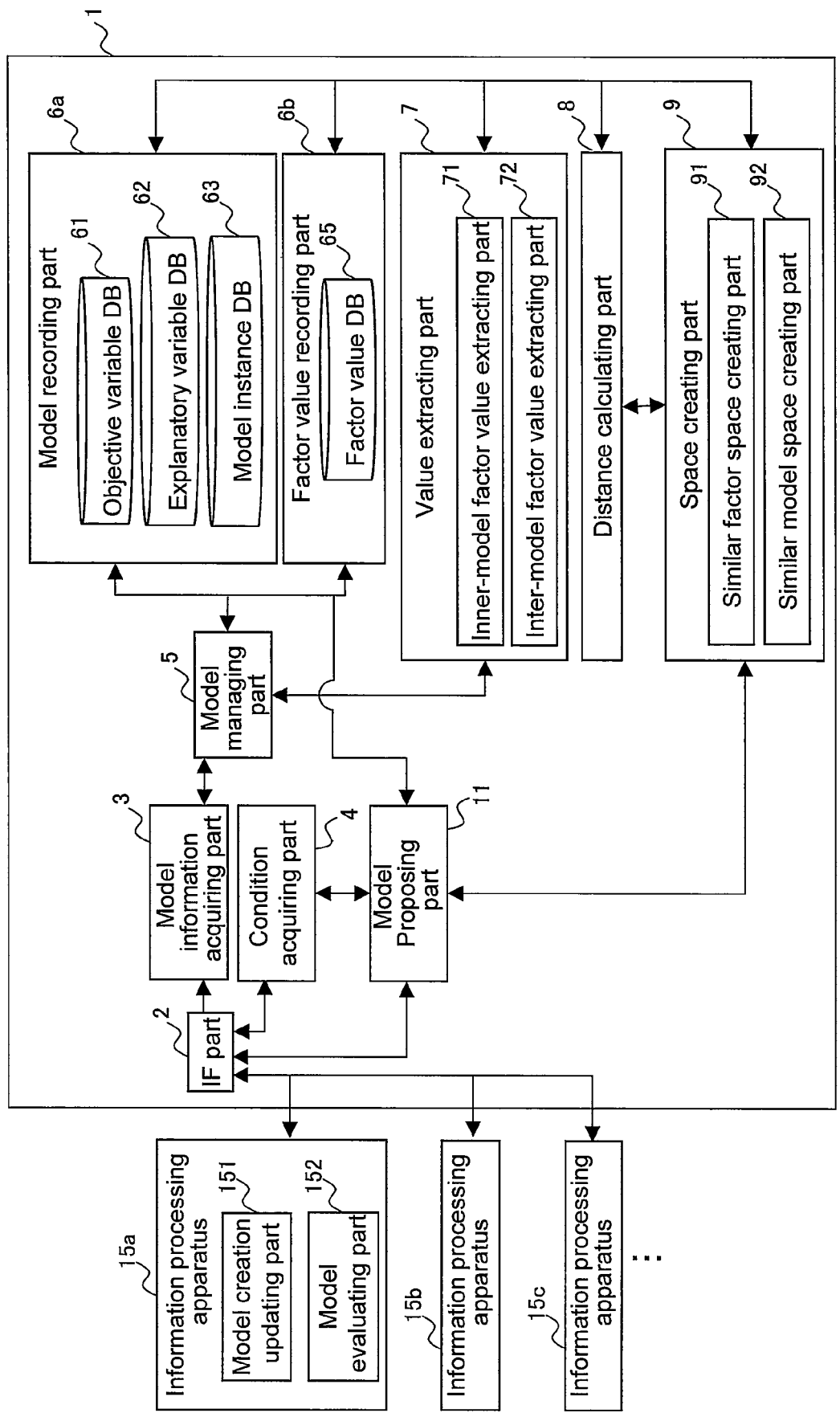
FIG. 1 is a functional block diagram showing a configuration of a model creation support system of Embodiment 1.

Hereinafter, the present invention will be described by way of illustrative embodiments with reference to the drawings.

In an embodiment of the present invention, it is preferred that the factor value extracting part includes: an inner-model factor value extracting part that detects a transition of the factor data indicating the factor corresponding to the explanatory variable included in the regression equation of the model regarding at least one phenomenon and a transition of the evaluation data from the data accumulated in the model recording part, thereby generating factor value data indicating a degree to which a factor corresponding to an explanatory variable added or deleted with respect to the regression equation of the model contributes to the enhancement of a fitting degree of the model and records the factor value data in the factor value recording part; and an inter-model factor value extracting part that refers to factor data indicating factors corresponding explanatory variables included in regression equations of a plurality of models and evaluation data in the data accumulated in the model recording part, thereby generating factor value data indicating a degree to which the factors contribute to enhancement of a fitting degree with respect to the plurality of models and recording the factor value data in the factor value recording part.

The inner-model factor value extracting part detects a transition of the factor data corresponding to the explanatory variable included in the regression equation of the model regarding one phenomenon and a transition of the evaluation data, thereby comparing the factor corresponding to the explanatory variable added or deleted with respect to the regression equation with the evaluation data before and after the addition or the deletion. Therefore, the inner-model factor value extracting part can obtain the contribution degree to the model of the factor corresponding to the explanatory variable added to the model or deleted therefrom.

Furthermore, the inter-model factor value extracting part can detect an explanatory variable (i.e., a factor) included in a plurality of models commonly, by referring to the factor data indicating the factor corresponding to the explanatory variable in the plurality of models and the evaluation data. More specifically, the factor influencing the phenomena of a plurality of models commonly is detected. Therefore, the inter-model factor value extracting part can obtain factor value data indicating the contribution degree of a factor contributing to the enhancement of a fitting degree of the plurality of models.

Thus, the inner-model factor value extracting part calculates the value of the factor obtained based on the transition of a factor in respective models and evaluation data, and the inter-model factor value extracting part calculates the value of the factor obtained based on the information on the factor in a plurality of models. Consequently, the inner-model factor value extracting part and the inter-model factor value extracting part determine the value of the factor from various points of view. Therefore, data indicating a more general value of the factor is obtained.

In an embodiment of the present invention, it is preferred that the inner-model factor value extracting part that, regarding the factor corresponding to the explanatory variable added or deleted with respect to the regression equation of the model in the detected transition of the factor data, detects a change in a fitting degree of the model before and after the addition or the deletion from the evaluation data accumulated in the model recording part and generates factor value data on the factor corresponding to the explanatory variable based on a degree of the change.

According to the above configuration, in the case where an explanatory variable (i.e., a factor) is added or deleted with respect to a regression equation of a model, the inner-model factor value extracting part can generate factor value data of the factor in accordance with the change degree of a fitting degree of the model caused by the addition or deletion of the factor. Therefore, the inner-model factor value extracting part can generate factor value data information that indicates how the addition or the deletion of the factor in the model influences the fitting degree.

In an embodiment of the present invention, it is preferred that the model managing part further acquires application period data indicating an application period of the model and significance data indicating significance of each factor corresponding to each explanatory variable included in the regression equation of the model and accumulates the application period data and the significance data in the model recording part, and the inner-model factor value extracting part detects a change in the application period of the model based on the application period data accumulated in the model recording part regarding at least one phenomenon, extracts a factor that contributes to enhancement of a fitting degree of the model when the application period changes based on a change in the fitting degree of the model and a change in the significance data on each factor in the model before and after the change in the application period, and generates factor value data indicating a degree to which the extracted factor contributes to the model.

According to the above configuration, in the case where the application period of a model changes with respect to a phenomenon, the inner-model factor value extracting part can extract a factor contributing to the enhancement of a fitting degree of the model along with the change in the application period, in accordance with the change degree of a fitting degree of the model and the change degree of significance of each factor. Then, factor value data on the extracted factor is generated. Therefore, the inner-model factor value extracting part can generate factor value data information indicting to which degree the factor of the model contributes to the fitting degree along with the change in the application period.

In an embodiment of the present invention, the model managing part further acquires significance data indicating significance of each factor corresponding to each explanatory variable included in the regression equation of the model and accumulates the significance data in the model recording part, and the inter-model factor value extracting part refers to factor data indicating a group of factors corresponding to a group of explanatory variables included in each regression equation of a plurality of models targeting a particular phenomenon and significance data indicating each of the group of factors in the data accumulated in the model recording part, thereby generating factor value data indicating a contribution degree of factors that influence the plurality of models commonly.

According to the above configuration, the inter-model factor value extracting part can generate factor value data information that indicates commoness or uncommoness of a contributing factor in a plurality of models, such as whether a certain factor contributes to the enhancement of a fitting degree of a plurality of models commonly or the certain factor contributes to only a part of the model.

In an embodiment of the present invention, the model managing part further acquires application period data indicating an application period of the model and significance data indicating significance of the factor corresponding to the explanatory variable in the regression equation of the model and accumulates the application period data and the significance data in the model recording part, and the inter-model factor value extracting part refers to factor data indicating a group of factors corresponding to a group of explanatory variables in each regression equation of a plurality of models having different application periods, which target the same phenomenon, and significance data indicating each of the group of factors in the data accumulated in the model recording part, thereby generating factor value data indicating a contribution degree of the factors with respect to the plurality of models having the different application periods.

The inter-model factor value extracting part refers to a group of factors included in each of a plurality of models targeting the same phenomenon but having different application periods and the significance of each of the group of factors, thereby generating factor value data information indicating how a factor contributes to the enhancement of a fitting degree over a plurality of application periods. For example, information indicating whether or not the factor included in a model contributes to the enhancement of a fitting degree stably over a long period of time, i.e., information indicating long-term stability or instability, can be incorporated in the factor value data.

In an embodiment of the present invention, it is preferred that the condition acquiring part acquires a regression equation of an existing model that is being used or is to be used in the information processing apparatus and information specifying a target phenomenon of the existing model from the information processing apparatus as the model condition data, and the model proposing part acquires factor value data associated with phenomenon data indicating a phenomenon that is the same as or similar to the target phenomenon of the existing model among the factors indicated by the factor value data recorded in the factor value recording part, thereby extracting a recommended factor contributing to enhancement of a fitting degree of the existing model, creating a model of a regression equation including an explanatory variable corresponding to the extracted recommended factor, including the created model in the support data as a replacement model of the existing model, and outputting the created model to the information processing apparatus.

Thus, the model creation support system can create a placement model with high reasonability, which enhances the fitting degree of the existing model of the information processing apparatus.

In an embodiment of the present invention, the model proposing part compares factor value data on a reference factor with factor value data on a plurality of factors other than the reference factor, using a factor corresponding to an explanatory variable included in the regression equation of the existing model as the reference factor, thereby calculating a similarity of a degree of contribution to the enhancement of a fitting degree between the reference factor and each of the other plurality of factors, and extracting a recommended factor capable of contributing to the enhancement of a fitting degree of the existing model to create the replacement model, based on the similarity.

According to the above configuration, the model proposing part can extract a factor having a factor value close to that of factors of the existing model and include the extracted factor in factors of the replacement model. Therefore, a replacement model including a recommended factor capable of contributing to the enhancement of a fitting degree of the existing model can be created.

In an embodiment of the present invention, the condition acquiring part acquires a regression equation of an existing model that is being used or is to be used in the information processing apparatus and information specifying a target phenomenon of the existing model from the information processing apparatus as the model condition data, and the model proposing part extracts a plurality of replacement model candidates to be candidates of the replacement model, calculates a similarity between the replacement model candidates and the existing model, and extracts the replacement model candidate having a relatively high similarity as a replacement model.

According to the above configuration, a replacement model can be created considering the similarity between models, as well as the similarity between factor values. Therefore, a replacement model with high reasonability, which enhances the fitting degree of the existing model and is likely to fit for the existing model, is extracted.

In an embodiment of the present invention, the model managing part accumulates, regarding a model represented by a regression equation in which an explanatory variable is a characteristics factor value representing characteristics of a factor by a vector or a matrix using 0 or 1 as an element, an identifier of a model, phenomenon data indicating a target phenomenon of the model, a regression equation of the model, factor data indicating a factor corresponding to an explanatory variable included in the regression equation, and evaluation data containing a fitting degree of the model in the model recording part, the system further including: an event information recording part that records event information indicating characteristics of an event; and an event factor creating part that matches the event information with the characteristics factor value that is an explanatory variable in the regression equation of the model recorded in the model recording part, generates factor data on an event factor indicating the characteristics of the event based on the characteristics factor value if there is the characteristics factor value corresponding to the event, and records the factor data in the model recording part.

The event factor creating part creates factor data on an event factor corresponding to event information, and records the factor data in the model recording part. Therefore, the factor value extracting part can generate factor value data on an event factor and record it in the factor value recording part, even with reference to the factor data on the event fator. Therefore, the model proposing part generates and outputs support data, also with reference to the factor value data on the event factor in the factor value recording part. Thus, a model also considering event information can be created.

In an embodiment of the present invention, the model managing part accumulates, regarding a model represented by a regression equation in which an explanatory variable is a time factor value representing time characteristics of a factor by a vector or a matrix using 0 or 1 as an element, an identifier of a model, phenomenon data indicating a target phenomenon of the model, a regression equation of the model, factor data containing a time factor value of an explanatory variable included in the regression equation, and evaluation data containing a fitting degree of the model in the model recording part, the system further including a factor procuring part that acquires designated factor data indicating a designated factor requested to be modified from the information processing apparatus or the model proposing part, matches a time factor value of the designated factor with a time factor value of the factor data in the model recording part, thereby extracting a factor having a predetermined relationship with the designated factor from the model recording part and recording factor data represented by a time factor value of the extracted factor or a complex time factor value obtained by an OR or an AND of the time factor value of the extracted factor and a time factor of the designated factor in the model recording part as factor data on a modified factor of the designated factor.

According to the above configuration, the factor procuring part can automatically extract a combination of effective time factors from the group of time factors of a model recorded in a model recording part, and newly record the combination in a factor value recording part as a complex time factor.

An embodiment of the present invention may be a model creation support program causing a computer to perform processing, which is capable of accessing an information processing apparatus that predicts or analyzes a phenomenon to be a target for prediction or analysis, using a model that is data indicating the phenomenon as an objective variable in a regression equation utilizing an explanatory variable corresponding to a factor contributing to the phenomenon. The model creation support program causes the computer to perform the following proceedings: model managing processing of acquiring an identifier of the model, phenomenon data indicating the phenomenon to be a target of the model, the regression equation of the model, factor data indicating the factor corresponding to the explanatory variable included in the regression equation, and evaluation data containing a fitting degree of the model from the information processing apparatus, and accumulating them in a model recording part accessible from the computer; factor value extracting processing of, regarding at least one model, referring to the factor data corresponding to the explanatory variable in the regression equation of the model and the evaluation data on the model in the data accumulated in the model recording part, thereby generating factor value data indicating a degree to which the factor indicated by the factor data contributes to enhancement of the fitting degree of the model and recording the factor value data in a factor value recording part accessible from the computer so that the factor value data is associated with the phenomenon data indicating the phenomenon to be a target of the model; condition acquiring processing of receiving a request for supporting model creation from the information processing apparatus, and further receiving an input of model condition data containing data indicating a phenomenon to be a target of a requested model; and model proposing processing that matches the data indicating the phenomenon to be a target of the requested model contained in the model condition data with the phenomenon data associated with the factor value data in the factor value recording part, thereby extracting a recommended factor capable of contributing to the enhancement of a fitting degree of the requested model and outputting support data containing data indicating the extracted recommended factor to the information processing apparatus.

An embodiment of the present invention may be a model creation support method performed by a computer capable of accessing an information processing apparatus that predicts or analyzes a phenomenon to be a target for prediction or analysis, using a model that is data indicating the phenomenon as an objective variable in a regression equation utilizing an explanatory variable corresponding to a factor contributing to the phenomenon. The method includes: acquiring an identifier of the model, the regression equation of the model, factor data indicating the factor corresponding to the explanatory variable included in the regression equation, and evaluation data containing a fitting degree of the model from the information processing apparatus, and accumulating them in a model recording part accessible from the computer; regarding at least one model, referring to the factor data corresponding to the explanatory variable in the regression equation of the model and the evaluation data on the model in the data accumulated in the model recording part, thereby generating factor value data indicating a degree to which the factor indicated by the factor data contributes to enhancement of the fitting degree of the model and recording the factor value data in a factor value recording part accessible from the computer so that the factor value data is associated with the phenomenon data indicating the phenomenon to be a target of the model; receiving a request for supporting model creation from the information processing apparatus, and further receiving an input of model condition data containing data indicating a phenomenon to be a target of a requested model; and matching the data indicating the phenomenon to be a target of the requested model indicated by the model condition data with the phenomenon data associated with the factor value data in the factor value recording part, thereby extracting a recommended factor capable of contributing to the enhancement of a fitting degree of the requested model and outputting support data containing data indicating the extracted recommended factor to the information processing apparatus.

Embodiment 1

FIG. 1 is a functional block diagram showing a configuration of a model creation support system according to the present embodiment. A model creation support system 1 shown in FIG. 1 is connected to information processing apparatuses 15$a$, 15$b$, and 15$c$. The information processing apparatuses 15$a$ to 15$c$ respectively analyze data indicating a certain phenomenon and create a model, and predict a future phenomenon, using the model. The model is data indicating a regression equation utilizing explanatory variables corresponding to factors contributing to a phenomenon to be a target. The information processing apparatus 15$a$ includes a model creation updating part 151 that creates or updates a model, and a model evaluating part 152 that generates evaluation data on the model.

The model creation support system 1 supports the creation and update of a model to be used in the respective information processing apparatuses 15$a$ to 15$c$. The schematic operation of the model creation support system 1 is to collect and record information on models from the respective information processing apparatuses 15$a$ to 15$c$, generate support data for creating models useful respectively in the information processing apparatuses 15$a$ to 15$c$, using the information, and output the support data to the respective information processing apparatuses 15$a$ to 15$c$.

For the above purpose, the model creation support system 1 includes an IF part 2, a model information acquiring part 3, a condition acquiring part 4, a model managing part 5, a value extracting part 7, a distance calculating part 8, a space creating part 9, a model proposing part 11, a model recording part 6$a$, and a factor value recording part 6$b$. Hereinafter, each functional part of the model creation support system 1 and the information processing apparatus 15$a$ will be described.

(Specific Example of an Information Processing Apparatus)

First, a specific example of the information processing apparatus 15$a$ will be described. Herein, as an example, the case will be described where the information processing apparatus 15$a$ creates a model targeting the number of system troubles in a certain financial institution. In this case, the model creation updating part 151 of the information processing apparatus 15$a$ generates a regression equation by subjecting time-series data on the number of system troubles to a regression analysis. An example of the regression equation is represented by the following Expression (2).

$$Y = \beta_0 \cdot X_0 + \beta_1 \cdot X_1 + \beta_2 \cdot X_2 + \beta_3 \cdot X_3 \quad (2)$$

In the above Expression (2), Y is an objective variable representing the number of system troubles. Y is expressed by a vector, for example, using the number of system troubles per day as each element. For example, Y representing the transition of the number of system troubles for one year (=365 days) from Jan. 1, 2007 is a matrix with one column and 365 rows (365-dimensional vector).

$X_0$ is a constant term. $X_1$ to $X_3$ are explanatory variables respectively corresponding to three factors contributing to the number of system troubles. $\beta_0$ to $\beta_3$ represent weights (parameters) of $X_0$ to $X_3$. Herein, as an example, it is assumed that the explanatory variables $X_1$, $X_2$, and $X_3$ correspond to "beginning of next week" "rainy season" and "Wednesday, Thursday, Friday in winter" respectively. Factors expressed by day species that mean days having particular attributes, such as "beginning of next week" "rainy season" and "Wednesday, Thursday, Friday in winter" are referred to as day factors. The day factors can be expressed by a vector or a matrix, for example, in which an element corresponding to an applicable day is 1 and an element corresponding to a day that is not applicable is 0. For example, the explanatory variable $X_1$ corresponding to the day factor "beginning of next week" for one year (=365 days) from Jan. 1, 2007 is expressed by a matrix with one column and 365 rows (365-dimensional vector) represented by the following Expression (3).

$$X_0 = \begin{pmatrix} 1 \\ 1 \\ 0 \\ 0 \\ 0 \\ \vdots \\ 0 \end{pmatrix} \quad (3)$$

The explanatory variable is not limited to a day factor. For example, a matrix or a vector using 0 or 1 as an element, representing a characteristics factor that is characteristics characterized by a place, an event, or the like, may be used as an explanatory variable. Thus, by representing a factor by an explanatory variable of a matrix or a vector using 0 or 1 as an element, one factor is likely to be used in a plurality of different models, and the factor is likely to be re-used. The explanatory variable is not limited to such a matrix or a vector, and can be expressed arbitrarily.

Thus, for example, in order to create a regression expression of the number of system troubles for one year, it is necessary to determine the explanatory variables $X_1$ to $X_3$. The explanatory variables $X_1$ to $X_3$ are selected by a user. More specifically, a user inputs data indicating factors (for example, "beginning of next weak", "rainy season" and "Wednesday, Thursday, Friday in winter") influencing the number of system troubles. The model creation updating part 151 calculates numerical values (matrix) of the explanatory variables $X_1$ to $X_3$ for one year from Jan. 1, 2007, for example, from the factors input by the user. Furthermore, the model creation updating part 151 performs a regression analysis using the numerical values of the explanatory variables $X_1$ to $X_3$ and actually measured values of the number of system troubles of each day in one year from Jan. 1, 2007, and calculates coefficients $\beta_0$ to $\beta_2$ in the above Expression (2). The regression equation represented by Expression (2) obtained from the calculation becomes a model of the number of system troubles.

The model evaluating part 152 calculates a fitting degree of the model created by the model creation updating part 151, and records the fitting degree in the information processing apparatus 15a as evaluation data. The fitting degree includes the following two kinds. One of them shows the goodness of fit of a predicted value calculated by the model with respect to an actually measured value used for creating the model. The other one shows to which degree a predicted value obtained by predicting a future using the model can fit a resultant value representing a phenomenon that has actually occurred. In the following, the former will be referred to as a "fitting degree of analysis-estimation" (fitting degree, focused on current data explanation) and the latter is referred to as a "fitting degree of prediction result" (fitting degree, focused on future data prediction). Model estimation is usually obtaining a model which most explains the current data (the actually measured value). This estimation is referred to as "estimation of analysis" in the present specification. On the other hand, the model for predicting the data variations of the future may be estimated. This estimation is referred to as "estimation of prediction " in the present specification. In estimation of prediction, even if deviation arises to the model, a brief model often obtains a correct prediction distribution.

For example, the fitting degree of analysis-estimation shows to which degree a predicted value $Y_{2007}$ obtained by calculating the number of system troubles for one year from Jan. 1, 2007 in accordance with the above Expression (2) fits an actually measured value of the number of system troubles for one year from Jan. 1, 2007. On the other hand, for example, it is assumed that the number of system troubles $Y_{2008}$ for one year from Jan. 1, 2008 is calculated in December 2007 in accordance with the above Expression (2). After that, an actually measured value of the number of system troubles from Jan. 1, 2008 to Dec. 31, 2008 is obtained at the end of Dec. 31, 2008 after the passage of time. The fitting degree of prediction result shows to which degree the predicted value $Y_{2008}$ fits the actually measured value of the year 2008.

In the following, a period covered by an actually measured value used during the creation of a model such as one year from Jan. 1, 2007 will be referred to as an "analysis application period" and a period targeted for prediction such as a period from Jan. 1, 2008 to Dec. 31, 2008 will be referred to as a "prediction application period". The application period includes both the analysis application period and the prediction application period.

As a typical example of a method for calculating a fitting degree of analysis-estimation of a model, the square of a coefficient of determination in a regression equation can be calculated as a numerical value of a fitting degree of analysis-estimation. Regarding the fitting degree of prediction result, for example, an average absolute error ratio representing an absolute value ratio of a predicted error with respect to an actually measured value is calculated, and a numerical value obtained by subtracting the average absolute error ratio from 1 (referred to as an average explanatory ratio) can be used as a numerical value representing a fitting degree of prediction result. Regarding the degree to which a variable contributes to the improvement of a model, the t-test value of the variable can be considered as a typical index at an analysis time, and an average explanatory ratio can be considered as a typical index at a prediction time. Method for calculating an analysis prediction and a fitting degree of prediction result are not limited to the above examples.

The information processing apparatus 15a calculates a predicted value of a future phenomenon (for example, the number of system troubles for the next one year), using the model created by the model creation updating part 151. The predicted value is referred to by a user maintaining a system of a financial institution and used for business. Furthermore, the user can cause the model creation updating part 151 to update the model so that the model fits an actual phenomenon that is likely to change daily. For example, the user inputs a factor desired to be added to the model, and the model creation updating part 151 can create a regression equation with an explanatory variable corresponding to the input factor added thereto and update the model using the regression analysis calculation.

The information processing apparatuses 15b and 15c can also be configured in the same way, respectively. However, the configurations of the information processing apparatuses 15a to 15c are not limited to that of the information processing apparatus 15a, and only need to have a function of creating and updating a model and a function of generating evaluation data on the model. In FIG. 1, although three information processing apparatuses are connected to the model creation support system 1, more information processing apparatuses may be connected thereto.

(Explanation of Each Functional Part of the Model Creation Support System 1)

Next, each functional part of the model creation support system 1 will be described. The IF part 2 enables the communication between the model creation support system 1 and the information processing apparatuses 15a to 15c. Herein, the connection form between the model creation support system 1 and the information processing apparatuses 15a to 15c is not particularly limited, and the model creation support system 1 and the information processing apparatuses 15a to 15c may be connected, for example, by cable or wireless. The model creation support system 1 and the information processing apparatuses 15a to 15c may also be connected over the Internet or an intranet.

The model information acquiring part 3 requests model information with respect to the respective information processing apparatuses 15a to 15c via the IF part 2, and receive model information therefrom. The received model information is passed to the model managing part 5. The model information contains, for example, data indicating a regression equation of a model, data indicating a target phenomenon of the model and factors, evaluation data on the model, data indicating an analysis application period and a prediction application period of the model, and the like. The evaluation data on the model contains, for example, data indicating the fitting degree of a model (at least one of a fitting degree of analysis-estimation and a fitting degree of prediction result), and the significance of each factor of the model.

The model information acquiring part 3 may, for example, request and receive model information periodically. Alternatively, in each of the information processing apparatuses 15a to 15c, when a model is created or updated, model information may be sent to the model information acquiring part 3 automatically together with an update notification or a new creation notification.

The model managing part 5 records the model information acquired by the model information acquiring part 3 in the model recording part 6a. In the model recording part 6a, as an example, an objective variable DB 61, an explanatory variable DB 62, and a model instance DB 63 are constructed. Among the model information, for example, the model managing part 5 records data indicating a regression equation, data indicating an analysis application period and a prediction application period, and evaluation data in the model instance DB 63, records data indicating the phenomenon of the model in the objective variable DB 61, and records data indicating the factors of the model in the explanatory variable DB 62.

FIG. 2 shows an exemplary structure of data to be recorded in the model instance DB 63. In the example shown in FIG. 2, a phenomenon, an objective variable ID, an explanatory variable ID, a model (regression equation), an analysis application period, a prediction application period, a fitting degree of analysis-estimation, a fitting degree of prediction result, and the significance of each factor are recorded so as to be associated with an instance ID as one record.

In the case where a model form in the information processing apparatuses 15a to 15c is changed, for example, as in the case where a part of factors of a model is changed and the case where an analysis application period or a prediction application period is changed in the information processing apparatuses 15a to 15c, the model managing part 5 can newly assign an instance ID to the changed model form, and record the changed model form in the model instance DB 63 as a new record. Thus, the model form changing in accordance with the situation at a spot can be reflected to the model instance DB 63.

FIG. 3 is a diagram showing an exemplary structure of data to be recorded in the objective variable DB 61. In the example shown in FIG. 3, a phenomenon represented by an objective variable, the place of the phenomenon, the kind of the phenomenon, a category (region), a category (field), and a category (institution) are recorded so as to be associated with the objective variable ID as one record.

FIG. 4 is a diagram showing an exemplary structure of data to be recorded in the explanatory variable DB 62. In the example shown in FIG. 4, the explanatory variable DB 62 contains factor tables storing records C1 and C2, and an element value table storing a record C100. In each of the records C1 and C2, category information such as a factor name and a coordinate space (for example, a calendar, a map) to which factors commonly belong is recorded so as to be associated with an explanatory variable ID as one record.

For example, as shown in the above Expression (3), in the case where the explanatory variable of a day factor is expressed by a matrix with one column and 365 rows, using each of 365 days of one year as an element, a coordinate space to which factors commonly belong is "one year=365 days". Thus, by defining a coordinate space to which day factors commonly belong, for example, a similarity between day factors and the like can be calculated. A coordinate space to which factors commonly belong is not limited to a temporal space as in "one year=365 days", and for example, may be a geometrical space such as a Japanese map. Furthermore, in the record C100 of the element value table, factor names showing day species such as "Monday", "Tuesday", "Wednesday", "Holiday/Substitute holiday", "Beginning of midwinter", "Month days with a multiple of five of a month" and "January" are recorded on the uppermost row. In each column, day factor values (element values) showing days specified by each day species of the factor names are recorded. The day factor values are discrete values recorded for each day from January 1 to December 31 in a row direction, and "1" is recorded on days corresponding to the day species and "0" is recorded on the other days.

The model managing part 5 further instructs the value extracting part 7 to extract values of factors of a model recorded in the model instance DB 63. The value extracting part 7 refers to the data in the objective variable DB 61, the explanatory variable DB 62, and the model instance DB 63 in the model recording part 61, calculates the values of factors contained in each model, and records the values in the factor value recording part 6b.

The value of a factor is expressed by a value attribute and a numerical value showing a value degree. The value attribute can be defined, for example, by various natures of a factor obtained during the change of a model targeting one phenomenon or from the comparison between a plurality of models. Examples of the value attribute include a fitting degree enhancement property by a factor change, a fitting degree enhancement property by an application period change, long-term stability, and commoness. By defining a factor value attribute as described above, a factor value can be evaluated from a plurality of points of view, and appropriate evaluation can be made. The factor value attribute is not limited to the above example.

The fitting degree enhancement property by a factor change refers to the degree to which a factor of a model enhances the fitting degree of the model by being added to or deleted from the model. The fitting degree enhancement property by an application period change refers to the degree to which a factor of a model enhances the fitting degree of the model at a time of change in an analysis application period or prediction application period of the model.

The long-term stability refers to the stability of the degree of influence which a factor has on a model showing a phenomenon for a long period of time with the passage of a time. The commoness shows to which degree one factor is used commonly to a plurality of models, and contributes to a fitting degree.

The value extracting part 7 includes an inner-model factor value extracting part 71 and an inter-model factor value extracting part 72. The inner-model factor value extracting part 71 extracts a model form change such as a change in factors of a model and a change in an analysis application period or a prediction application period with reference to the model instance DB 63. Then, the inner-model factor value extracting part 71 compares evaluation data on models before and after the change, thereby extracting a factor contributing to the enhancement of a fitting degree and calculating the value of the factor (a specific example of a calculation method will be described later). Thus, the magnitude of a factor value regarding the enhancement of a fitting degree involved in a model form change, such as a fitting degree enhancement property by a factor change and a fitting degree enhancement property by an application period change, can be calculated.

The inner-model factor value extracting part 71 records the data indicating the magnitude of a factor value obtained by the calculation, and the data indicating information for identifying a factor, the value attribute of the factor, and a phenomenon to be a target of a model in which the factor contributes to the enhancement of a fitting degree so that these data are associated with each other in a factor value DB 65.

FIG. 5 is a diagram showing an exemplary structure of data to be recorded in the factor value DB 65. A record D1 shown in FIG. 5 is an exemplary record showing a value (fitting degree enhancement property by a factor change) of a factor "late June to mid-July". A record D2 is an exemplary record showing a value (fitting degree enhancement property by an application period change) of a factor "rainy season". The records D1 and D2 are data in which a contribution factor (explanatory variable ID), a value attribute, an objective variable ID, a category of an objective variable (field), an instance ID of a model before a change, an instance ID of a model after a change, and an analysis application period, and enhancement performance are recorded so as to be associated with each other. The objective variable ID shows an objective variable of a model before a change and a model after the change. The objective variable ID is an example of data indicating a phenomenon to be a target of a model in which a factor contributes to the enhancement of a fitting degree.

The inter-model factor value extracting part 72 refers to a plurality of records in the model instance DB 63, and acquires an explanatory variable ID and evaluation data in each record. Then, the inter-model factor value extracting part 72 extracts a factor (explanatory variable) that contributes to the enhancement of a fitting degree with respect to a plurality of models represented by a plurality of records based on the acquired information, and calculates the contribution degree thereof. Thus, for example, the magnitude of a factor value with respect to a plurality of models, such as long-term stability and commoness, can be calculated. Data indicating the magnitude of a factor value is recorded in the factor value DB 65 together with factor information. "Contribution Degree" explains how each parameter contributes to the model estimation or to the prediction of future variations. In the case of analysis, representative measurement of a contribution degree of a parameter is, for example, a t-test value of that parameter. On the other hand, in the case of prediction, representative measurement of a contribution degree of a parameter is, for example, an average absolute error ratio.

A record D3 shown in FIG. 5 is an exemplary record showing each factor value (long-term stability) corresponding to explanatory variable IDs "s-031, s-101, s-017". The record D3 is data in which a contribution factor (explanatory variable ID), a value attribute, an objective variable ID, a category of an objective variable (field), an instance ID of a typical model, a corresponding period, and a fitting degree are recorded so as to be associated with each other. A record D4 is an exemplary record showing respective factor values (commoness) corresponding to explanatory variable IDs "s-031, s-101". The record D4 is data in which a contribution factor (explanatory variable ID), a value attribute, an objective variable ID, a category of an objective variable (field), an instance ID of a typical model, the number of adopted spots, a field adoption ranking, and a model average fitting degree are recorded so as to be associated with each other.

As described above, the model information acquiring part 3 and the model managing part 5 collect information on models created respectively by the information processing apparatuses 15a to 15c and accumulate the information in the model recording part 6a. The value extracting part 7 generates data indicating model factor values from the accumulated model information and records the data in the factor value recording part 6b. These data are used by the model proposing part 11, the distance calculating part 8, and the space creating part 9 described next. More specifically, as in the above example, the factor values are classified into a plurality of attributes from various points of views and recorded in the factor value DB 65, whereby the calculation of a similarity between factor values described later and the like can be performed.

Next, the condition acquiring part 4, the model proposing part 11, the space creating part 9, and the distance calculating part 8 will be described. The condition acquiring part 4 receives a request for supporting model creation from the information processing apparatuses 15a to 15c via the IF part 2. Furthermore, the condition acquiring part 4 not only requests model creation support but also receives model condition data indicating the condition of a requested mode. The model condition data contains at least data indicating a target phenomenon of the requested model. The data indicating this phenomenon indicates, for example, an objective variable in a regression equation of the requested model.

The request for supporting model creation received by the condition acquiring part 4 may be a request for creating a replacement model or a replacement factor obtained by changing an existing model created by an information processing apparatus of a request origin so as to enhance a fitting degree, or a request for creating a new model. In the case of the former, the model condition data contains, for example, information indicating the existing model created by the information processing apparatus of a request origin, information indicating factors desired to be retained or factors desired to be changed among factors of the existing model. The condition acquiring part 4 can acquire such model condition data simultaneously with a model creation request, or can acquire such model condition data by requesting the model condition data with respect to the information processing apparatus of a request origin after receiving a model creation request.

The condition acquiring part 4 passes the model condition data to the model proposing part 11. The model proposing part 11 generates a model in accordance with the condition indicated by the model condition data, and outputs the model to the information processing apparatus. Specifically, the model proposing part 11 determines explanatory variables to be included in a regression equation of the requested model in accordance with the condition. At that time, the model proposing part 11 extracts factors that can contribute to the enhancement of a fitting degree of the requested model with reference to the factor value DB 65. Since the model condition data contains data indicating a target phenomenon of the requested mode, the model proposing part 11 can acquire information on factors that can contribute to the enhancement of a fitting degree of the requested model by searching for factor value data associated with the phenomenon.

Furthermore, the model proposing part 11 requests the space creating part 9 to collect information so as to search for information on desired factors or a desired model in the model recording part 6a and the factor value recording part 6b. The space creating part 9 includes a similar factor space creating part 91 and a similar model space creating part 92.

The similar factor space creating part 91 creates similar factor space data containing information on a similar factor having a value similar to a value of a factor to be a reference (hereinafter, referred to as a reference factor), and information indicating the relationship between the similar factor and the reference factor. An example of the similar factor space data includes data in which data specifying the similar factor and data indicating the distance (similarity) between a factor value of the similar factor and a factor value of the reference factor are recorded so as to be associated with each other.

At a time of creating similar factor space data, the similar factor space creating part 91 requests the distance calculating part 8 to calculate the distance (similarity) between the factor values. The distance calculating part 8 acquires the factor value data on two factors targeted for calculation, and calculates the distance between the two factor values based on the factor value data.

The distance between the factor values can be expressed by numerical values respectively, for example, with respect to a plurality of points of view such as the similarity of factor value attributes, the similarity of the contribution degrees of factors with respect to a model, the similarity of models to which the factors belong, and the similarity of factors themselves. These numerical values are substituted into a predetermined mathematical expression, whereby the distance between the factor values can be calculated.

Although the mathematical expression is not particularly limited, it is preferred that an expression reflects the similarity of a plurality of points of view totally. For example, a numerical expression is preferably as follows: when only the similarity of one point of view increases with the similarity of the other points of view remaining as it is, the distance between factor values to be calculated also changes in accordance with the degree of the increase.

The similarity model space creating part 92 creates similar model space data indicating a virtual space in which similar models similar to a model to be a reference (hereinafter, referred to as a reference model) are placed around the reference model in accordance with the similarity (distance) with respect to the reference model. An example of the similar model space data includes data in which data specifying a similar model and the distance between the similar model and the reference model are recorded so as to be associated with each other.

At a time of creating model space data, the similar model space creating part 92 requests the distance calculating part 8 to calculate the similarity (distance) between models. The distance calculating part 8 acquires data on two models to be calculated from the model instance DB 63, the objective variable DB 61, and the explanatory variable DB 62, and calculates the distance between the two models based on the data.

The distance between the models can be digitized from a plurality of points of view such as the similarity of target phenomena of the models (similarity between objective variables in regression equations), the similarity between factors included in the models (similarity between explanatory variables), and the like. These numerical values are substituted into a predetermined mathematical expression, whereby the distance between the models can be calculated. Although the mathematical expression is not particularly limited, an expression preferably reflects the similarity of a plurality of points of view totally.

The model proposing part 11 requests the similarity factor space creating part 91 or the similarity model space creating part 92 to perform processing in accordance with the model creation request and the model condition data. The model proposing part 11 creates support data output to the information processing apparatus, based on the similar factor space data and the similar model space data obtained as a result.

The model creation support system 1 is constructed on a computer such as a server machine, a personal computer, or a work station. The respective functional parts of the IF part 2, the model information acquiring part 3, the condition acquiring part 4, the model managing part 5, the value extracting part 7, the distance calculating part 8, the space creating part 9, and the model proposing part 11 of the model creation support system 1 may be configured on one computer or may be distributed into a plurality of computers. Furthermore, the respective functional parts are realized when the CPU of a computer executes a predetermined program. Thus, a program for executing each of the functions and a recording medium storing the program are also included in one embodiment of the present invention. Furthermore, the model recording part 6a and the factor value recording part 6b are embodied by a recording medium such as a memory or a hard disk provided in a computer.

(Operation Example of the Model Creation Support System)

The processing executed by the model creation support system 1 mainly includes accumulation processing of accumulating model information and factor value information and model creation processing. The accumulation processing is mainly executed by the model information acquiring part 3, the model managing part 5, and the value extracting part 7. The model creation processing is mainly executed by the condition acquiring part 4, the model proposing part 11, the distance calculating part 8, and the space creating part 9. In the following, the outline of the accumulation processing and the model creation procession will be described, and thereafter, each processing will be described in detail.

(Outline of Accumulation Processing)

In the present embodiment, the model information acquiring part 3 requests model information with respect to the information processing apparatuses 15a, 15b, and 15c at a constant period. When receiving a request for model information, the information processing apparatuses 15a, 15b, and 15c return information on newly created models or updated models after the previous request to the model information acquiring part 3.

The acquisition timing of information regarding the models is not limited thereto. The model information acquiring part 3 may receive information sequentially, for example, every time a model is newly created or updated in the information processing apparatus 15a, 15b, or 15c.

In the case where the information processing apparatus 15a, 15b, or 15c newly creates a model, the model information acquiring part 3 receives, for example, data indicating a regression equation of the model, data indicating a target phenomenon and factors of the model, evaluation data on the model, and data indicating an analysis application period and a prediction application period of the model.

In the case where the information processing apparatus 15a, 15b, or 15c updates a model, the model information acquiring part 3 receives the updated contents. The update of the model includes, for example, the change in factors of the model, the change in an application period, and the change in evaluation data. In the present embodiment, the model information acquiring part 3 receives a regression equation and evaluation data before and after a change in the case of the change in factors, an application period and evaluation data before and after a change in the case of the change in an application period, and evaluation data after a change in the case of the change in evaluation data.

The model information acquiring part 3 notifies the model managing part 5 of a request for storing model information together with model information, for example, in the case where a model is newly created or updated in the information processing apparatus 15a, 15b, or 15c. The model managing part 5 executes processing based on the received information.

Figure 6:
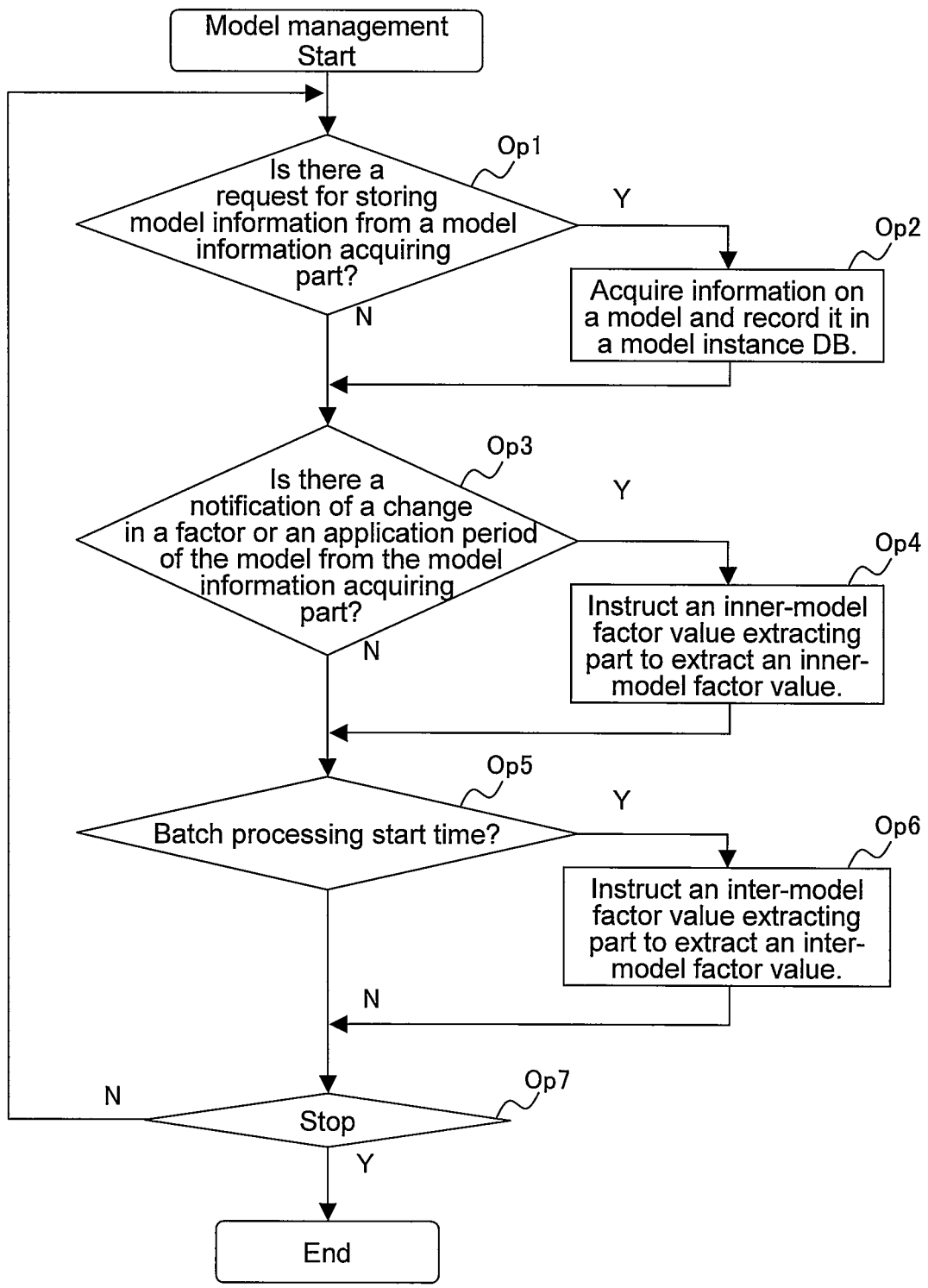
FIG. 6 is a flowchart illustrating an operation example of a model managing part.

FIG. 6 is a flowchart illustrating an operation example of the model managing part 5. When receiving a request for storing model information from the model information acquiring part 3 (Y in Op1), the model managing part 5 receives information to be stored from the model information acquiring part 3 and records the information in the model recording part 6a (Op2). Hereinafter, the processing in Op2 in three cases: the case where a model is newly created; the case where a model factor or an application period is changed, and the case where evaluation data on the model (for example, a fitting degree of prediction result, a fitting degree of analysis-estimation, or the significance of each factor) is updated will be described, respectively.

When a model is newly created, the model managing part 5 newly generates an instance ID in Op2. Then, the model managing part 5 receives data such as a regression equation of the newly created model, a phenomenon to be predicted, the kind of the phenomenon, categories (region, field, institution) of the phenomenon, factor names, an analysis application period, a prediction application period, a fitting degree of analysis-estimation, and the significance of each factor, and records the data in the model instance DB 63, the objective variable DB 61, and the explanatory variable DB 62, with the instance ID associated therewith.

In the case of a change in factors of the model or a change in an application period, the model managing part 5 acquires information for specifying a model before the change (a regression equation before the change, a phenomenon to be predicted, etc.) and the information regarding updated contents from the model information acquiring part 3. Then, the model managing part 5 newly generates an instance ID, and records the information regarding the updated contents acquired from the model information acquiring part 3 in the model instance DB 63, with the instance ID associated therewith.

In the case where the evaluation data (for example, a fitting degree of prediction result, a fitting degree of analysis-estimation, or the significance of each factor) of the model is updated, the model managing part 5 receives the updated evaluation data from the model information acquiring part 3, and updates the evaluation data corresponding to the instance ID of the model in the model instance DB 63.

The processing in Op2 is as described above. Next, when the model information acquiring part 3 notifies the model managing part 5 of a change in factors of a model or a model application period (Y in Op3), the model managing part 5 instructs the inner-model factor value extracting part 71 to extract a factor having a fitting degree enhancement property and to record factor value data on the factor (Op4). The fitting degree enhancement property includes a fitting degree enhancement property by a change in factors, and a fitting degree enhancement property by an change in an application period. At a time of the instruction, the model managing part 5 receives regression equations before and after the change or application periods before and after the change, and evaluation data (a fitting degree, the significance of each factor, etc.) before and after the change, and passes them to the inner-model factor value extracting part 71. The inner-model factor value extracting part 71 calculates a fitting degree enhancement property by a change in factors or a fitting degree enhancement property by a change in an application period of the factor included in the model after the change, and records it in the factor value DB 65. The detail of the inner-model factor value extracting part 71 will be described later in detail.

At a time of starting a night batch (Y in Op5), the model managing part 5 instructs the inter-model factor value extracting part 72 to extract factors having long-term stability or commoness, and to record factor value data on the factors (Op6). Thus, factors having long-term stability and commoness are extracted periodically, and factor value data on the factors is recorded in the factor value DB 65. The detail of the inter-model factor value extracting part 72 will be described later.

The processings in Op1 to Op6 are repeated unless a stop instruction is provided (as long as N is provided in Op7). Thus, information on a model that is newly created or updated in the information processing apparatuses 15a to 15c is reflected to the sequential model recording part 6a. Furthermore, the factor value data is also updated in synchronization with the update of information to be recorded in the model recording part 6a.

(Outline of a Model Creation Processing)

The condition acquiring part 4 receives a model creation request and model condition data from the information processing apparatuses 15a to 15c. In the present embodiment, as an example, the case where the condition acquiring part 4 receives a request for creating a replacement model from the information processing apparatus 15a will be described. In this case, the condition acquiring part 4 receives model condition data together with the request for creating a replacement model, and passes the received data to the model proposing part 11.

Figure 7:
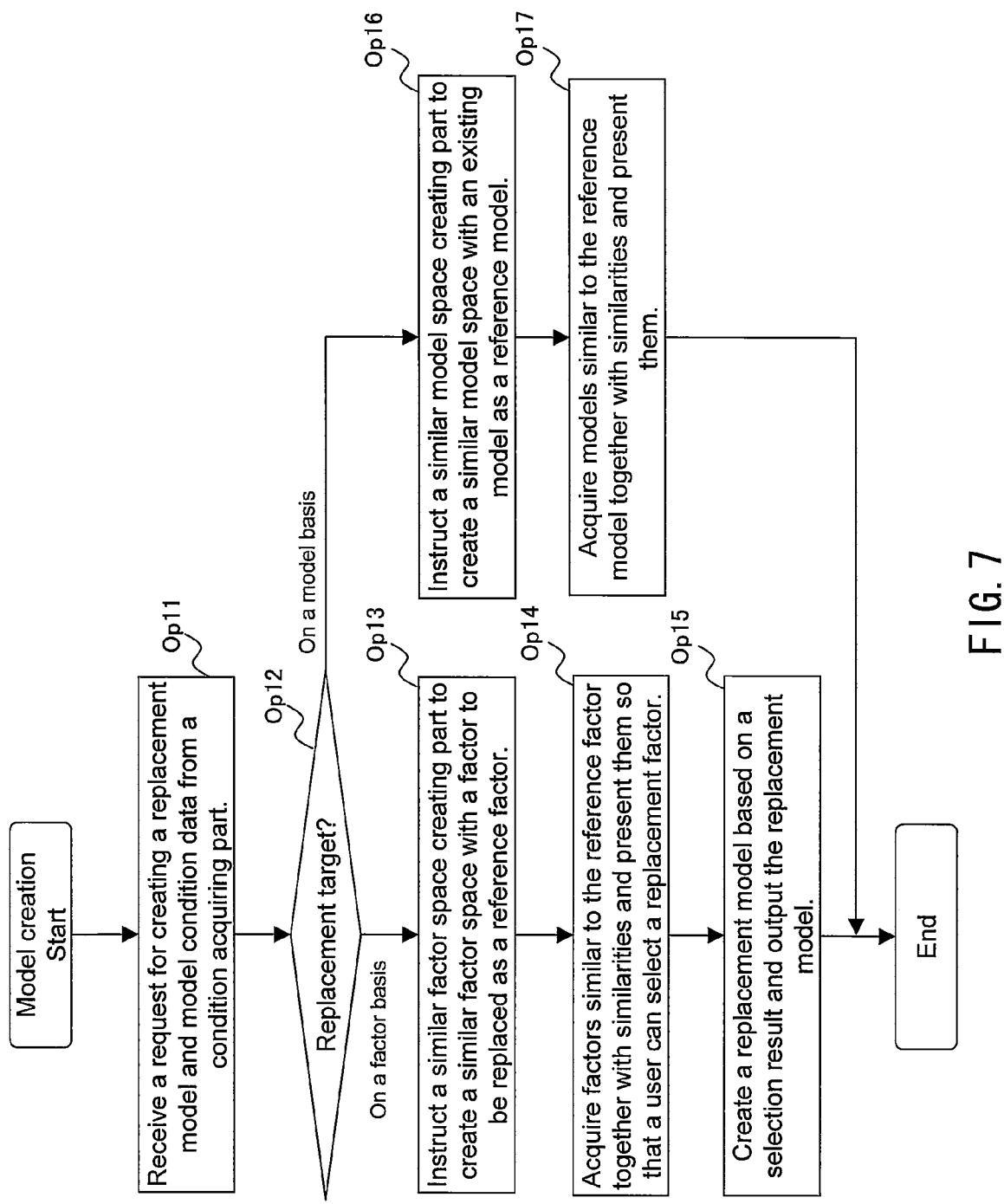
FIG. 7 is a flowchart illustrating an operation example when a model proposing part receives a request for creating a replacement model.

The model proposing part 11 generates a replacement model based on the data, and outputs the replacement model to the information processing apparatus 15*a*. FIG. 7 is a flowchart illustrating an operation example when the model proposing part 11 receives a request for creating a replacement model.

In Op11 in FIG. 7, the model proposing part 11 acquires the request for creating a replacement model and the model condition data from the condition acquiring part 4. The model condition data contains, for example, data indicating a regression equation of an existing model requested to be replaced in the information processing apparatus 15*a* and a replacement target range in the existing model. More specifically, the data indicating the replacement target range contains data indicating whether the existing model is replaced on a model basis or on a factor basis. Furthermore, data specifying a factor to be replaced is also contained in the data indicating the replacement target range.

Herein, the case where a regression equation of the existing model is expressed by the same expression as Expression (2) will be illustrated.

$$Y = \beta_0 \cdot X_0 + \beta_1 \cdot X_1 + \beta_2 \cdot X_2 + \beta_3 \cdot X_3 \quad (2)$$

As an example, in the above Expression (2), it is assumed that an objective variable Y, an explanatory variable $X_1$, an explanatory variable $X_2$, and an explanatory variable $X_3$ respectively correspond to the number of system troubles in S branch office of A credit association, a factor "beginning of next weak", "rainy season" and "Wednesday, Thursday, Friday in winter".

In the case where the model condition data indicates that the existing model is replaced on a factor basis ("on a factor basis" in Op12), the model proposing part 11 instructs the similar factor space creating part 91 to create similar factor space data with a factor to be replaced as a reference factor (Op13). The similar factor space data indicates a virtual space composed of a group of similar factors having a value similar to that of the reference factor.

For example, it is assumed that the model condition data indicates that the factor to be replaced is a day factor "rainy season" corresponding to $X_2$. In this case, with a day factor "rainy season" as a reference factor, similar factor space data containing a group of similar factors having a value similar to that of the reference factor and information indicating the relationship between each similar factor and the reference factor is created. Then, the model proposing part 11 receives the similar factor space data from the similar factor space creating part 91. The detail of the processing of generating similar factor space data will be described later. In the case where there are a plurality of factors to be replaced, similar factor space data is generated for each reference factor, with each of the plurality of factors as a reference factor.

The similar factor space data is, for example, data in which data specifying a similar factor, and the distance (similarity) between the reference factor and the similar are recorded so as to be associated with each other. The following Table 1 shows an example of the contents of the similar factor space data in the case where day factors "summer solstice or early summer" "early summer or midsummer" "early July", "summer solstice", "summer solstice or early summer" "late June to mid-July", "July", and "early July to mid-July" are extracted as similar factors of the reference factor "rainy season". In the example shown in the following Table 1, the place of a target phenomenon of a model to which the similar factors belong, the kind of the phenomenon, a factor value common to that of the reference factor, the names of the similar factors, and distances are associated with each other.

TABLE 1

| Common factor value | Name of similar factors | Place of a target phenomenon | Kind of a target phenomenon | Distance |
| --- | --- | --- | --- | --- |
| Long-term stability | Summer solstice or early summer | H branch office of B bank | Number of system troubles in a local bank | 9 |
| Long-term stability | Early summer or midsummer | S branch office of A credit association | Number of system troubles in a credit association | 18 |
| Long-term stability | Early July | U branch office of C bank | Number of system troubles in a bank | 10 |
| Long-term stability | Summer solstice | N branch office of K bank | Number of system troubles in an automatic teller machine | 23 |
| Long-term stability | Summer solstice or early summer | U branch office of H credit association | Number of system troubles in a credit association | 8 |
| Long-term stability | Late June to mid-July | T branch office of E bank | Number of system troubles in a credit association | 15 |
| Long-term stability | July | N branch office of S bank | Number of system troubles in an automatic teller machine | 4 |
| Long-term stability | Early July to mid-July | S branch office of K bank | Number of system troubles in a credit association | 5 |

In the example shown in Table 1, although a scalar value indicating a distance (similarity) is recorded as information on the relationship between the reference factor and the similar factors, the information is not limited thereto. For example, data indicating the similarity between a plurality of factors calculated from a plurality of points of view as a vector or a coordinate may be recorded.

The model proposing part 11 sends the similar factor space data to the information processing apparatus 15*a*, and causes the information processing apparatus 15a to present the similar factors to a user so that the user can select the similar factors (Op14). In this case, it is preferred that the similar factors are presented so that the distance from the reference factor (=factor of a replaced) can be grasped.

Figure 8:
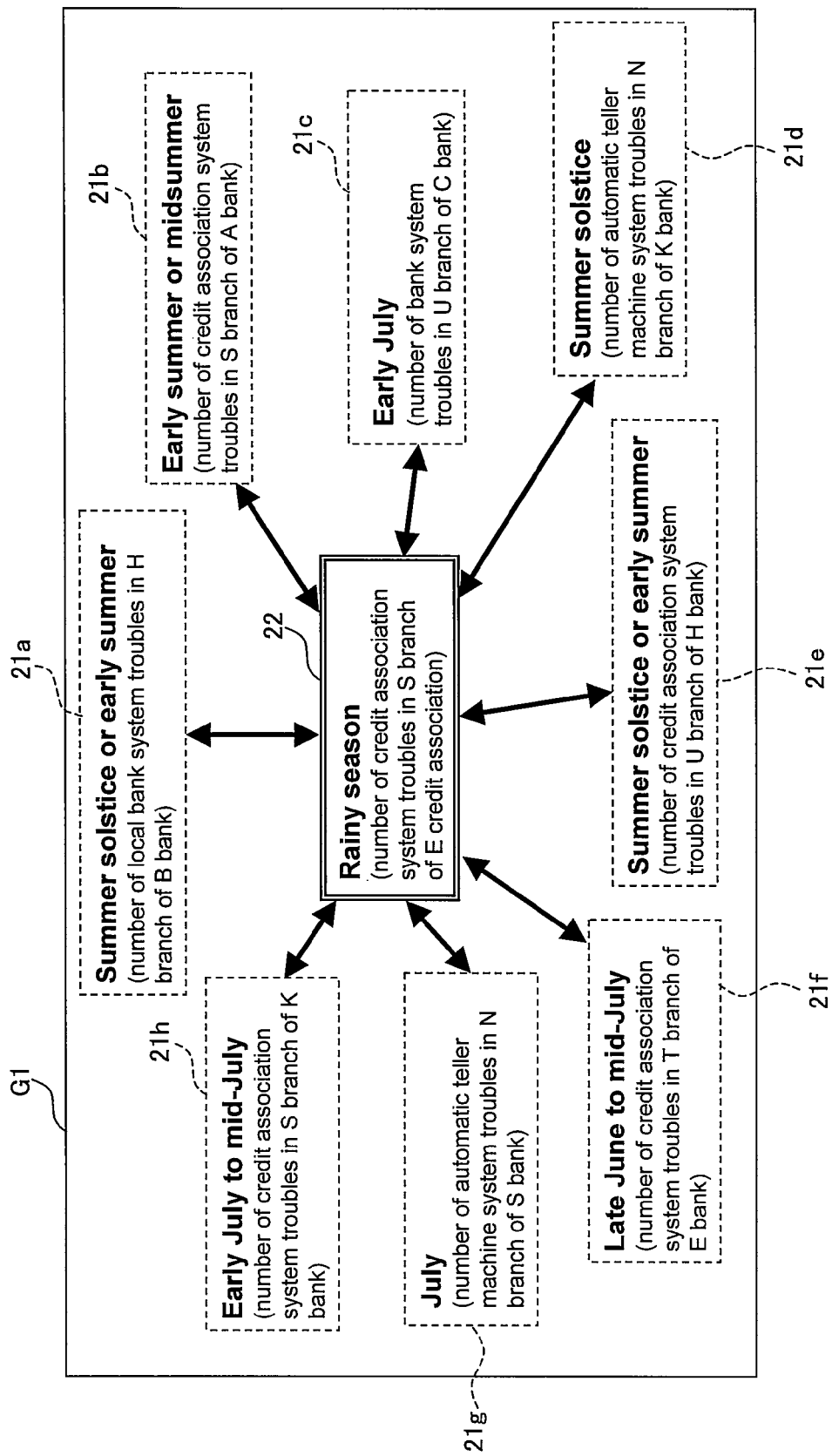
FIG. 8 is a diagram showing an example of a screen display of similar factor space data in an information processing apparatus.

FIG. 8 is a diagram showing a screen display example of the similar factor space data having the contents shown in Table 8 in the information processing apparatus 15a. In the example shown in FIG. 8, a display region 22 of a factor to be replaced is placed in the vicinity of the center of a screen G1, and display regions 21a to 21h of similar factors are placed on the periphery of the display region 22. Arrows connecting the display region 22 of the factor to be replaced to the display regions 21a to 21h of the similar factors have lengths in accordance with distances between factor values. Therefore, the user can grasp the distances between a plurality of similar factors and the factor to be replaced by seeing the screen shown in FIG. 8. Furthermore, the display regions 21a to 21h of the similar factors can be selected by, for example, a cursor.

Furthermore, the similar factor space date may contain data indicating the distance (similarity) between the similar factors. In this case, the model proposing part 11 can determine the positions of the display regions 21a to 21h, also considering the distance between the similar factors. Thus, the distance between the display regions can be set in accordance with the distance between the similar factors. This enables a similar factor with a small distance to be displayed closer to the factor to be replaced, whereby the user can determine a replacement factor easily.

In the case where there are a plurality of factors to be replaced, it is preferred that similar factors are presented on a factor basis so as to be selected. Alternatively, in the case where there are a plurality of factors to be replaced, the model proposing part 11 may repeat the following two processings (1) and (2) with respect to a plurality of factors to be replaced. (1) The similar factor space creating part 91 is caused to generate similar factor space data with one of a plurality of factors as a reference factor. (2) Similar factors are presented to the information processing apparatus 15a so as to allow the user to select the similar factors.

The model proposing part 11 receives data indicating a similar factor selected by the user from the information processing apparatus 15a. Then, a model obtained by replacing the factor to be replaced among the factors included in the existing model by the similar factor selected by the user is created as a replacement model. The replacement model is composed of, for example, data indicating factors after the replacement and data indicating a regression equation utilizing these factors. The model proposing part 11 sends the replacement model to the information processing apparatus 15a as support data (Op15).

Op13, Op14, and Op15 are processings in the case where the model condition data indicates that the replacement is performed on a factor basis. On the other hand, in the case where the model condition data indicates that the replacement is performed on a model basis ("on a model basis" in Op12), the model proposing part 11 instructs the similar model space creating part 92 to create a similar model space with an existing model as a reference model (Op16). Then, the model proposing part 11 receives the similar model space data from the similar model space creating part 92. The similar model space data is, for example, data in which data specifying models similar to the reference model and the distances of the similar models with respect to the reference model are recorded so as to be associated with each other.

The processing of generating the similar model space data by the similar model space creating part 92 has various patterns. Herein, as an example, the case where the creation of a model obtained by changing a part of factors of the reference model is requested will be described briefly. In this case, the similar model space creating part 92 requests the similar factor space creating part 91 to create a similar factor space showing a group of factors similar to a part of the factors. The similar model space creating part 92 creates a plurality of replacement model candidates obtained by replacing a part of the factors in the reference model by similar factors, based on the similar factor space. Then, the model proposing part 11 requests the distance calculating part 8 to calculate the distances (similarities) between the reference model and a plurality of replacement model candidates. Thus, the similar model space creating part 92 obtains information indicating a group of replacement models close to the reference model and the distances thereof to generate similar model space data. The detail of the processing of generating the similar model space data will be described later.

The model proposing part 11 sends the similar model space data indicating the similar models and the distances thereof to the information processing apparatus 15a as support data, and causes the information processing apparatus 15a to present the similar models to the user as replacement models through a display apparatus (not shown) (Op17). At this time, it is preferred to present the similar models so that the distances thereof to the reference model (=existing model) can be grasped. Thus, the user can consider the similarity to the existing model for selecting a replacement model.

Figure 9:
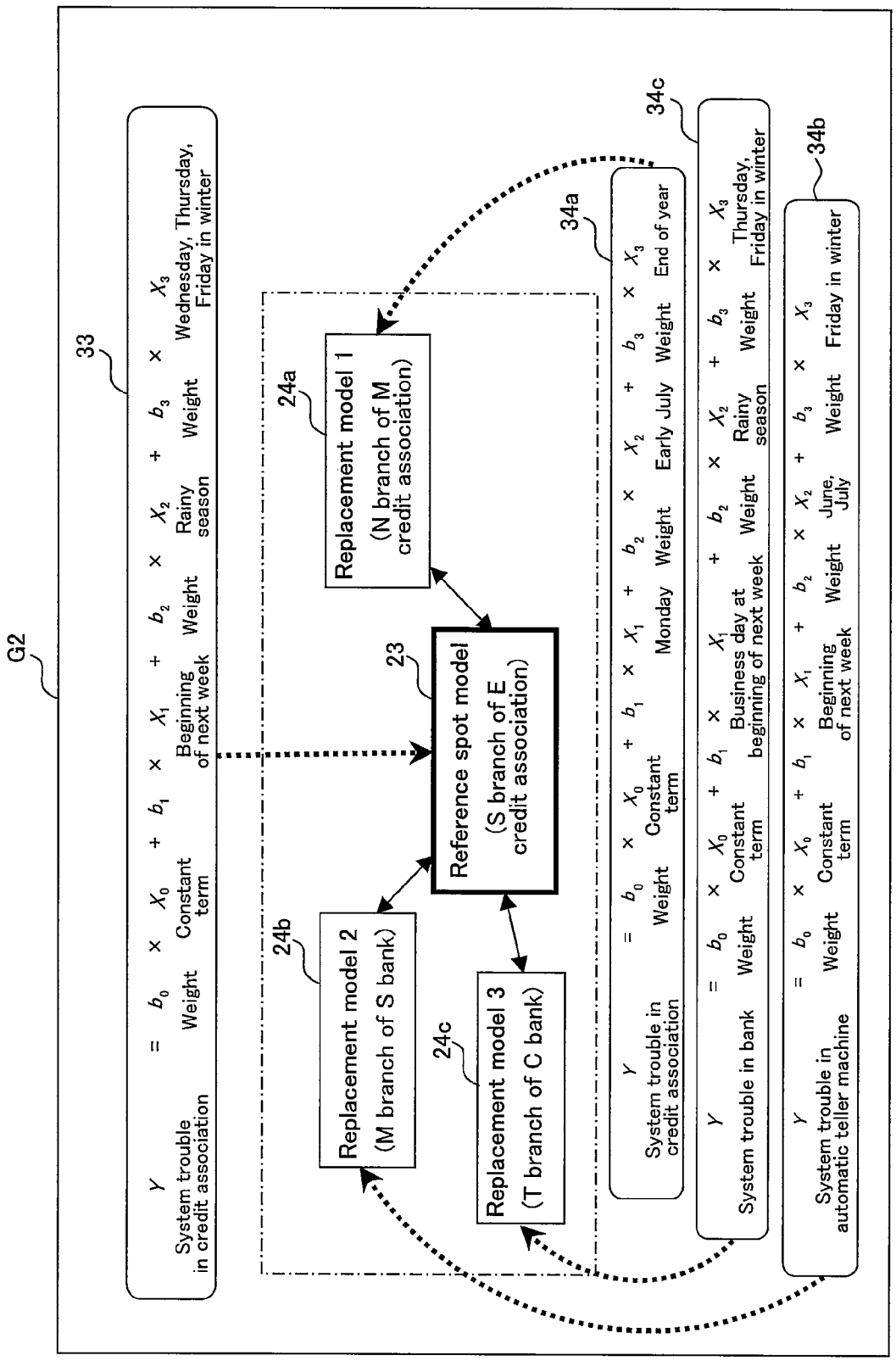
FIG. 9 is a diagram showing an example of a screen display of similar model space data in the information processing apparatus.

FIG. 9 is a diagram showing a screen display example of the similar model space data in the information processing apparatus 15a. In the example shown in FIG. 9, a display region 23 of an existing model is placed in the vicinity of the center of a screen G2, and display regions 24a to 24c of respective similar models (replacement models 1 to 3) are placed on the periphery of the display region 23. Arrows in solid lines connecting the display region 23 of the existing model to the respective display regions 24a to 24c of the similar models have lengths in accordance with distances between models. Furthermore, the display region 23 of the existing model and the display regions 24a to 24c of the replacement models 1 to 3 are connected to a region 33 and regions 34a to 34c showing the contents of the respective models by dotted lines. In the respective regions 33 and 34a to 34c, regression equations of the models, the kinds of target phenomena, and factor names corresponding to respective explanatory variables are displayed. The user seeing the screen shown in FIG. 9 can grasp the distances between the respective replacement models 1 to 3 and the existing model, and the contents of the models.

Due to the processing shown in FIG. 7, support data proposing an appropriate replacement factor or replacement model is output to the information processing apparatus 15a that requests the creation of a replacement model of the existing model. Due to the same processing, a replacement model or a replacement factor with high reasonability is automatically provided to the respective information processing apparatuses 15a to 15c.

The processing of the model proposing part 11 shown in FIG. 7 is an example, and is not limited thereto. The data output to the information processing apparatus 15a as the support data may contain data indicating factor values (a fitting degree enhancement property, long-term stability, commoness, or the like) of the replacement factors in addition to the above.

Furthermore, in Op17, for example, only the similar model closest to the existing model may be output, instead of outputting all the similar models indicated by the similar model space data. This makes the selection operation by the user unnecessary. Similarly, even in Op14 and Op15, only data indicating the similar factor closest to the factor to be replaced may be output as data indicating a replacement factor, instead of outputting all the similar factors so as to allow the user to select.

(Detail of Accumulation Processing: Extraction of an Inner-Model Factor Value)

Figure 10:
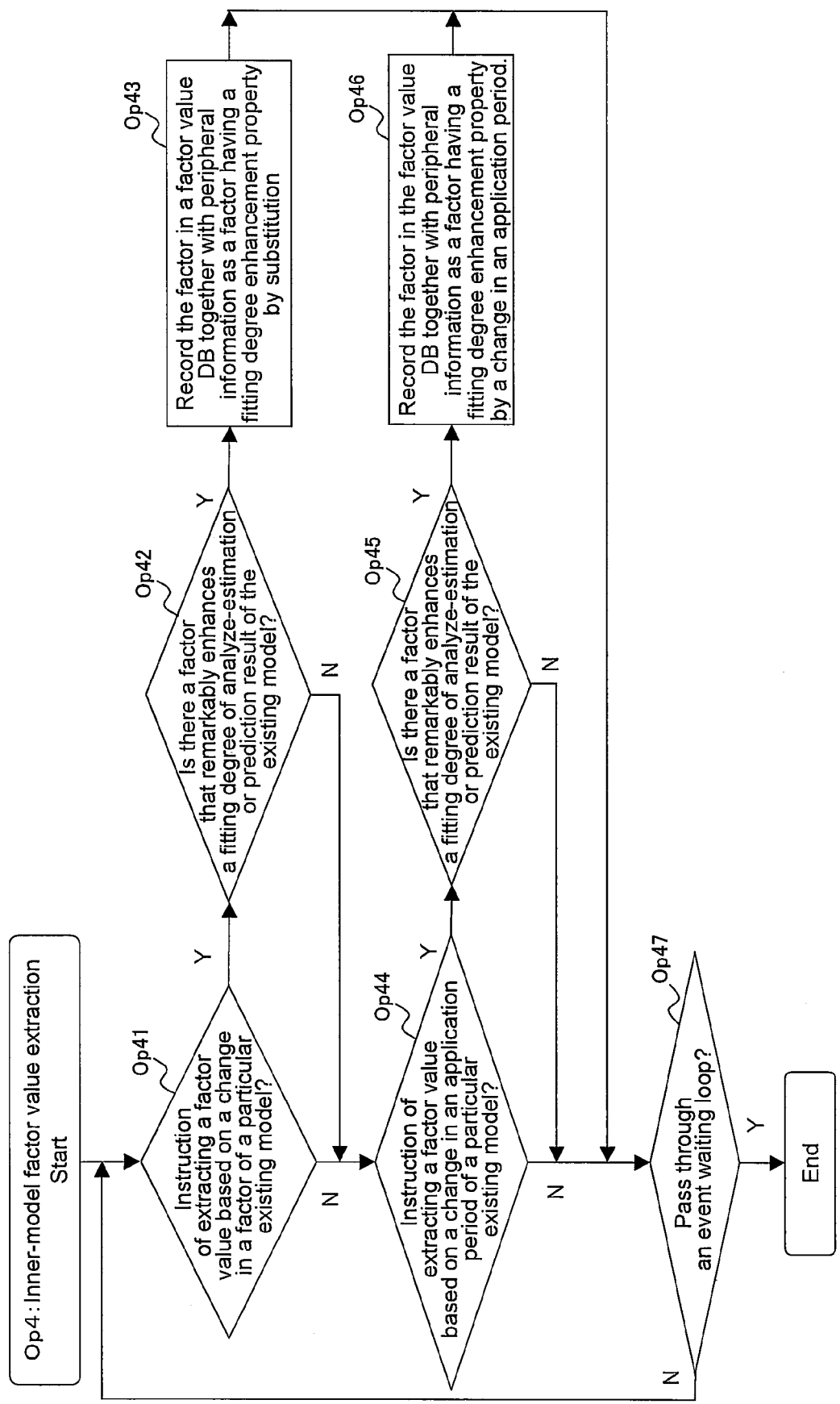
FIG. 10 is a flowchart illustrating an operation example of an inner-model factor value extracting part.

Next, the detail of the accumulation processing of factor value data by the inner-model factor value extracting part 71 will be described. FIG. 10 is a flowchart illustrating an operation example of the inner-model factor value extracting part 71. The processing shown in FIG. 10 is the processing of the inner-model factor value extracting part 71 that receives an instruction from the model managing part 5 in Op4 shown in FIG. 6.

First, the inner-model factor value extracting part 71 receives an instruction of extracting a factor value based on a change in a factor in a particular existing model from the model managing part 5 (Y in Op41). Then, the inner-model factor value extracting part 71 determines whether or not there is a factor that has enhanced a fitting degree of analysis-estimation or a fitting degree of prediction result, compared with those before the change in the existing model (Op42). At this time, the inner-model factor value extracting part 71 acquires information on the models before and after the change in the factor from the model managing part 5. The information on the models contains, for example, the factors included in the models, target phenomena of the models, regression equations, fitting degrees of analysis-estimation or fitting degrees of prediction result before and after the change, and the significance of each factor before and after the change. The detail of the determination processing in Op42 will be described later.

When Yes (Y) is determined in Op42, the inner-model factor value extracting part 71 records the information on the factor that has remarkably enhanced a fitting degree of prediction result or a fitting degree of analysis-estimation in the factor value DB 65 as a factor having a "fitting degree enhancement property by a change in a factor" together with the peripheral information on the factor. As the peripheral information on the factor, for example, information indicating target phenomena of the models before and after the change in the factor, information indicating the models before and after the change, a value showing the degree of a fitting degree enhancement property, and the like are recorded.

Furthermore, when the inner-model factor value extracting part 71 receives an instruction of extracting a factor value based on a change in an application period in a particular existing model from the model managing part 5 (Y in Op44), the inner-model factor value extracting part 71 determines whether or not there is a factor that has enhanced a fitting degree of analysis-estimation or a fitting degree of prediction result, compared with those before the change in the existing model (Op45). At this time, the inner-model factor value extracting part 71 acquires information on the models before and after the change in the factor from the model managing part 5. The detail of the determination processing in Op45 will be described later.

When Yes (Y) is determined in Op45, the inner-model factor value extracting part 71 records information on the factor that has remarkably enhanced a fitting degree of prediction result or a fitting degree of analysis-estimation in the factor value DB 65 as the factor having an "fitting degree enhancement property by a change in an application period" together with the peripheral information on the factor (Op46). As the peripheral information on the factor, for example, information indicating target phenomena of the models before and after the change in the factor, information indicating the model after the change, a value showing the degree of a fitting degree enhancement property, and the like are recorded.

The proceedings in Op41 to Op44 are repeated until an instruction of passing through an event waiting loop is provided from the model managing part 5 (until Y is determined in Op47). Thus, every time an instruction of extracting a factor value is provided by the model managing part 5, a factor having a fitting degree enhancement property by a change in a factor and a factor having a fitting degree enhancement property by a change in an application period are extracted and recorded in the factor value DB 65.

Figure 11:
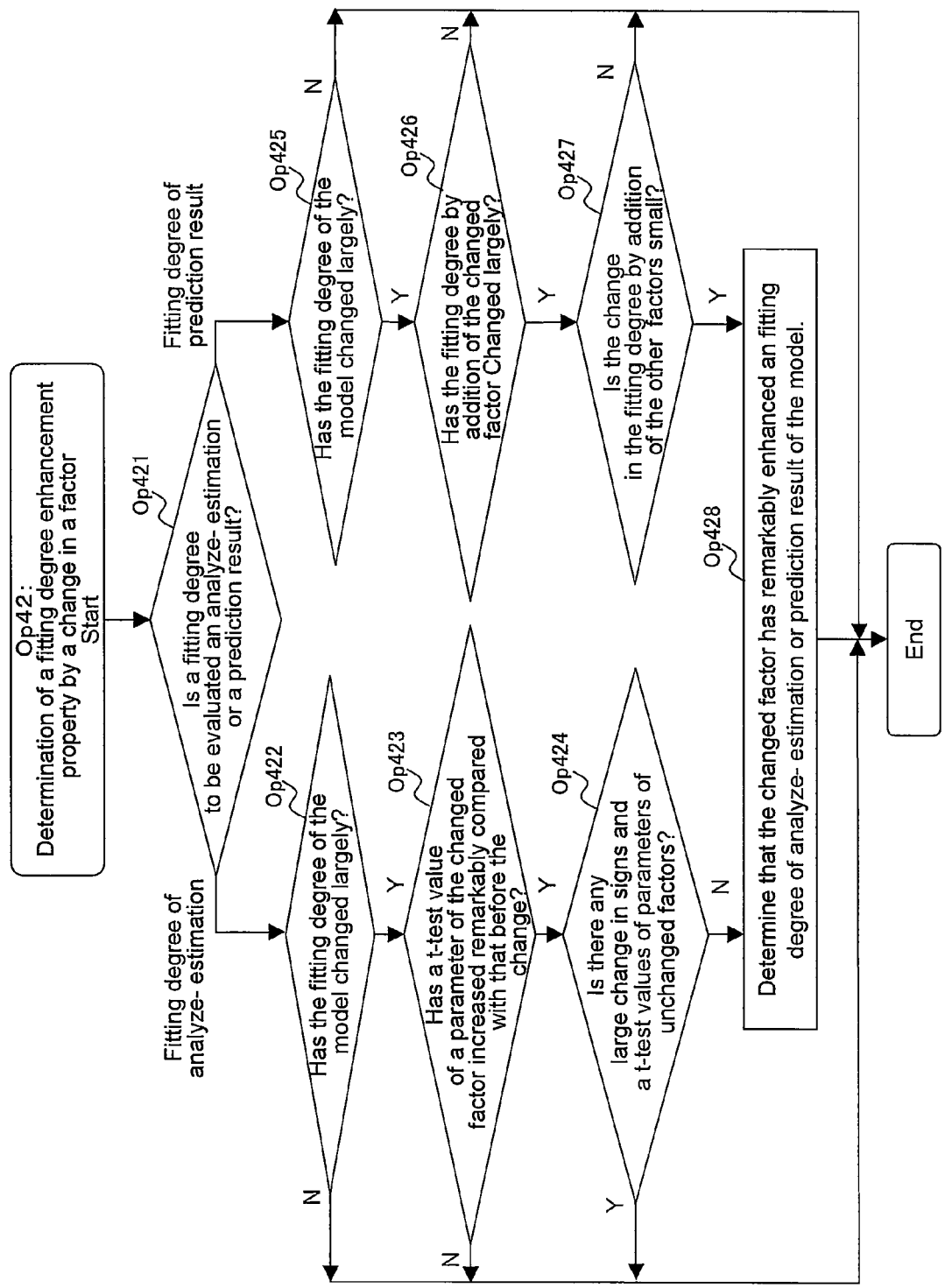
FIG. 11 is a flowchart illustrating the detail of processing in Op42 shown in FIG. 10.

Herein, the detail of the processings in Op42 and Op45 will be respectively described successively. FIG. 11 is a flowchart illustrating the detail of the processing in Op42. In the example shown in FIG. 11, first, the inner-model factor value extracting part 71 determines whether a fitting degree used for evaluating a factor value is a fitting degree of analysis-estimation or a fitting degree of prediction result based on the data acquired from the model managing part 5 (Op421).

In the case where the fitting degree is a fitting degree of analysis-estimation ("fitting degree of analysis-estimation" in Op421), the processings in Op422 to Op424 are performed. First, the inner-model factor value extracting part 71 determines whether or not a fitting degree of analysis-estimation has changed largely before and after the change in the factor of the model (Op422). The inner-model factor value extracting part 71 may receive data indicating a change in a fitting degree of analysis-estimation in the models before and after the change in the factor from the model managing part 5, or may refer to fitting degrees of analysis-estimation corresponding to the respective instance IDs of the models before and after the change, recorded in the model instance DB 63. Whether or not the value of a fitting degree of analysis-estimation has changed largely can be determined based on a predetermined threshold value, for example.

When it is determined that the fitting degree of analysis-estimation has changed largely (Y in Op422), the inner-model factor value extracting part 71 determines whether or not there is a large change in a t-test value of a weight (parameter) of the changed factor (hereinafter, referred to as the changed factor (Op424). The t-test value is an example of data indicating the significance of a factor. The inner-model factor value extracting part 71 may receive a t-test value of each weight from the model managing part 5 or from the model instance DB 63, in the same way as in the fitting degree of analysis-estimation.

When Yes (Y) is determined in Op423, the inner-model factor value extracting part 71 determines whether or not the t-test values of the weights (parameters) of the factors that have not been changed increase remarkably compared with those of the factors before the change (Op424). When No (N) is determined in Op424, the inner-model factor value extracting part 71 determines that the changed factor has remarkably increased the fitting degree of analysis-estimation of the model after the change (Op428). Thus, the factor contributing to the enhancement of the fitting degree of analysis-estimation of the model after the change is extracted.

Specific examples of the processings in Op422 to Op424 will be described. FIG. 12 is a diagram conceptually showing a model before the change in a factor and a model after the change in a factor. In FIG. 12, M1 represents a model before the change in the factor, and M2 represents a model after the change in the factor. In M1 and M2, Y in regression equations is an objective variable, and a target phenomenon thereof is the number of system troubles of a credit association. In the model before the change represented by M1, $\beta_0$ is a weight (parameter) of a constant term $X_0$, and $\beta_1$ to $\beta_3$ are respective weights of explanatory variables $X_1$ to $X_3$. The explanatory variables $X_1$, $X_2$, and $X_3$ respectively represent day factors "beginning of next week", "rainy season", and "Wednesday, Thursday, Friday in winter". Numerical values in parentheses below the respective weights $\beta_1$ to $\beta_3$ show t-test values of the respective weights. The t-test value is an exemplary value showing the significance of each factor.

In the model after the change represented by M2, the factor "rainy season" corresponding to the explanatory variable $X_2$ of the model before the change is changed to "late June to mid-July". Due to the change in the factor, the numerical values of the respective weights $\beta_0$ to $\beta_3$ in M2 also become different from those in M1. Then, the fitting degree of analysis-estimation is enhanced from "0.64" to "0.75". Thus, it can be determined that the fitting degree of analysis-estimation has been enhanced due to the change in the factor of the model. Furthermore, the weight of the factor "late June to mid-July" increases to "+13.2" with respect to the t-test value "+1.8" of the weight of the factor "rainy season". Compared with this change amount "11.4", the change amount of the t-test values of the weights of the other factors "beginning of next week" and "Wednesday, Thursday, Friday in winter" is 0.1 to 0.2, which is ⅕ or less. In such a case, the inner-model factor value extracting part 71 can determine that the enhancement of a fitting degree of analysis-estimation by a change in a factor of a model has occurred due to the factor "late June to mid-July".

In this case, in the factor value DB 65, for example, as in the record D1 shown in FIG. 5, "late June to mid-July (s-012)" as a contribution factor (explanatory variable ID), a "fitting degree enhancement (factor value change)" as an attribute, "m-002" (corresponding to the number of system troubles in S branch office of A credit association: see A2 in FIG. 2) as an objective variable ID, "finance" as a category (field), respective model instance IDs of a model before the change and a model after the change, "2004" as an application period, and "0.11" as enhancement performance are recorded. Herein, the value "0.11" of enhancement performance is a value obtained by calculating a change amount (0.75-0.64) of a fitting degree of analysis-estimation, as an example.

Next, proceedings in Op425 to Op437 in the case where a fitting degree used for evaluating a factor value is determined to be a fitting degree of prediction result in Op421 in FIG. 11 will be described. In this case, first, the inner-model factor value extracting part 71 determines whether or not a fitting degree of prediction result has changed largely before and after the change in the factor of the model (Op425). The inner-model factor value extracting part 71 may receive data indicating fitting degrees of prediction result in the models before and after the change in the factor from the model changing part 5, or may obtain the data from the model instance DB 63.

When it is determined that the fitting degree of prediction result has changed largely (Y in Op425), the inner-model factor value extracting part 71 determines whether or not there is a large change in a fitting degree by addition of the factor that has changed (hereinafter, referred to as a changed factor) (Op426). The fitting degree by addition is an exemplary value showing the significance of a factor. The fitting degree by addition of one factor is obtained by calculating a fitting degree of prediction result of a model with respect to each of the case where a factor is included in a model and the case where the factor is not included in the model, and obtaining a difference between the fitting degrees of prediction result. The inner-model factor value extracting part 71 may receive the fitting degree by addition of each factor before and after the change from the model managing part 5, or may acquire the fitting degree by addition from the model instance DB 63.

When Yes (Y) is determined in Op426, the inner-model factor value extracting part 71 determines whether or not the fitting degrees by addition of the factors that have not been changed increase remarkably compared with those of the factors before the change (Op427). In the case where Yes (Y) is determined in Op427, the inner-model factor value extracting part 71 determines that the changed factor has remarkably increased the fitting degree of prediction result of the model after the change (Op428). Thus, a factor contributing to the enhancement of the fitting degree of prediction result of the model after the change is extracted.

Specific examples of the processings in Op425 to Op427 will be described. FIG. 13 is a diagram conceptually showing a model after the change in a factor and a model after the change in the factor. In FIG. 13, M3 represents a model before the change in the factor, and M4 represents a model after the change in the factor. In M3 and M4, numerical values in parentheses below the respective weights $\beta_1$ to $\beta_3$ show t-test values of the respective weights. In the model after the change represented by M4, the factor "rainy season" corresponding to the explanatory variable $X_2$ of the model before the change represented by M3 is changed to "late June to mid-July". Furthermore, a prediction application period 2005 of the model M3 before the change is 2006 in the model M4 after the change. Then, the fitting degree of prediction result is enhanced from "0.65" to "0.72". The fitting degrees of prediction result are actually measured values in 2005 and 2006 that are respective prediction application periods before and after the change.

The fitting degree by addition of the factor "late June to mid-July" is increased to "0.41" with respect to the fitting degree by addition "0.24" of the factor "rainy season". Compared with this change amount "0.17" of the fitting degree by addition, the change amounts of the fitting degrees by addition of the other factors "beginning of next week" and "Wednesday, Thursday, Friday in winter" are 0.02 to 0.04, which is ⅓ or less. In such a case, the inner-model factor value extracting part 71 can determine that the enhancement of the fitting degree of prediction result by the change in the factor of the model has occurred due to the factor "late June to mid-July".

Figure 14:
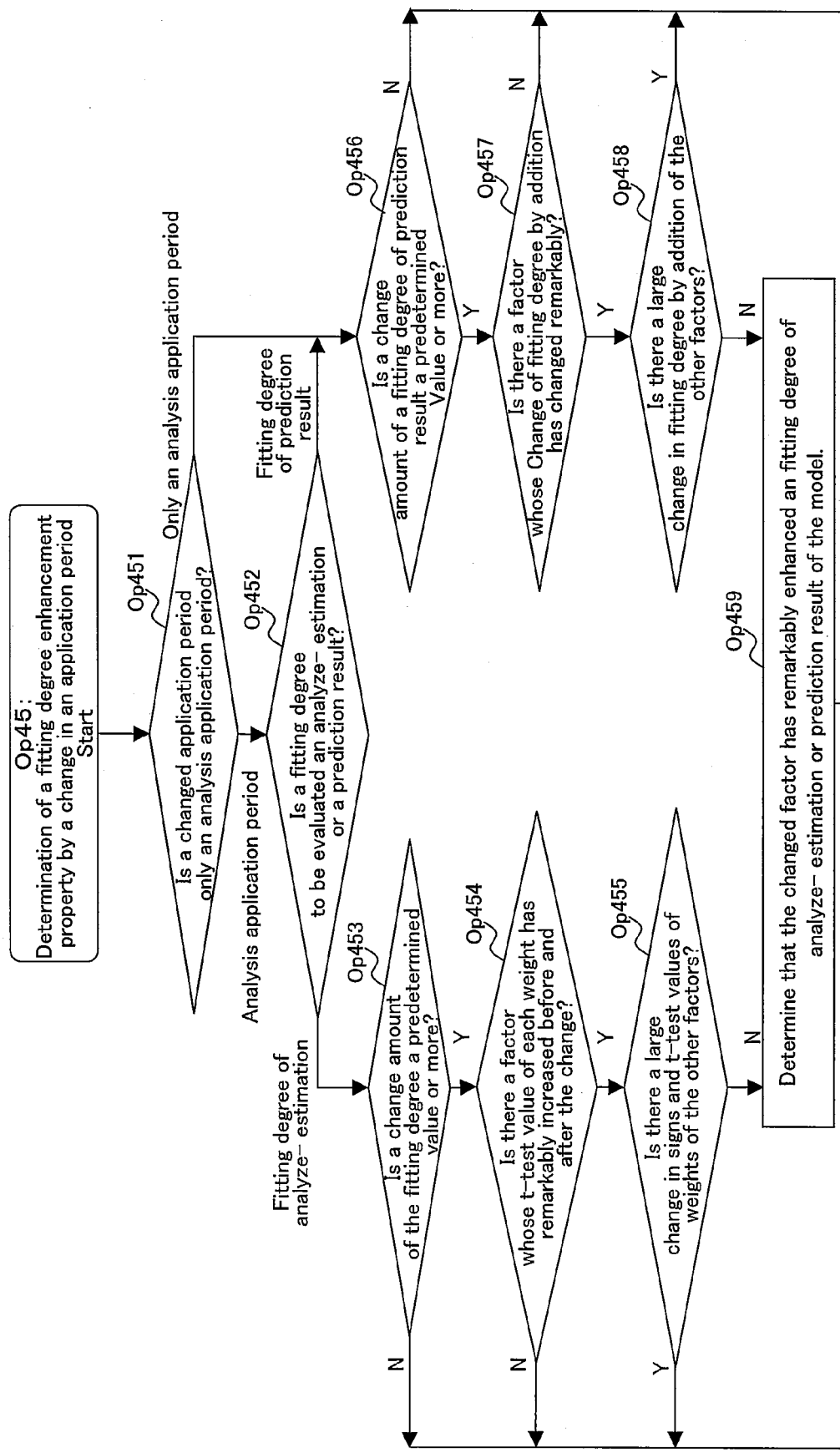
FIG. 14 is a flowchart illustrating the detail of processing in Op45 shown in FIG. 10.

The detail of the processing (extraction processing of a factor contributing to the enhancement of a fitting degree by the change in a factor) in Op42 shown in FIG. 10 is as described above. Due to the above processing shown in FIG. 11, a factor value can be extracted from both points of view of a fitting degree of analysis-estimation and a fitting degree of prediction result. Next, the processing in Op45, i.e., the detail of the extraction processing a factor contributing to the enhancement of a fitting degree by the change in an application period will be described. FIG. 14 is a flowchart illustrating the detail of the processing in Op45.

In the example shown in FIG. 14, first, the inner-model factor value extracting part 71 determines whether or not the changed application period is only a prediction application period based on the data acquired from the model managing part 5 (Op451). In the case where only the prediction application period is changed, the processings in Op456 to Op458 are performed.

On the other hand, in the case where the changed prediction application period is not only the prediction application period, the inner-model factor value extracting part 71 determines whether the fitting degree used for evaluating a factor value is a fitting degree of analysis-estimation or a fitting degree of prediction result based on the data acquired from the model managing part 5 (Op452). In the case of the fitting degree of prediction result, the processings in Op456 to Op458 are performed, and in the case of the fitting degree of analysis-estimation, Op453 to Op455 are performed. Specific examples will be illustrated for the respective cases.

FIG. 15 is a diagram conceptually showing models before and after a change in the case where the analysis application period is changed. In FIG. 15, M5 and M6 respectively show models before and after the change in the case where the analysis application period is changed from 2004 to 2005. In this case, the analysis application periods are different, so that the weights $\beta_0$ to $\beta_3$ of M5 are different from the weights $\beta_0$ to $\beta_3$ of M6, and fitting degrees of analysis-estimation also have different values. The case where the fitting degrees of analysis-estimation are used as fitting degrees to be evaluated will be described below.

In this case, in Op452, it is determined that a fitting degree used for evaluation =an "fitting degree of analysis-estimation". The inner-model factor value extracting part 71 compares the fitting degrees of analysis-estimation "0.64" and "0.72" before and after the change, and determines whether the fitting degree of analysis-estimation has changed by a predetermined value or more (Op453). When the fitting degree of analysis-estimation has changed by a predetermined value or more, a factor whose t-test value of a weight has remarkably increased before and after the change in the application period is extracted (Op454). Herein, for example, a factor "rainy season" of the weight $\beta_2$ whose t-test value has increased by 0.1 or more is extracted.

Furthermore, the inner-model factor value extracting part 71 determines whether or not there is a large change in signs and t-test values of the weights $\beta_1$, $\beta_3$ of the factors "beginning of next week" and "Wednesday, Thursday, Friday in winter" other than the extracted factor (Op455). For example, it can be determined that there is a large change if the sign of the weight has changed or the change amount of the t-test value is 0.07 or more. In the case of No (N) in Op455, the inner-model factor value extracting part 71 determines that the extracted factor "rainy season" is a factor enhancing the fitting degree of analysis-estimation of the model M6, more specifically, the factor having a fitting degree enhancement property due to a change in an application period (Op459).

On the other hand, in FIG. 15, M7 and M8 respectively represent models before and after the change in the application period in the case where the analysis application period is changed from 2004 to 2005, and further, the prediction application period is changed from 2005 to 2006. More specifically, the respective weights $\beta_0$ to $\beta_3$ of the model represented by M7 are calculated based on the actually measured values in 2004 (=an analysis application period, and a predicted value of "the number of system troubles of a credit association" in 2005 (=a prediction application period) of next year is calculated, using a regression equation of the weights $\beta_0$ to $\beta_3$. Similarly, the respective weights $\beta_0$ to $\beta_3$ of the model represented by M8 are calculated based on the actually measured values in 2005 (=an analysis application period), and a predicted value in 2006 (=a prediction application period) of next year is calculated, using a regression equation of the weights $\beta_0$ to $\beta_3$. The fitting degrees of prediction result in M7 and M8 are respectively obtained based on the predicted value and the actually measured value in 2005 and 2006. The case where the fitting degrees of prediction result are used as fitting degrees to be evaluated will be described.

In this case, in Op452, it is determined that a fitting degree used for evaluation="fitting degree of prediction result". The inner-model factor value extracting part 71 compares fitting degrees of prediction result "0.65" and "0.72" before and after the change, and determines whether or not the fitting degree of prediction result has changed by a predetermined value or more (Op456). If the fitting degree of prediction result has changed by a predetermined value or more, a factor whose fitting degree by addition has increased remarkably before and after the change in an application period is extracted (Op457). Herein, for example, a factor "rainy season" whose fitting degree by addition has increased by 0.1 or more is extracted.

In the case of Yes (Y) in Op457, furthermore, the inner-model factor value extracting part 71 determines whether or not there is a large change in fitting degrees by addition of the factors "beginning of next week" and "Wednesday, Thursday, Friday in winter" other than the extracted factor (Op458). For example, it can be determined that there is a large change if the change amount of the fitting degree by addition is 0.05 or more. In the case of No (N) in Op458, the inner-model factor value extracting part 71 determines that the extracted factor "rainy season" is a factor enhancing the fitting degree of prediction result of the model M8, i.e., a factor having a fitting degree enhancement property by a change in an application period (Op459).

FIG. 15 shows an example of the case where an analysis application period has been changed, and FIG. 16 is a diagram showing models before and after a change in the case where only the prediction application period is changed. In FIG. 16, the prediction application period of M9 is 2005, and the prediction application period of M10 is 2006. The analysis application periods of M9 and M10 are both 2004. In this case, the analysis application periods are the same, so that the respective weights $\beta_0$ to $\beta_3$ of M9 have the same numerical values as those of the weights $\beta_0$ to $\beta_3$. In this case, an evaluation is made only with the fitting degree of prediction result, so that the processings (Op456 to Op457) in the case of evaluating the fitting degree of prediction result are performed based on the determination in Op451 in FIG. 14.

The detail of the processing (extraction processing of a factor contributing to the enhancement of a fitting degree by a change in an application period) in Op45 of FIG. 10 is as described above. Due to the above processing shown in FIG. 14, a factor value can be extracted from both points of view: a fitting degree of analysis-estimation and a fitting degree of prediction result.

(Detail of Accumulation Processing: Inter-Model Factor Value Extraction)

Figure 17:
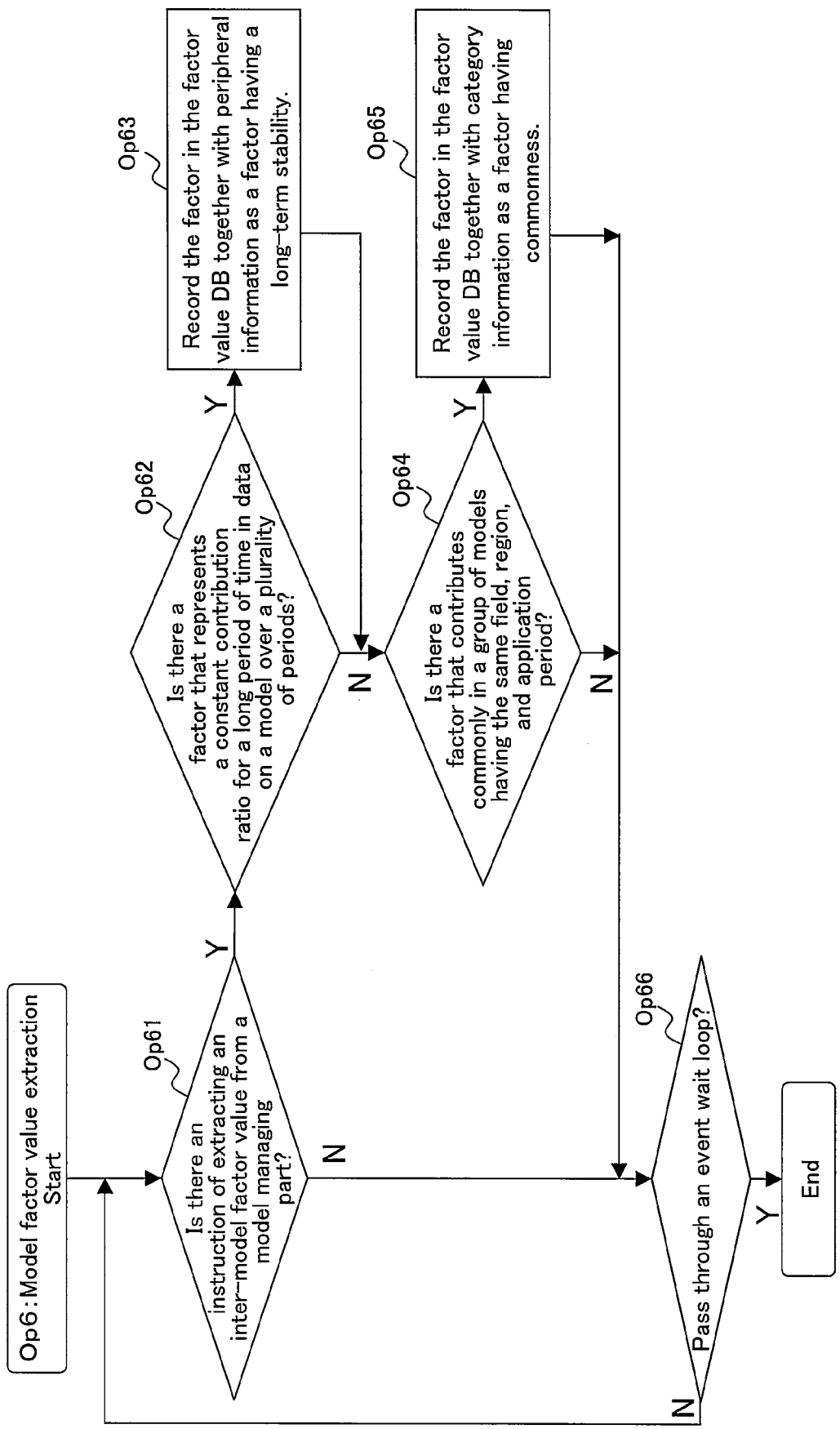
FIG. 17 is a flowchart illustrating an operation example of an inner-model factor value extracting part.

Next, the detail of the accumulation processing of factor value data by the inter-model factor value extracting part 72 will be described. FIG. 17 is a flowchart illustrating an operation example of the inner-model factor value extracting part 71. The processing shown in FIG. 17 is inter-model factor value extraction processing in the case where there is an instruction from the model managing part 5 to the inter-model factor value extracting part 72 in Op6 shown in FIG. 6.

In the example shown in FIG. 17, when receiving an instruction from the model managing part 5 (Y in Op61), the inter-model factor value extracting part 72 determines whether or not there is a factor whose contribution ratio with respect to the fitting degree information of a plurality of models having different application periods with one phenomenon as a target is a predetermined value or more over a plurality of application periods (over a long period of time) (Op62).

The inter-model factor value extracting part 72 can perform the determination based on the data in the model instance DB 63. For example, the inter-model factor value extracting part 72 refers to all the records having the same objective variable ID from the model instance DB 63, and can use a group of factors included in models indicated by the records and the significance of each factor for the above determination. Thus, a factor having high commoness and contributing to the enhancement of a fitting degree in a plurality of models having the same objective variable can be extracted.

When Yes (Y) is determined in Op62, the inter-model factor value extracting part 72 records the factor extracted in Op62 in the factor value DB 65 as the factor having long-term stability together with the peripheral information on the factor (Op63). As the peripheral information on the factor, for example, the information indicating a target phenomenon of models in which the factor contributes to the enhancement of a fitting degree over a long period of time, and a numerical value showing the degree of a fitting degree enhancement property are recorded.

The inter-model factor value extracting part 72 determines whether or not there is a factor contributing to the enhancement of a fitting degree commonly in a plurality of models having the same field, region, and application period (Op64). The inter-model factor value extracting part 72 can perform the determination based on the data in the model instance DB 63 and the objective variable DB 61. For example, the inter-model factor value extracting part 72 acquires an objective variable ID having the same category (field) and category (region) from the objective variable DB 61, and refers to records having the objective variable ID and the same application period from the model instance DB 63. The inter-model factor value extracting part 72 acquires a group of factors included in the models indicated by the records, and the significance of each factor, thereby extracting a factor having high commoness in the models, and contributing to the enhancement of a fitting degree.

When Yes (Y) is determined in Op64, the inter-model factor value extracting part 72 records the factor extracted in Op64 in the factor value DB 65 as the factor having commoness together with the peripheral information on the factor (Op65).

The processings in Op62 to Op65 are repeated until an instruction of passing through an event waiting loop is provided from the model managing part 5 (until Y is determined in Op66). Thus, every time an instruction of extracting an inter-model factor value is provided by the model managing part 5, a factor having long-term stability and a factor having commoness are extracted and recorded in the factor value DB 65.

Figure 18:
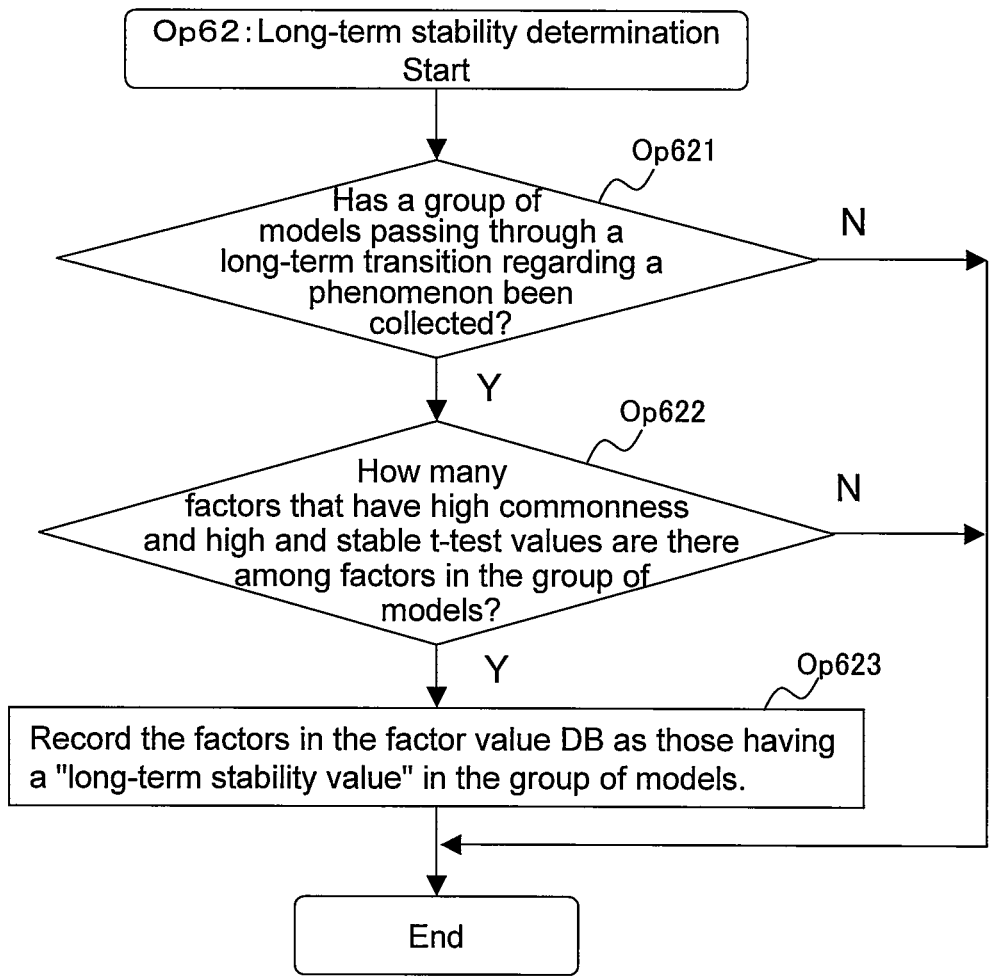
FIG. 18 is a flowchart illustrating a specific example of processing in Op62 shown in FIG. 17.

Next, specific examples of the processing of extracting a factor having long-term stability (Op62) and the processing of extracting a factor having commoness (Op64) will be described successively. FIG. 18 is a flowchart illustrating a specific example of the processing in Op62. In the example shown in FIG. 18, the inter-model factor value extracting part 62 collects a group of models that have been applied for a long period of time with one phenomenon as a target, with reference to the model instance DB 63 (Op621). For example, the inter-model factor value extracting part 72 extracts a plurality of model groups having the same objective variable ID and having different analysis application periods. Then, among the extracted model groups, a model group, in which a total of analysis application periods of the respective models included in the model group is longer than a predetermined value, is determined as the group of models that have been applied for a long period of time.

Figure 19:
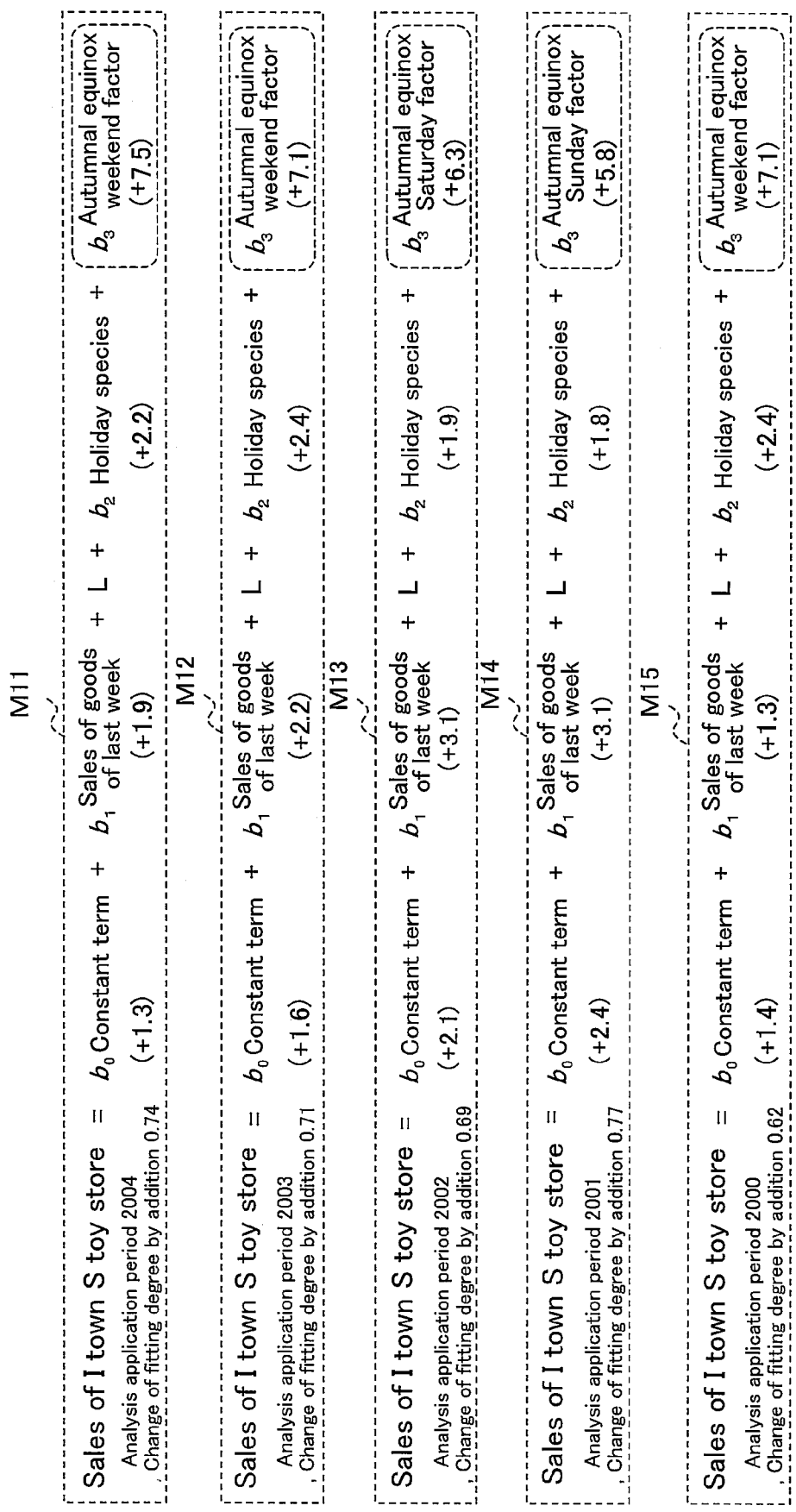
FIG. 19 is a conceptual diagram showing an example of a group of models that have been applied for a long period of time.

FIG. 19 is a conceptual diagram showing an example of such a group of models. In a group of models M11 to M15 shown in FIG. 19, each left side shows a target phenomenon of a model corresponding to an objective variable of a regression equation, and each right side shows factors respectively corresponding to explanatory variables and a constant term of the regression equation. $\beta_0$ to $\beta_3$ represent the respective weights of the constant terms and the explanatory variables. Furthermore, under each objective variable, an analysis application period and a fitting degree of analysis-estimation are described, and under each term on the right side, a t-test value of each of the weights $\beta_0$ to $\beta_3$ is described.

In the group of models M11 to M15, "sales of I town S toy store" is set to be a target phenomenon (objective variable), and analysis application periods are different from each other: 2000, 2001, 2002, 2003, and 2004.

The inter-model factor value extracting part 72 extracts a factor which has commoness and whose t-test value is stable at a predetermined level or more among the group of models M11 to M15 (Op622 in FIG. 18). Herein, whether or not the commoness of a factor is high is determined, for example, based on a ratio at which models including the factor occupy in the extracted group of models M11 to M15. Whether or not the t-test value of the factor is stable at a predetermined level or more is determined, for example, based on whether or not the t-test value of the factor is always equal to or more than a predetermined threshold value. Furthermore, it may be determined that the t-test value of the factor is stable at a predetermined level or more in the case where the sign (positive/negative) of a coefficient of the factor is constant, and the absolute value of a t-value is not below a predetermined high value. The inter-model factor value extracting part 72 records the factor extracted in Op623 in the factor value DB 65 as the factor having long-term stability (Op623).

Herein, in the example shown in FIG. 19, a group of factors having a high inter-factor similarity among factors included in the group of models M11 to M15 can also be dealt with as the same factor. In the example shown in FIG. 19, factors "autumnal equinox weekend factor", "autumnal equinox Saturday factor", and "autumnal equinox Sunday factor" have a high similarity, so that they may be used as the same factor. The calculation of a similarity between factors will be described later.

In this case, for example, assuming that the threshold value of a t-test value is 5, the group of the factor "autumnal equinox weekend factor", and the factors "autumnal equinox Saturday factor" and "autumnal equinox Sunday factor" which are dealt with as the same factors as the "autumnal equinox weekend factor" has t-test values that always exceed the threshold value. Therefore, these factors are extracted in Op 622. Furthermore, the other factors "sales of goods of last week" and "holiday factor" are not extracted since the t-test values do not exceed 5 although they have commoness.

Therefore, the inter-model factor value extracting part 72 records the extracted factors "autumnal equinox weekend factor", "autumnal equinox Saturday factor", and "autumnal equinox Sunday factor" in the factor value DB 65 as the factor having long-term stability.

In the factor value DB 65, for example, as in the record D3 shown in FIG. 5, "autumnal equinox weekend factor, autumnal equinox Saturday factor, autumnal equinox Sunday factor (s-031, s-101, s-017)" as contribution factors (explanatory variable IDs), "long-term stability" as an attribute, "m-006" as an objective variable ID (objective variable ID of sales of I town S toy store", "retail" as a category (field), an instance ID of a typical model, "2000 to 2004" as an applicable period, and "0.78" as an average fitting degree are recorded. The average fitting degree "0.78" can be set to be, for example, an average value of fitting degrees of analysis-estimation of models in the applicable period of 2000 to 2007. Furthermore, the numerical value indicating the performance degree of long-term stability also includes, for example, an average t-value of the respective contribution factors without being limited to an average fitting degree.

Furthermore, the typical model can be set to be the model M11 having a highest t-test value of the factors "autumnal equinox weekend factor, autumnal equinox Saturday factor, autumnal equinox Sunday factor" among a plurality of models M11 to M15 in which the factors contribute to the enhancement of a fitting degree commonly.

Figure 20:
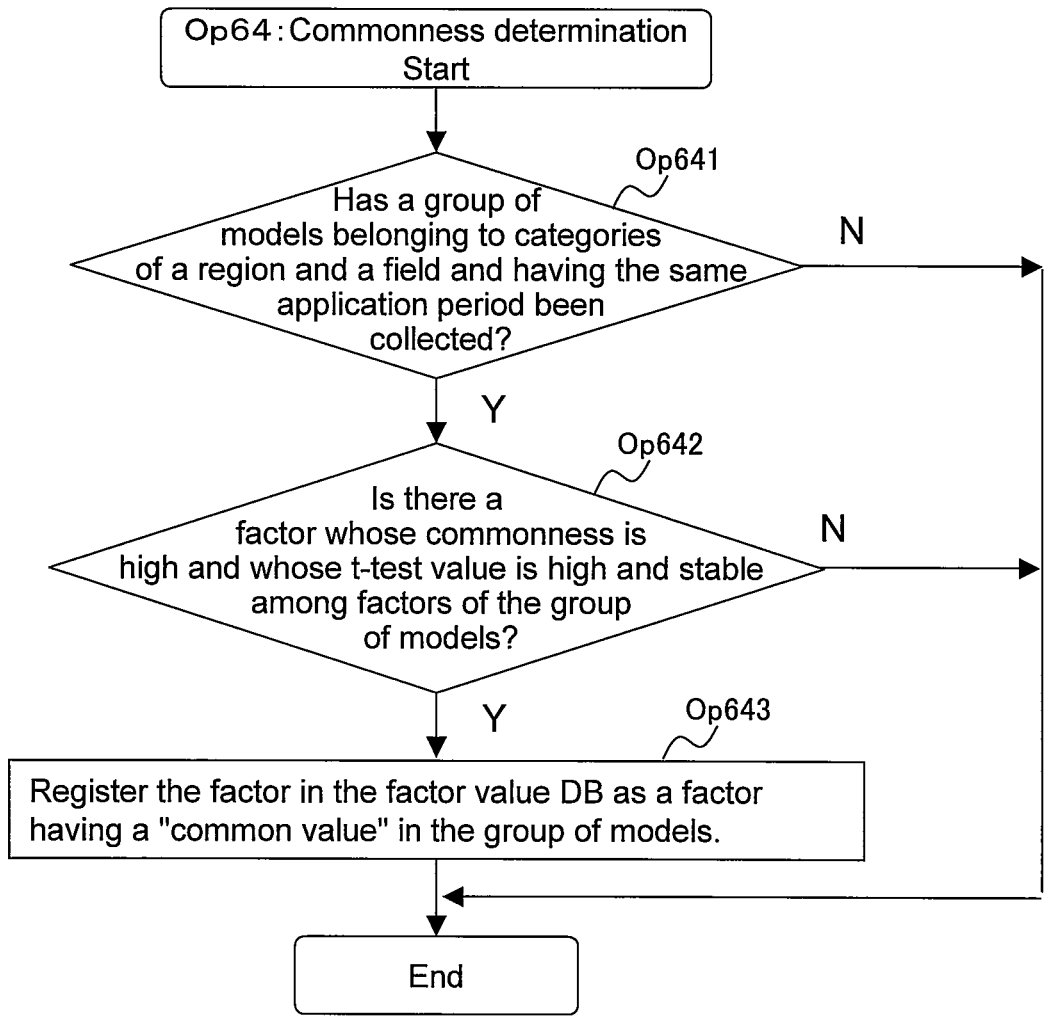
FIG. 20 is a flowchart illustrating a specific example of processing in Op64 shown in FIG. 17.

Next, a specific example of the processing (Op64 in FIG. 17) of extracting a factor having commoness will be described. FIG. 20 is a flowchart illustrating a specific example of the processing in Op64. In the example shown in FIG. 20, the inter-model factor value extracting part 72 first acquires a group of objective variable IDs having the same category (field) and category (region), with reference to the objective variable DB 61. The inter-model factor value extracting part 72 extracts records of a group of models having objective variables represented by the group of objective variable IDs and having the same application period from the model instance DB 63. Thus, the records of a group of models belonging to the same field and region and having the same application period are collected (Op641).

Figure 21:
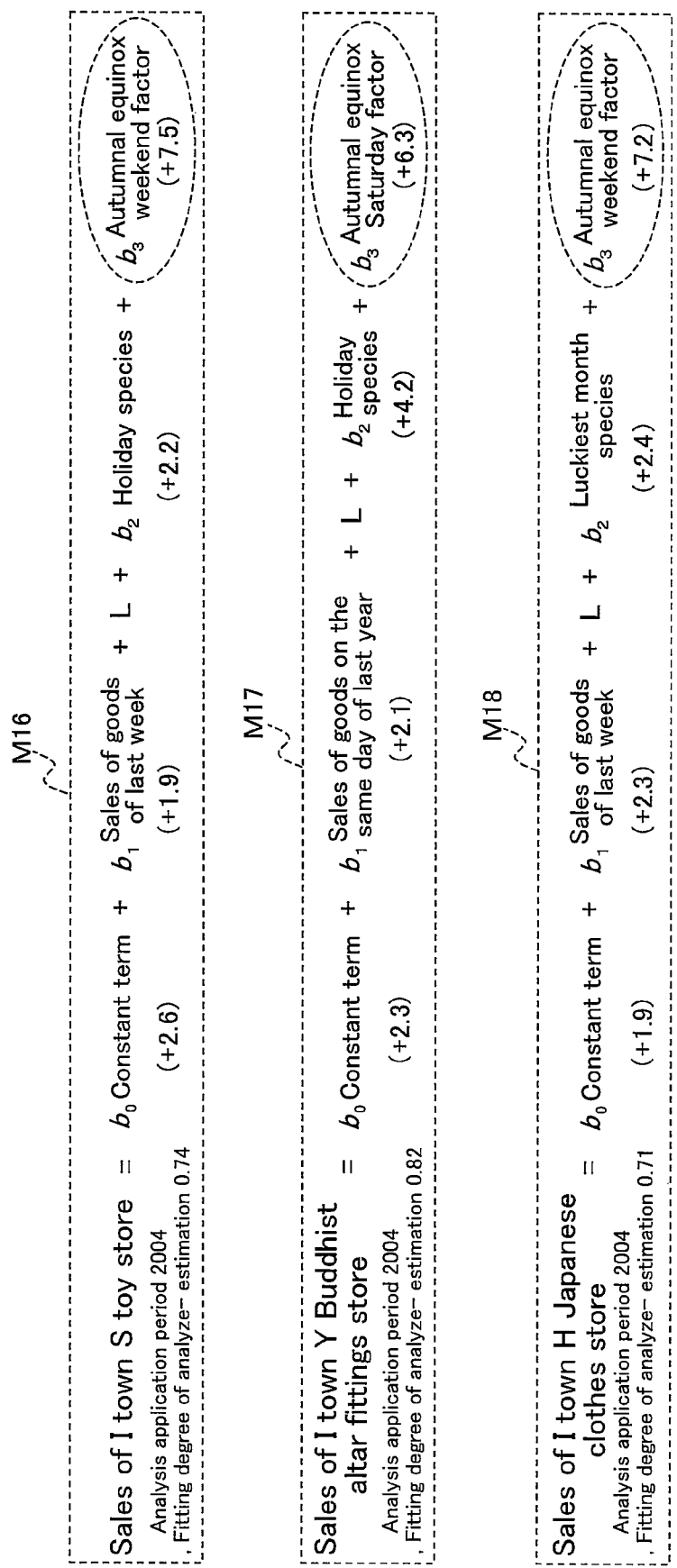
FIG. 21 is a conceptual diagram showing an example of a group of models applied in the same period.

FIG. 21 is a conceptual diagram showing an example of such a group of models. In the group of models M16 to M18 shown in FIG. 21, each left side shows a target phenomenon of a model corresponding to an objective variable of a regression equation, and each right side shows factors respectively corresponding to explanatory variables and a constant term of the regression equation. $\beta_0$ to $\beta_3$ represent respective weights of the constant term and the explanatory variables. Furthermore, under each objective variable, an analysis application period and a fitting degree of analysis-estimation are described, and under each term on the right side, a t-test value of each of the weights $\beta_0$ to $\beta_3$ is described.

In the models M16, M17, and M18, "sales of I town S toy store", "sales of I town Y Buddhist altar fittings store", and sales of I town H Japanese clothes store" are respectively set to be target phenomena. The phenomena belong to the same category (region) "I town" and the same category (field) (private management). Furthermore, each analysis application period of the group of models M16 to M18 is 2004.

Herein, although a group of models having the same field, region, and application period are collected, a group of models to be collected are not limited thereto. For example, in the case where the inter-model factor value extracting part 72 desires to extract a group of models having commoness over a certain field, the inter-model factor value extracting part 72 can collect a group of models having an objective variable of a category (field) without limiting a region and an application period.

The inter-model factor value extracting part 72 extracts a factor whose commoness is high and whose t-test value is stable at a predetermined level or more (for example, a predetermined threshold value or more), among such a group of models M16 to M18 (Op642 in FIG. 20). The inter-model factor value extracting part 72 records the extracted factor in the factor value DB 65 as a factor having a "common value".

Thus, a factor having high commoness can be found in a group of models having the same field, region, and application period, for example.

Herein, in the example shown in FIG. 21, a group of factors having a high inter-factor similarity among the factors included in a group of models M16 to M18 can also be dealt with as the same factor. In the example shown in FIG. 21, since the factors "autumn equinox weekend factor" and "autumn equinox Saturday factor" have a high similarity, so that they may be used as the same factor.

In this case, for example, assuming that the threshold value of a t-test value is 5, a group of the factor "autumn equinox weekend factor" and the factor "autumn equinox Saturday factor" which is dealt with as the same factor as the "autumn equinox weekend factor" has t-test values that always exceed the threshold value. Therefore, these factors are extracted in Op642. Furthermore, although the factor "sales of goods of last week" has commoness, the t-test value thereof does not exceed 5, so that this factor is not extracted. "Holiday factor" and "luckiest day factor" have no commoness.

The inter-model factor value extracting part 72 records the extracted factors "autumn equinox factor" and "autumn equinox Saturday factor" in the factor value DB 62 as the factors having commoness.

In the factor value DB 65, for example, as in the record D4 shown in FIG. 5, "autumn equinox weekend factor, autumn equinox Saturday factor (s-031, s-101)" as contribution factors (explanatory variables IDs), "commonness" as an attribute, "m-006, m-043, m-0462" (respective objective variable IDs of sales of I town S toy store, Y Buddhist altar fittings store, and H Japanese clothes store) as objective variable IDs, "private management" as a category (field), an instance ID of a typical model, the number of adopted spots "351", a field adoption ranking "1st place" and an average fitting degree "0.78" are recorded. As the number of adopted spots, the number of models including the factors, for example, among a group of models extracted in Op641 can be used. In order to calculate a field adoption ranking, the inter-model factor value extracting part 72 acquires, for example, an objective variable ID that is a category (field)="private management" in the objective variable DB 61, and matches the record including the objective variable ID with the model instance DB 63, whereby, the number of adoptions of the factors "autumn equinox weekend factor" and "autumn equinox Saturday factor" in the field can be obtained.

(Detail of Model Creation Processing: Similar Factor Space Creation Processing)

Figure 22:
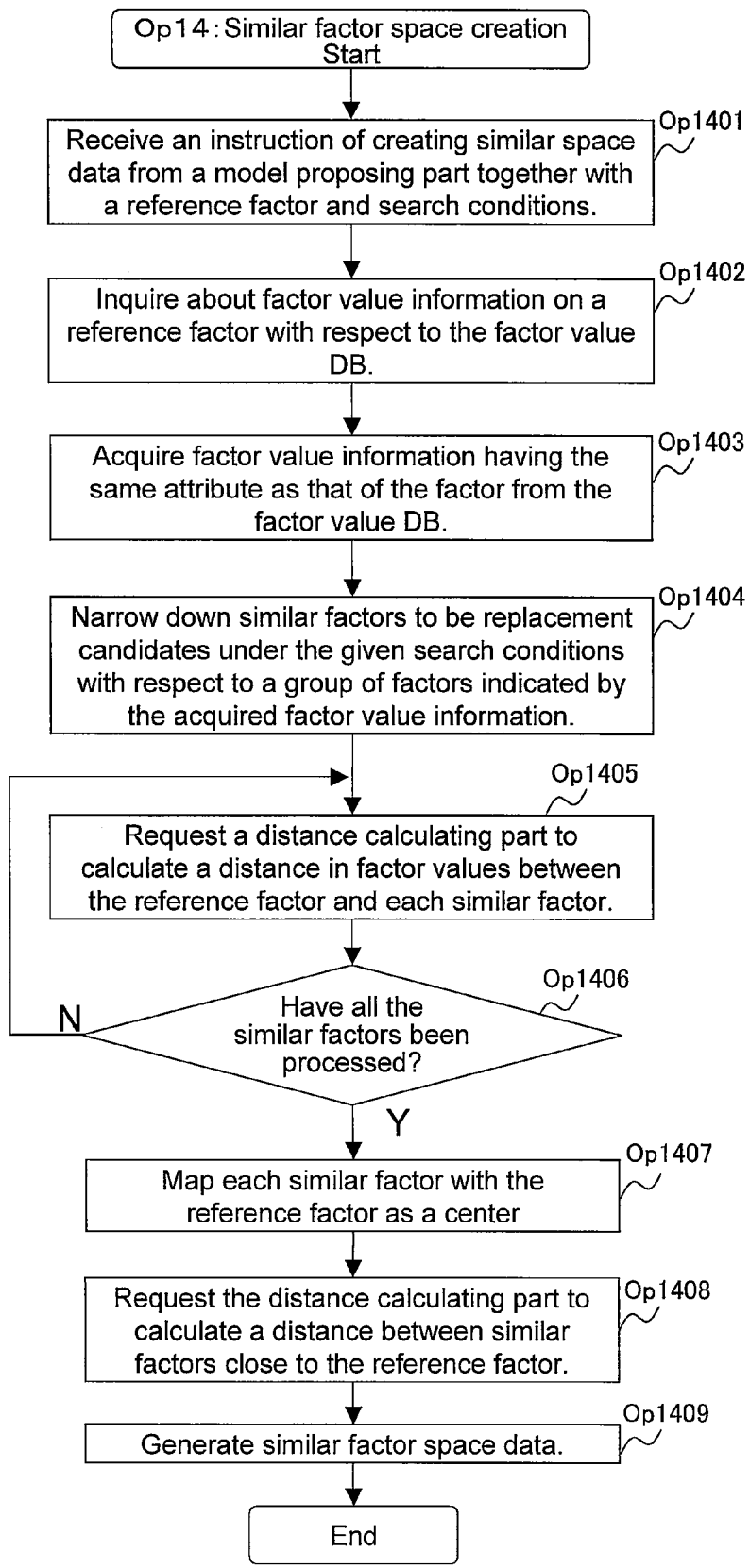
FIG. 22 is a flowchart illustrating an example of processing of creating similar factor space data.

Next, a specific example of the processing will be described in which the similar factor space creating part 91 receives an instruction from the model proposing part 11, and creates similar factor space data. FIG. 22 is a flowchart illustrating an example of the processing in which the similar factor space creating part 91 creates similar factor space data. The processing shown in FIG. 22 is the processing of the similar factor space creating part 91 that has received an instruction from the model proposing part 11 in Op13 in FIG. 7.

First, the similar factor space creating part 91 receives a reference factor and search conditions together with an instruction of creating similar factor space data from the model proposing part 11 (Op1401). The search conditions include, for example, data indicating a range in which similar factors are searched for. The instruction of creating similar factor space data may be provided by, for example, the similar model space creating part 92, instead of the model proposing part 11.

The similar factor space creating part 91 inquires about the information indicating a factor value of the reference factor with respect to the factor value DB 65. Herein, as an example, the case where the reference factor is a day factor indicating "beginning of next week" will be described. For example, in the case where the factor "beginning of next week" is recorded as the factor having long-term stability in the factor value DB 65, the similar factor space creating part 92 acquires data indicating an attribute "long-term stability" of the factor value and data indicating the enhancement of performance thereof as factor value information.

The similar factor space creating part 91 acquires information indicating a group of factors having the same attribute as that of the acquired factor value of the reference factor from the factor value DB 65 (Op1403). Herein, a group of factors having the attribute "long-term stability" of the factor value is acquired. Then, the similar factor space creating part 91 narrows down the factors to be replacement candidates based on the search conditions received in Op1401 from the group of factors (Op1404). Hereinafter, the factors that have been narrowed down will be referred to as similar factors.

After that, the distance calculating part 8 is requested to calculate a distance in factor values between the reference factor and each similar factor (Op1405). The distance between the factor values is, for example, a numerical value showing the similarity in a degree of contribution to the enhancement of a fitting degree between two factors. An example of a calculation of the distance between the factor values by the distance calculating part 8 will be described later. The calculation of a distance in factor values between the factor and the reference factor by the distance calculating part 8 is repeated over the whole similar factors narrowed down in Op1404 (Op1406).

The similar factor space creating part 91 maps the similar factors in a virtual space based on the distance between the factor values calculated by the distance calculating part 8 (Op1407). For example, the similar factor space creating part 91 can place the respective similar factors in a two-dimensional virtual space, with the position of the reference factor as an origin. At this time, the similar factor space creating part 91 causes the distance calculating part 8 to calculate a distance between similar factors, regarding those which have a distance from the reference factor in a predetermined range (Op1408). The distance calculated herein may be a distance between factor values or a distance $d_f$ between the factors.

Table 2 shows an example of a distance between similar factors calculated by the similar factor space creating part 91. In Table 2, "rainy season" is a reference factor, and the other factors are a group of similar factors. The group of similar factors correspond to the group of similar factors shown in Table 1.

TABLE 2

| Factor name | ID | Rainy season 22 | Summer solstice or early summer 21a | Early summer or midsummer 21b | Early July 21c | Summer solstice 21d | Summer solstice or early summer 21e | Late June to mid-July 21f | July 21g | Early July to mid-July 21h |
|---|---|---|---|---|---|---|---|---|---|---|
| Rainy season | 22 | 0 | 24 | 43 | 43 | 43 | 46 | 25 | 43 | 37 |
| Summer solstice or early summer | 21a | 24 | 0 | 41 | 53 | 65 | 49 | 60 | 47 | 40 |
| Early summer or midsummer | 21b | 43 | 41 | 0 | 25 | 46 | 55 | 86 | 80 | 79 |
| Early July | 21c | 43 | 53 | 25 | 0 | 22 | 41 | 80 | 78 | 84 |
| Summer solstice | 21d | 43 | 65 | 46 | 22 | 0 | 33 | 71 | 77 | 87 |
| Summer solstice or early summer | 21e | 46 | 49 | 55 | 41 | 33 | 0 | 38 | 42 | 56 |
| Late June to mid-July | 21f | 25 | 60 | 86 | 80 | 71 | 38 | 0 | 22 | 46 |
| July | 21g | 43 | 47 | 80 | 78 | 77 | 42 | 22 | 0 | 41 |
| Early July to mid-July | 21h | 37 | 40 | 79 | 84 | 87 | 56 | 46 | 41 | 0 |

The similar factor space creating part 91 can place the similar factors in a virtual space in accordance with the distance between each similar factor and the reference factor calculated in Op1405 and the distance between the similar factors as shown in Table 2. For example, a distance of each similar factor from the origin in the virtual space is determined, for example, in accordance with the distance from the reference factor calculated in Op1405. Then, the positional relationship on the relative virtual space between the similar factors is determined so as to keep the distance between the similar factors shown in Table 2. Thus, the arrangement of the similar factors in the two-dimensional virtual space is determined. When the distance between the respective similar factors in Table 2 is reflected to the virtual space, for example, the respective similar factors are arranged as shown in FIG. 8. Similar factor space data indicating the arrangement of similar factors on the virtual space thus determined is generated (Op1409). As shown in Table 1, the data on a group of similar factors contains information on a target phenomenon of a model including each similar factor, a common factor value, the names of the similar factors, the distance from the reference factor (distance between the factor values), and the like. Furthermore, the data on the group of similar factors may contain data indicating the distance between similar factors as shown in Table 2. The similar factor space creating part 91 returns the data to the model proposing part 11 as similar factor space data.

Thus, due to the processing shown in FIG. 22, information on a group of factors that have the same factor value as that of the reference factor and that are close to the reference factor is obtained. Consequently, information indicating similar factors that can contribute to the enhancement of a fitting degree of a model of the reference factor is obtained. The similar factor space data is not limited to the above example, and the similar factor space data may contain any of the other information, as long as the data contains information indicating similar factors and information indicating the distance in factor values between each similar factor and the reference factor. Furthermore, the processing of creating a similar factor space is not limited to the example shown in FIG. 22, either. For example, in the example shown in FIG. 22, the processing of narrowing down similar factor based on the distance in factor values between each similar factor and the reference factor may be further performed.

(Distance Calculation: Example of Distance Calculation Between Factor Values)

Figure 23:
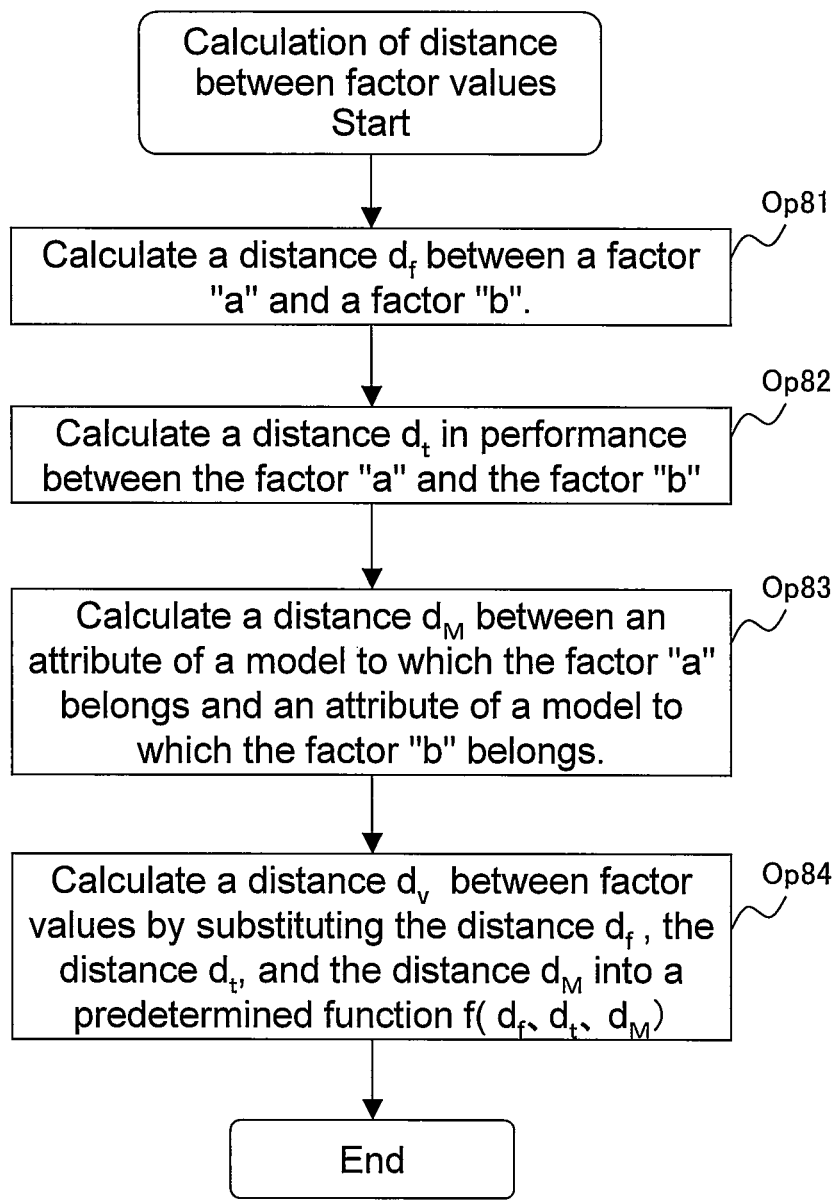
FIG. 23 is a flowchart of the calculation of a distance $d_v$ between factor values of a factor "a" and a factor "b".

Herein, an example of calculation of a distance between two factor values by the distance calculating part will be described. FIG. 23 is a flowchart illustrating an operation example of calculating a distance $d_v$ in factor values between a factor "a" and a factor "b". The distance calculating part 8 first calculates the distance $d_f$ between the factor "a" and the factor "b" (Op81).

The distance $d_f$ shows, for example, to which degree the numerical values of explanatory variables corresponding to the respective factors are matched. Specifically, the distance $d_f$ can be expressed by a correlation of numerical values of explanatory variables, as in an example described later.

Furthermore, the distance calculating part 8 calculates a distance $d_t$ in performance between the factor "a" and the factor "b" (Op82). The distance $d_t$ shows, for example, to which degree the numerical values showing the significance of the respective factors are matched. The specific example thereof will be described later.

Furthermore, the distance calculating part 8 calculates a distance $d_M$ in model attributes between the model to which the factor "a" belongs and the model to which the factor "b" belongs (Op83). The distance $d_M$ between model attributes is a numerical value showing the similarity between the attribute of the model of the factor "a" and the attribute of the model of the factor "b". The attribute of the model includes, for example, an objective variable of the model, explanatory variables thereof, an application period thereof, and a fitting degree thereof. The distance $d_M$ between model attributes is calculated respectively for these attributes. The information indicating the attributes of the models which the factors "a" and "b" belong to can be acquired from the model instance DB 63 based on the respective instance IDs of the factors "a" and "b" recorded in the factor value DB 65.

The distance calculating part 8 obtains the distance $d_v$ in factor values between the factor "a" and the factor "b" by substituting the above distances $d_f$, $d_t$, and $d_M$ into a previously incorporated function $f(d_f, d_t, d_M)$ (Op84). The function $f(d_f, d_t, d_M)$ calculates a distance incorporating the distances $d_f$, $d_t$, and $d_M$ totally, and is not particularly limited. As an example, the function f can be represented by the following Expression (4) or (5). In the following Expressions (4) and (5), $K_f$, $K_t$, and $K_M$ are coefficients showing the respective weights of the distances $d_f$, $d_t$, and $d_M$.

$$K_f \cdot d_f + K_t \cdot d_t + K_M \cdot d_M \quad (4)$$

$$\{(K_f \cdot d_f)^2 + (K_t \cdot d_t)^2 + (K_M \cdot d_M)^2\}^{1/2} \quad (5)$$

Hereinafter, a specific example of the calculation of the above distances $d_f$, $d_t$, and $d_M$ will be described. Herein, an example will be described in the case where factors "rainy season" and "late June to mid-July" in the models represented by M1 and M2 in FIG. 12 are respectively the factors "a" and "b".

The distance calculating part 8 can calculate the distance $d_f$ between the factors, for example, by the following Expression (6).

$$d_f = 1-(\text{square of correlation coefficient of explanatory variable of factor "a" and explanatory variable of factor "b"}) \quad (6)$$

Expression (6) corresponds to the following Expression (7) in the present example.

$$d_f = 1-(\text{square of correlation coefficient of vector of "rainy season" and vector of "late June to mid-July"}) \quad (7)$$

The following Table 3 shows examples of element values in the case where the explanatory variables of these factors "rainy season" and "late June to mid-July" are expressed by vectors. The values of the explanatory variables of the factors "a" and "b" are, for example, recorded in a record C100 of an element value table of the explanatory variable DB 62 shown in FIG. 4.

TABLE 3

|  | Rainy season | Mid-June to Mid-July |
|---|---|---|
| January 1 | 0 | 0 |
| • | 0 | 0 |
| • | 0 | 0 |
| June 1 | 0 | 0 |
| • | 0 | 0 |
| June 8 | 1 | 0 |
| • | 1 | 0 |
| June 10 | 1 | 1 |
| • | 1 | 1 |
| July 20 | 1 | 1 |
| • | 0 | 0 |
| July 31 | 0 | 0 |
| • | 0 | 0 |
| • | 0 | 0 |
| December 31 | 0 | 0 |
| Total applicable days | 43 | 36 |

The distance calculating part 8 calculates a correlation of respective vectors of "rainy season" and "mid-June to mid-July" having the element values shown in the above Table 3, thereby calculating the above Expression (7). As a result, Distance $d_f = 1 - 0.9216 = 0.09784$ is obtained. The distance $d_f$ thus calculated has a value from 0 to 1, and as the value is smaller, the distance becomes smaller.

Furthermore, the distance calculating part 8 calculates the distance $d_t$ by the following Expression (8).

$$d_t = 1 - \frac{\left|\begin{array}{l}\min(t-\text{value of "rainy season"},\\ t-\text{value of "mid-June to mid-July"})\end{array}\right|}{\left|\begin{array}{l}\max(t-\text{value of "rainy season"},\\ t-\text{value of "mid-June to mid-July"})\end{array}\right|} \quad (8)$$

Since a t-test value of "rainy season" is 1.8, and a t-test value of "mid June to mid-July" is 13.2, the distance $d_t$ is calculated as represented by the following Expression (9). The distance $d_t$ thus calculated also has a value from 0 to 1, and as the value is smaller, the distance becomes smaller.

$$d_t = 1 - \frac{|\min(1.8, 13.2)|}{|\max(1.8, 13.2)|} = 1 - \frac{1.8}{13.2} = 0.864 \quad (9)$$

Furthermore, the distance calculating part 8 calculates the distance between the attribute of the model represented by M1 in FIG. 12, and the attribute of the model represented by M2 in FIG. 12, as the distance $d_{MZ}$ between model attributes. Herein, as an example of the distance $d_{MZ}$, the case of calculating a distance $d_{MZ\text{-}y}$ between objective variables, a distance $d_{MZ\text{-}x}$ between explanatory variables, a distance $d_{MZ\text{-}B}$ between weights (β), a distance $d_{MZ\text{-}at}$ between analysis application periods, and a distance between fitting degrees of analysis-estimation $d_{MZ\text{-}Aq}$ will be described.

Assuming that the vectors of the respective objective variables of the models M1 and M2 are $Y_1$ and $Y_2$, the distance $d_{MZ\text{-}y}$ between the objective variables can be calculated, for example, by the following Expression (10).

$$d_{MZ-Y} = 1 - |\text{inner product}| = 1 - \left|\frac{(Y_1 \cdot Y_2)}{|Y_1| \cdot |Y_2|}\right| \quad (10)$$

Furthermore, the distance calculating part 8 may acquire, for example, the objective variable IDs of the respective models M1 and M2, compare data associated with the respective objective variable IDs of the models M1 and M2 in the objective variable DB 61, and may reflect a comparison result to the above distance $d_{MZ\text{-}y}$. For example, the distance calculating part 8 may decrease the distance $d_{MZ\text{-}y}$ if the phenomenon represented by the objective variable of M1 is the same as the phenomenon represented by the objective variable of M2.

The distance $d_{MZ\text{-}x}$ between the explanatory variables is calculated, for example, by calculating the distance $d_f$ between the factors with respect to all the explanatory variables $X_1$ to $X_3$ included in the model and adding up them. The distance $d_{MZ\text{-}B}$ between the weights (β) is calculated, for example, by the following Expression (11).

$$d_{MZ-B} = 1 - \left|\frac{\min(\beta_A, \beta_B)}{\max(\beta_A, \beta_B)}\right| \quad (11)$$

The distance $d_{MZ\text{-}at}$ between analysis application periods can be calculated using, for example, the following Expression (12), assuming that the analysis application period of the model M1 is A and the analysis application period of the model M2 is B. "Maximum time distance of AB" in Expression (12) is a period between an earlier time of an A start time or a B start time, and a later time of an A end time and a B end time. Furthermore, the distance of a prediction application period can also be calculated similarly using Expression (12).

$$d_{MZ-at} = 2 * \frac{|\text{Period of } A| + |\text{Period of } B|}{|\text{Maximum time distance of } AB|} \quad (12)$$

The distance $d_{MZ\text{-}aq}$ between fitting degrees of analysis-estimation can be calculated, for example, using the following Expression (13), assuming that the fitting degree of analysis-estimation of the model M1 is a fitting degree A, and the fitting degree of analysis-estimation of the model M2 is a fitting degree B. The fitting degree can be calculated using the following Expression (13).

$$d_{MZ-aq} = 1 - \frac{\min(\text{fitting degree } A, \text{fitting degree } B)}{\max(\text{fitting degree } A, \text{fitting degree } B)} \quad (13)$$

The distance $d_f$ between factors thus calculated, the distance $d_t$ in performance between the factors, and the distance $d_{MZ}$ ($d_{MZ\text{-}y}$, $d_{MZ\text{-}x}$, $d_{MZ\text{-}B}$, $d_{MZ\text{-}at}$) between the respective attributes of the models to which the factors belong are calculated. The distance calculating part 8 substitutes these distances $d_f$, $d_t$, and $d_{MZ}$ into a predetermined function $f(d_f, d_t, d_{MZ})$, thereby calculating the distance $d_v$ between factor values in "rainy season" and "mid-June to mid-July".

As described above, by calculating the distance $d_v$ between the factor values, using the distance $d_t$ in performance between the factors and the distance $d_{MZ}$ between the respective attributes of the models, in addition to the distance $d_f$ between the factors, the distance $d_v$ between the factor values incorporating the contribution degree of the factors with respect to the models to which the factors belong can be calculated. A method for calculating the distance between factor values is an example, and is not limited thereto. The distance calculating part 8 may calculate the distance $d_v$ between the factor values, further using the other factor value information and model information.

(Detail of Model Creation Processing: Similar Model Space Creation Processing)

Figure 24:
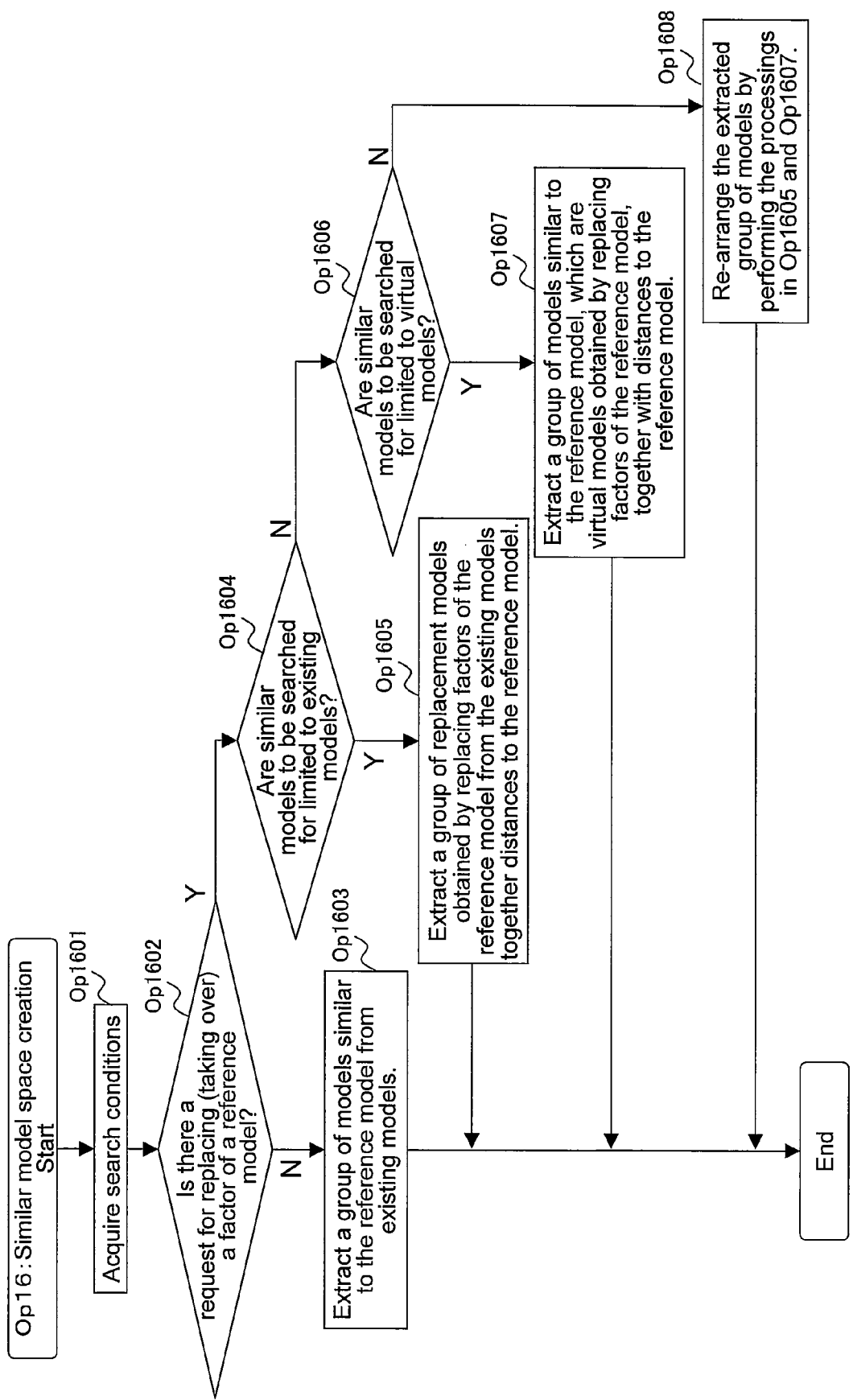
FIG. 24 is a flowchart illustrating an example of processing of creating similar model space data.

Hereinafter, a specific example of the processing will be described, in which the similar model space creating part 92 receives an instruction from the model proposing part 11 and creates similar model space data. FIG. 24 is a flowchart illustrating an example of the processing in which the similar model space creating part 92 creates similar model space data. The processing shown in FIG. 24 is the processing of the similar model space creating part 92 that receives an instruction from the model proposing part 11 in Op16 shown in FIG. 7.

The similar model space creating part 92 first receives a reference model and search conditions together with an instruction of creating similar model space data from the model proposing part 11 (Op1601). The search conditions include, for example, data indicating a factor requested to be replaced among the factors of the reference model, data indicating the range of models to be searched for, and the like.

The similar model space creating part 92 first determines whether or not there is a factor requested to be replaced in the reference model based on the search conditions (Op1602). More specifically, the similar model space creating part 92 determines whether or not it is necessary to take over at least a part of the factors in the reference model.

In the case where there is no factor requested to be replaced (N in Op1602), the similar model space creating part 92 extracts data on models similar to the reference model among those represented by the respective records in the model instance DB 63, and creates similar model space data.

In the case where there is a factor requested to be replaced (Y in Op1602), the similar model space creating part 92 determines whether or not the range of models to be searched for, designated by the search conditions, is limited to actually existing models (Op1604). In the case where the range is limited to only the actually existing models (Y in Op1604), the similar model space creating part 92 extracts data on a plurality of different groups of replacement models configured by replacing factors of the reference model, which are similar to the reference model, from the models represented by the respective records in the model instance DB 63 (Op1605). At this time, the similarity (distance) between each replacement model and the reference model is also calculated. Similar model space data is created based on the distance and the data on the groups of replacement models.

Furthermore, in the case where the range of the models to be searched for, designated by the search conditions, is limited to only virtual models (N in Op1604 and Y in Op1606), the similar model space creating part 92 creates data indicating a plurality of different groups of virtual models configured by replacing a factor of the reference model, and extracts the data on the group of models similar to the reference model from the created data as data on a group of replacement models (Op1607). At this time, the similarity (distance) between each replacement model and the reference model is also calculated. Similar model space data is created based on the distance and the data on the group of replacement models.

Furthermore, in the case where the range of the models to be searched for, designated by the search conditions, is not limited to only the actually existing models or only the virtual models (N in Op1606), the similar model space creating part 92 executes the processings in Op1605 and Op1607, and re-arranges the respectively obtained data on the group of replacement models in the mass, thereby generating similar model space data (Op1608).

Thus, due to the processing shown in FIG. 24, similar model space data can be generated in accordance with the replacement factor and the range of the models to be searched for, designated by the search conditions. Furthermore, information on a replacement model that is similar to the property of the reference model and is highly expected to enhance the performance is obtained. Next, the detail of the processings in Op1603, Op1605, and Op1607 will be described successively.

(Detail of Similar Model Space Creation Processing [Op1603])

Figure 25:
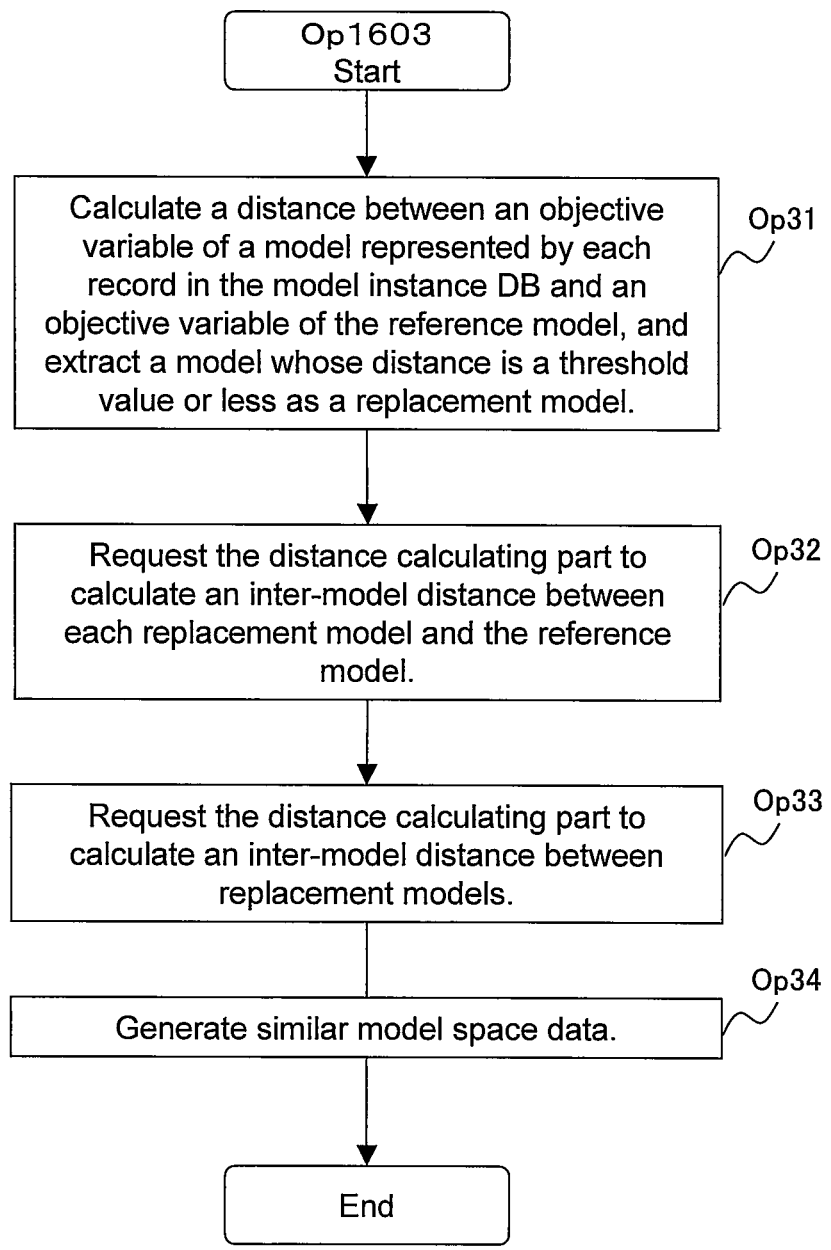
FIG. 25 is a flowchart illustrating the detail of processing in Op1603 shown in FIG. 24.

FIG. 25 is a flowchart illustrating the detail of the processing in Op1603 shown in FIG. 24. In the example shown in FIG. 25, the similar model space creating part 92 calculates the distance (i.e., distance dy between objective variables) between the objective variable of a model indicated by each record in the model instance DB 63 and the objective variable of the reference model (Op31). The calculation of the distance dy can be performed in the same way as in the above calculation of the distance $d_{MZ-y}$. A model having an objective variable whose distance $d_y$ to the objective variable of the reference model is a threshold value or less is considered to be similar to the reference model and is extracted as a replacement model.

The similar model space creating part 92 causes the distance calculating part 8 to calculate an inter-model distance $d_m$ between each replacement model and the reference model (Op32). A method for calculating the inter-model distance $d_m$ will be described later. Furthermore, the similar model space creating part 92 also causes the distance calculating part 8 to calculate an inter-model distance $d_m$ between replacement models (Op33). Then, similar model space data is generated based on the inter-model distance $d_m$ (Op34). The similar model space data contains, for example, data indicating each replacement model, data indicating the distance between each replacement model and the reference model, and data indicating the distance between replacement models.

Table 4 shows an example of an inter-model distance between replacement models.

TABLE 4

| Model | | Reference model (S branch office of E credit association) | Replacement model 1 (N branch office of M credit association) | Replacement model 2 (M branch office of S bank) | Replacement model 3 (T branch office of C bank) |
|---|---|---|---|---|---|
| | ID | 23 | 24a | 24b | 24c |
| Reference model (S branch office of E credit association) | 23 | 0 | 33 | 29 | 32 |
| Replacement model 1 (N branch office of M credit association) | 24a | 33 | 0 | 57 | 66 |
| Replacement model 2 (M branch office of S bank) | 24b | 29 | 57 | 0 | 67 |
| Replacement model 3 (T branch office of C bank) | 24c | 32 | 66 | 67 | 0 |

Furthermore, the similar model space creating part 92 may arrange replacement models on a two-dimensional virtual space with the reference model as an origin based on the distances calculated in Op32 and Op33, and include a coordinate of each replacement model in similar data space data. For example, the distance from the origin on the virtual space of each replacement model is determined in accordance with the inter-model distance between the reference model and each replacement model calculated in Op32. Then, the coordinate of each replacement model in the virtual space is determined in accordance with the inter-model distance between the respective replacement models as shown in Table 4. The screen display example shown in FIG. 9 shows the arrangement on the virtual space determined from the inter-model distance shown in Table 4.

As described above, as a result of the processing shown in FIG. 25, a replaceable model close to the reference model is extracted from the actually existing models represented by the respective records recorded in the model instance DB 63, and similar data space data indicating these models is generated.

(Calculation Example of Inter-Model Distance)

Figure 26:
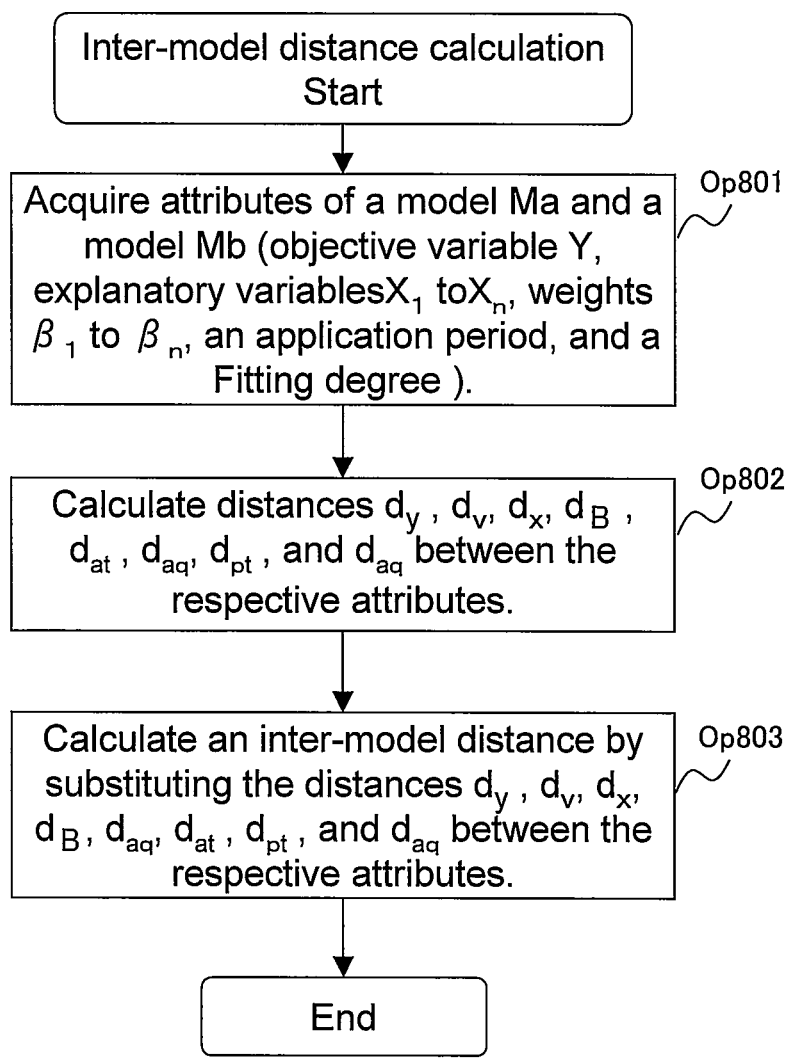
FIG. 26 is a flowchart illustrating an example of the calculation of an inter-model distance $d_m$ of a model Ma and a model Mb.

Next, a calculation example of an inter-model distance performed even in Op32 shown in FIG. 25 will be described. Herein, a calculation example of a inter-model distance $d_m$ between a model Ma and a model Mb by the distance calculating part 8 will be described. FIG. 26 is a flowchart illustrating an operation example in which the distance calculating part 8 calculates the distance $d_m$ between the models Ma and Mb. The distance calculating part 8 first acquires each attribute of the models Ma and Mb from the model instance DB 63 (Op801). The distance calculating part 8, for example, receives instance IDs of the models Ma and Mb and refers to the data corresponding to the respective instance IDs from the model instance DB 63, thereby acquiring information indicating attributes of the models. As the attributes, for example, an objective variable Y of a model, explanatory variables $X_1$ to $X_n$, weights $\beta_1$ to $\beta_n$, an application period, and a fitting degree are acquired.

Figure 27:
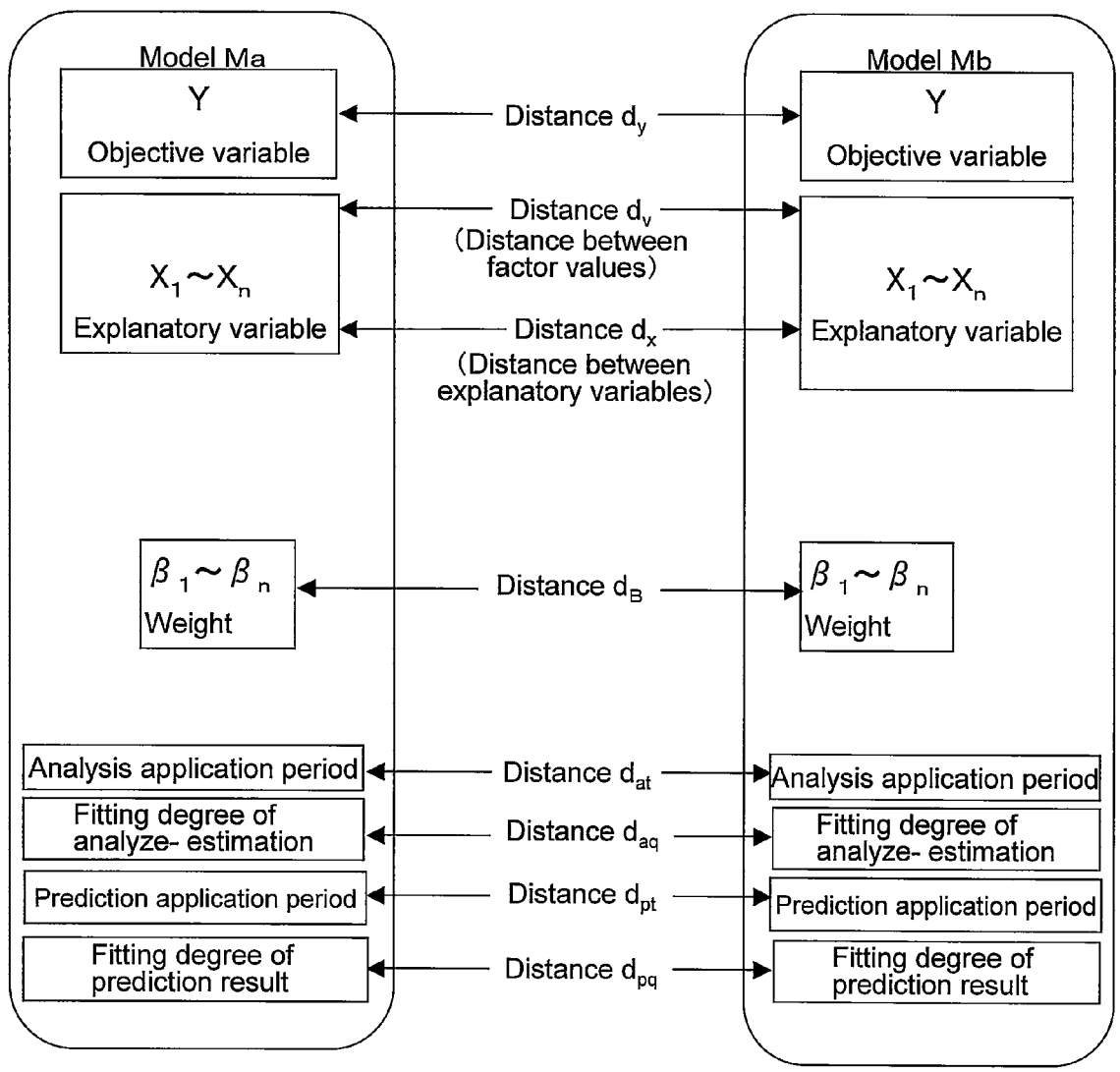
FIG. 27 is a diagram conceptually showing distances between respective attributes of models.

The distance calculating part 8 calculates the distances between the respective obtained attributes of the model Ma and the respective corresponding attributes of the model Mb (Op802). Herein, an example of the distance between the respective attributes will be described with respective to FIG. 27. FIG. 27 is a diagram conceptually showing the distance between the respective attributes of the models Ma and Mb. The distance $d_y$ between the objective variables shown in FIG. 27 is a numerical value indicating the similarity between the objective variable of the model Ma and the objective variable of the model Mb. The distance $d_y$ is calculated, for example, in the same way as in the above calculation of the distance $d_{MZ\text{-}y}$.

The distance $d_v$ is a distance in factor values between the factor of the model Ma and the factor of the model Mb having the same value attribute. The distance $d_v$ between the factors having the same factor value of the model Ma and the model Mb is calculated, for example, as follows. The distance calculating part 8 first calculates the distance between factor values with respect to all the combinations (ka×kb combinations) between the ka factors having the corresponding factor value in the model Ma and kb factors having the corresponding factor value in the model Mb. The distance between factor values is calculated, for example, by the processing of the distance calculating part 8 shown in FIG. 23. Among the calculated ka×kb combinations, the combination having a smallest distance between factor values is selected, and the distance between factor values in that combination is defined as the distance $d_v$. The distance between factor values in a plurality of combinations may be selected as the distance $d_v$, and in this case, for example, the total of the distances between factor values in the selected plurality of combinations is used for calculating the distance between models in Op803.

The distance $d_x$ is a value indicating the similarity between the explanatory variables $X_1$ to $X_n$ of the model Ma and the explanatory variables $X_1$ to $X_n$ of the model Mb respectively corresponding to the explanatory variables $X_1$ to $X_n$, and for example, is calculated in the same way as in the above distance $d_{MZ\text{-}x}$. The distance $d_B$ between weights is a value indicating the similarity between the weights $\beta_1$ to $\beta_n$ of the explanatory variables $X_1$ to $X_n$ of the model Ma and the weights $\beta_1$ to $\beta_n$ of the explanatory variables $X_1$ to $X_n$ of the model Mb respectively corresponding to the weights $\beta_1$ to $\beta_n$ of the explanatory variables $X_1$ to $X_n$ of the model Ma. The distance $d_B$ between weights is, for example, calculated in the same way as in the above distance $d_{MZ\text{-}B}$.

A distance $d_{at}$ between analysis application periods and a distance $d_{pt}$ between predication application periods are values indicating the respective similarities in an analysis application period and a prediction application period between the models Ma and Mb, and can be calculated in the same way as in the above distance $d_{MZ\text{-}at}$. A distance $d_{aq}$ of a fitting degree of analysis-estimation and a distance $d_{pq}$ of a fitting degree of prediction result are values indicating the respective similarities in a fitting degree of analysis-estimation and a fitting degree of prediction result between the models Ma and Mb, and is calculated in the same way as in the above distance $d_{MZ\text{-}aq}$.

The distance calculating part 8 obtains the distance $d_m$ between the models Ma and Mb by substituting the distances $d_y$, $d_x$, $d_B$, $d_{at}$, $d_{pt}$, $d_{aq}$, and $d_{pq}$ into a previously incorporated function g ( ) (Op803). Although the function g ( ) is not particularly limited, it can be represented by the following Expression (14), as an example. In the following Expressions (14) and (15), $K_y$, $K_x$, $K_B$, $K_{at}$, $K_{pt}$, $K_{aq}$, and $K_{pq}$ are coefficients indicating the respective weights of the distances $d_y$, $d_x$, $d_B$, $d_{at}$, $d_{pt}$, $d_{aq}$, and $d_{pq}$.

$$K_y \cdot d_y + K_x \cdot d_x + K_B \cdot d_B + K_{at} \cdot d_{at} + K_{pt} \cdot d_{pt} + K_{aq} \cdot d_{aq} + K_{pq} \cdot d_{pq} \tag{14}$$

$$\{(K_y \cdot d_y)^2 + (K_x \cdot d_x)^2 + (K_B \cdot d_B)^2 + (K_{at} \cdot d_{at})^2 + (K_{pt} \cdot d_{pt})^2 + (K_{aq} \cdot d_{aq})^2 + (K_{pq} \cdot d_{pq})^2\}^{1/2} \tag{15}$$

Thus, by calculating the distance $d_m$ between the models based on the distance with respect to a plurality of attributes, the similarity of various attributes of the models Ma and Mb can be reflected to the distance $d_m$. Each attribute of the model is not limited to the above example. Furthermore, the distance calculating part 8 is not required to calculate the distances with respect to all the above attributes, and may calculate the distances with respect to the attributes whose data can be obtained.

(Detail of Similar Model Space Creation Processing [Op1605])

Figure 28:
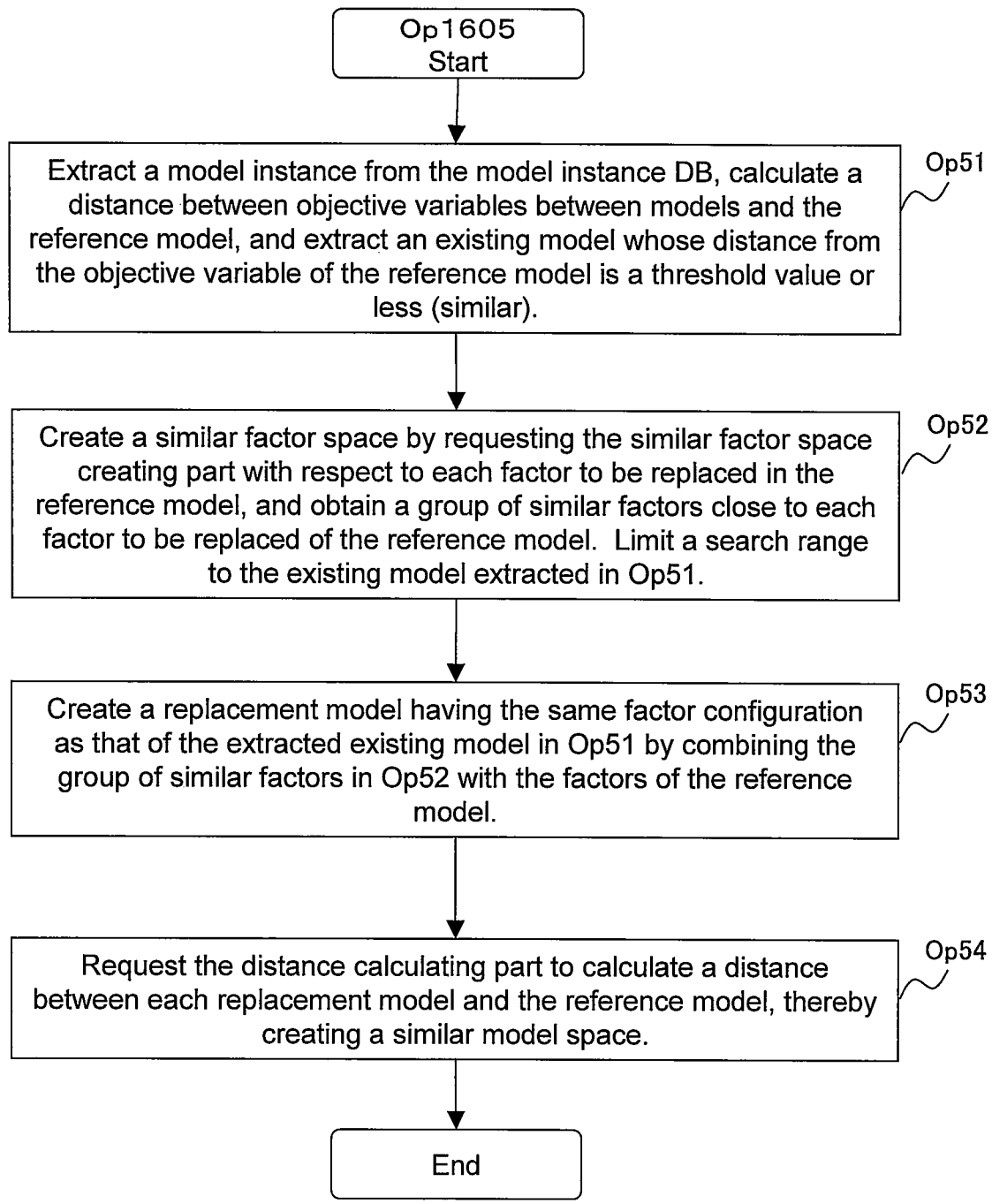
FIG. 28 is a flowchart illustrating the detail of processing in Op1605 shown in FIG. 24.

FIG. 28 is a flowchart illustrating the detail of the processing in Op1605 in FIG. 24. In the example shown in FIG. 28, the similar model space creating part 92 calculates the distance between the objective variable of a model represented by each record recorded in the model instance DB 63 and the objective variable of the reference model. The distance between objective variables can be calculated in the same way as in the above distance $d_{MZ\text{-}y}$. Then, the similar model space creating part 92 extracts the instance ID of the model whose distance from the objective variable of the reference model is a threshold value or less as the similar model (Op51).

The similar model space creating part 92 requests the similar factor space creating part 91 to create similar factor space data with respect to each factor requested to be replaced (factor targeted for replacement) among the factors of the reference model (Op52). At a time of providing an instruction, the similar model space creating part 92 passes data indicating that the search range of similar factors is limited to the factors included in the model indicated by the instance ID extracted in Op51 as search conditions. Thus, a group of similar factors having similar factor values are searched for from a group of factors in actually existing similar models with respect to each factor to be replaced, and similar factor space data is generated. The similar factor space creation processing is performed, for example, as shown in FIG. 22.

The similar model space creating part 92 creates replacement models configured by replacing the factor to be replaced of the reference model by a factor included in the group of similar factors indicated by the similar factor space data, which have the same factor configuration as that of the model indicated by the instance ID extracted in Op51 (Op53).

Then, the similar model space creating part 92 calculates the distances between the created replacement models and the reference model, and creates similar model space data containing information on the group of replacement models and the information indicating the distance from the reference model (Op54). Consequently, the model configured by replacing the factor of the reference model by a factor having a similar value, which has the same factor configuration as that of the actually existing similar model, can be extracted as a replacement model. Then, similar model space data containing information on the replacement model is generated.

The similar model space data shown in Table 1 is an example of the similar model space data generated by the processing shown in FIG. 28.

(Detail of Similar Model Space Creation Processing [Op1607])

Figure 29:
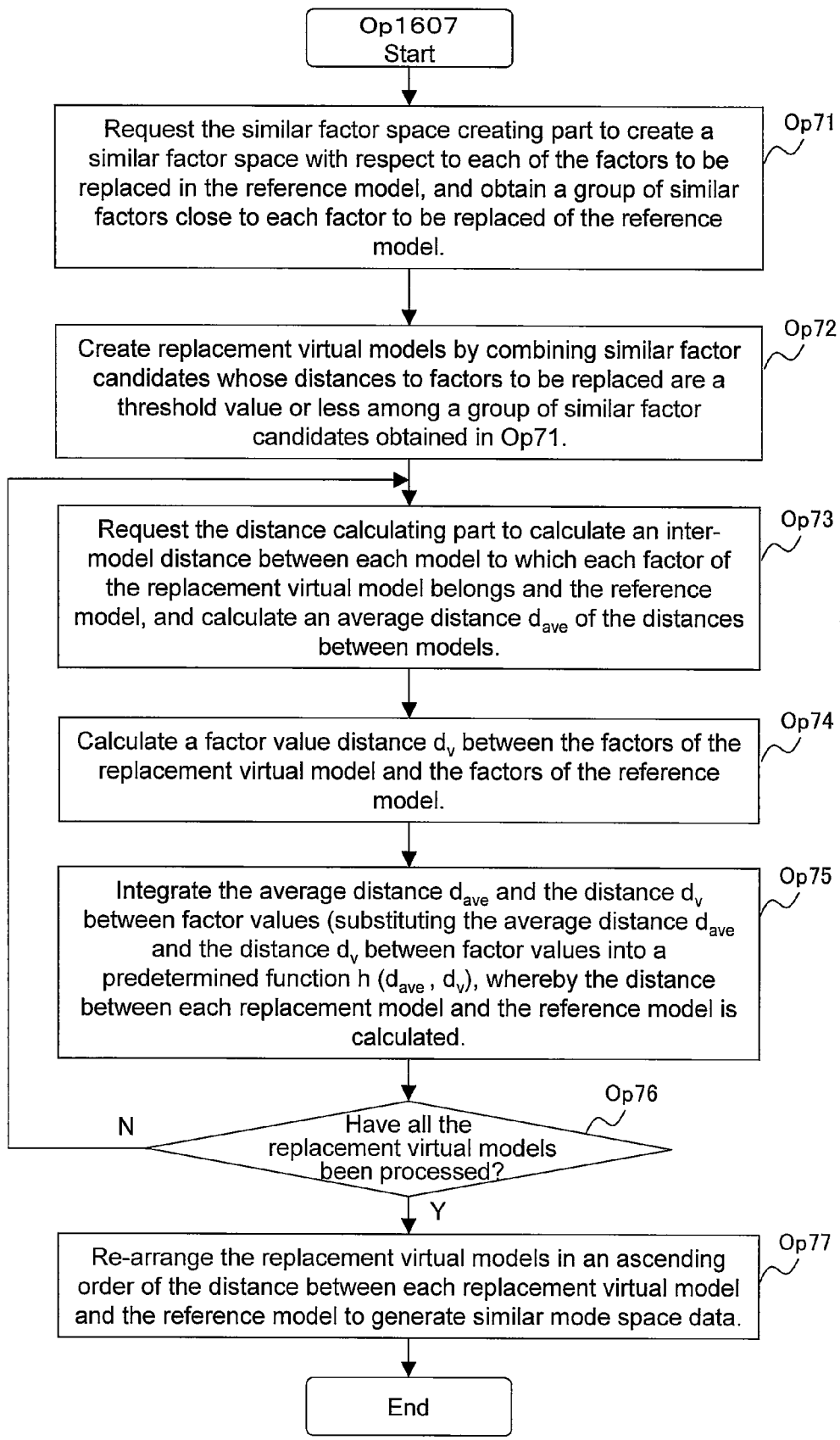
FIG. 29 is a flowchart illustrating the detail of processing in Op1607 shown in FIG. 24.

FIG. 29 is a flowchart illustrating the detail of the processing in Op1607 in FIG. 24. In the example shown in FIG. 29, the similar model space creating part 92 requests the similar factor space creating part 91 to create similar factor space data with respect to each factor requested to be replaced (each factor targeted for replacement) among the factors of the reference model. Thus, similar factor space data indicating a group of similar factors having similar factor values is generated for each factor to be replaced (Op71).

The similar model space creating part 92 extracts a group of similar factors whose distances from the factors to be replaced is a threshold value or less for each factor to be replaced among a group of similar factors indicated by the similar factor space data on the basis of each factor to be replaced, and combines them to create a replacement virtual model (Op72).

Hereinafter, a specific example will be shown. The case will be described in which the target of the reference model is "number of system troubles in S branch office of E credit association" and the reference model has day factors "beginning of next week", "rainy season", and "Wednesday, Thursday, Friday in winter", as in the model represented by M1 shown in FIG. 12. Furthermore, the factors to be replaced are assumed to be "beginning of next week", "rainy season", and "Wednesday, Thursday, Friday in winter".

Figure 30:
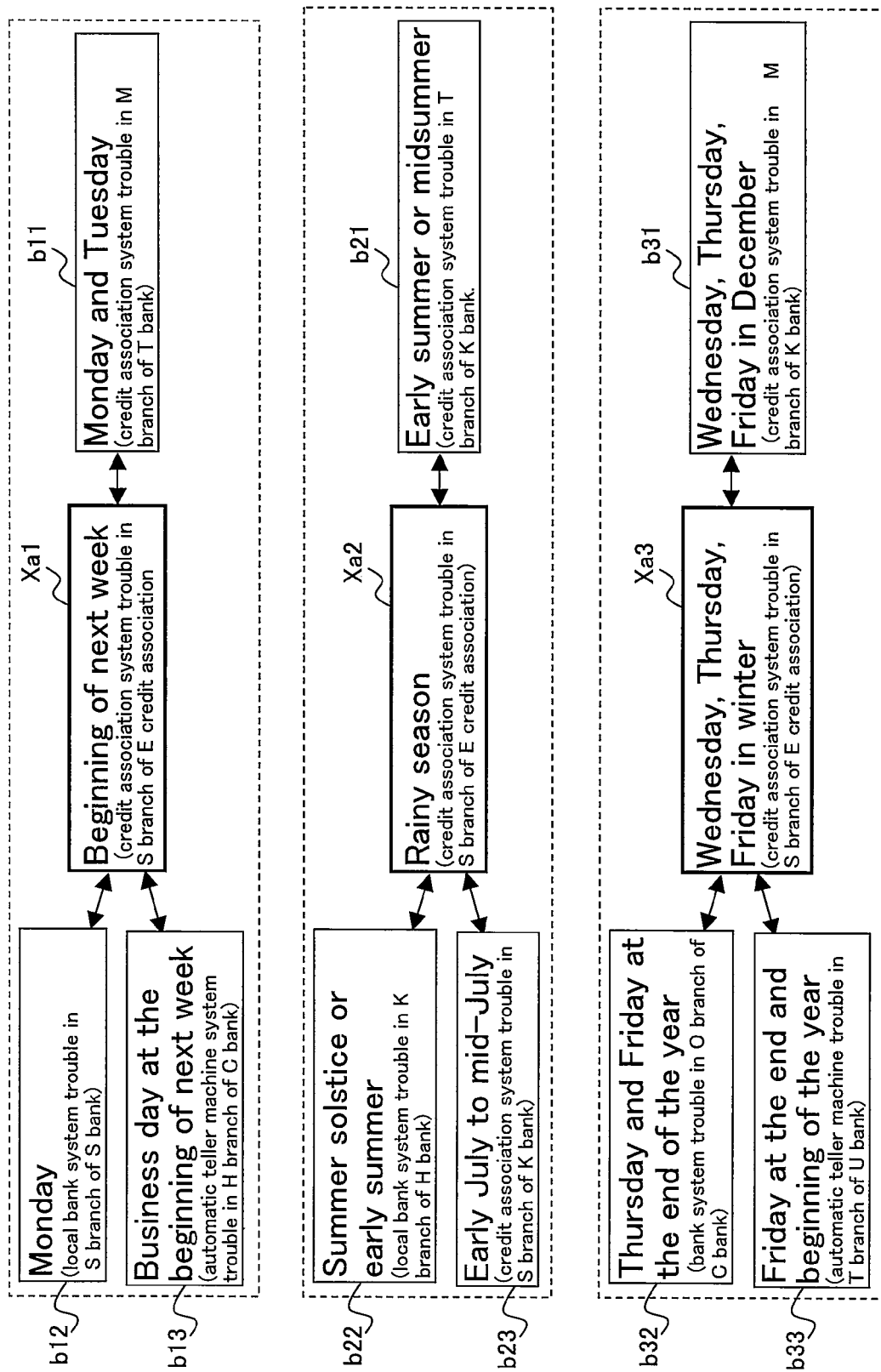
FIG. 30 is a diagram conceptually showing an example of a group of similar factors in which a distance from a factor to be replaced is smaller than a threshold value.

FIG. 30 is a diagram conceptually showing an example of a group of similar factors whose distances from the factors to be replaced are a threshold value or less. In FIG. 30, factors to be replaced Xa1, Xa2, and Xa3 are connected to a group of replacement factors b11 to b13, b21 to b23, and b31 to b33 respectively similar to the factors to be replaced Xa1, Xa2, and Xa3 by arrows. For example, the group of replacement factors b11, b12, b13 similar to the factor to be replaced Xa1 "beginning of next week" are respectively factors "Monday", "Tuesday", "Monday", and "business day at the beginning of next week". In this case, the similar model space creating part 92 creates replacement virtual models by replacing the factor to be replaced "beginning of next week" by any of the replacement factors "Monday, Tuesday", "Monday", and "business day at the beginning of next week", replacing the factor to be replaced "rainy season" by any of replacement factors "early summer or midsummer", "summer solstice or early summer", and "early July to mid-July", and further replacing the factor to be replaced "Wednesday, Thursday, Friday in winter" by any of replacement factors "Wednesday, Thursday, Friday in December", "Thursday and Friday at the end of the year", and "Friday at the end and beginning of the year". In this case, three factor replacements can be performed respectively for three factors to be replaced, so that 3×3×3=27 replacement virtual models are created.

The similar model space creating part 92 performs the processings in Op73 to Op75 shown in FIG. 29 for each of 27 replacement virtual models, thereby calculating the distance from the reference model. In Op73, the similar model space creating part 92 requests the distance calculating part 8 to calculate an inter-model distance between each model which each factor of the replacement virtual models belongs and the reference model. An average value of the distance between each model thus obtained and the reference model is calculated as an inter-model average distance $d_{ave}$.

The similar model space creating part 92 also causes the distance calculating part 8 to calculate the distance $d_v$ between factor values of each factor to be replaced of the reference model and the respectively replaced replacement factors (Op74). This calculation is performed by the processing shown in FIG. 23. In this case, the distance $d_m$ between model attributes in Op83 shown in FIG. 23 is obtained by calculating the distance between the attribute of the reference model and the attribute of the model which each replacement factor belongs. Thus, the distance between factor values to be calculated becomes a value considering the relationship between the model which each replacement factor belongs and the reference model.

The similar model space creating part 92 calculates an inter-model distance $d_m$ between the replacement virtual model and the reference model by substituting the inter-model average distance $d_{ave}$ calculated in Op74 and the distance $d_v$ in factor values between each factor to be replaced and each replacement factor calculated in Op75 into a predetermined function $h(d_{ave}, d_v)$ (Op76). Thus, an inter-model distance also incorporating the relationship between each model which each replacement factor belongs and the reference model is calculated.

The distance between each replacement virtual model and the reference model is calculated by the processings in Op73 to Op75. The similar model space creating part 92 generates data in which each replacement virtual model is associated with the distance as similar model space data.

As a result of the processing shown in FIG. 29, the distance between the reference model and the replacement virtual model is obtained based on the distance in factor values between the factor to be replaced (original factor) and the replacement factor, and an inter-model distance between the reference model and each model to which each replacement factor belongs. Thus, the distance also incorporating the matter regarding what value the factor has with respect to the reference model to which degree is obtained. Consequently, information is obtained, which contains a group of replacement factors having commoness in factor values (being compatible) with the original factor and which is effective for obtaining a replacement model suitable for the reference model.

(Screen Display Example: Condition Setting Screen)

Figure 31:
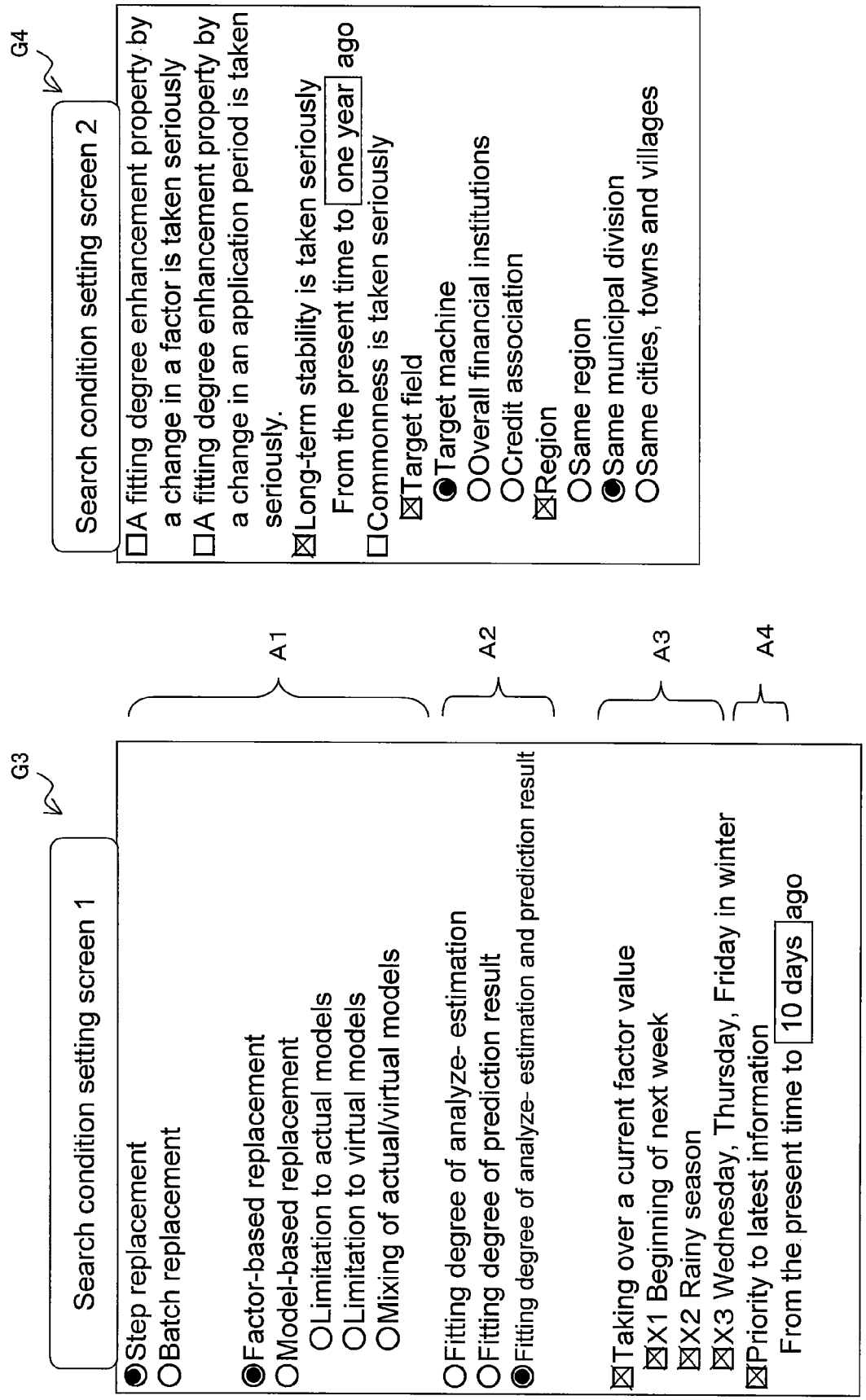
FIG. 31 is display examples of screens for requesting information indicating conditions of a replacement model.

Next, an example of a screen which the model creation support system 1 causes the information processing apparatuses 15a to 15c to display will be described. FIG. 31 is an exemplary display of screens which the condition acquiring part 4 causes the information processing apparatus 15a that has made a request for creating a replacement model of an existing model to display so as to request information indicating the conditions of the replacement model. The screens shown in FIG. 31 are displayed, for example, on the information processing apparatus 15a before the model creation processing shown in FIG. 7. The information input through the screens is passed to the model proposing part 11 through the condition acquiring part 4 as model condition data.

A search condition setting screen 1 (G3) shown in FIG. 31 includes a search procedure selecting area A1, a fitting degree kind selecting area A2, a replacement target factor selecting area A3, and a priority period specifying area A4.

In the search procedure selecting area A1, a user can select a procedure for searching for a replacement model. Herein, the user can make the selection between step replacement and batch replacement and the selection between factor-based replacement and model-based replacement. In the case of the model-based replacement, the selection among the limitation to actual models, the limitation to virtual models, and the mixing of actual/virtual models can be made.

The step replacement is a search procedure for presenting replacement models or replacement factors one at a time so that the user can select, and the batch replacement is a search procedure for presenting all the replacement models or replacement factors at once. The selection result is used, for example, when the model proposing part 11 determines whether to present a group of similar factors or a group of similar models one at a time or to present them at once in Op14 or Op17 shown in FIG. 7.

The selection between the factor-based replacement and the model-based replacement is the selection of whether replacement targets are searched for on a factor basis or on a model basis, and the selection result is used, for example, for the determination in Op12 shown in FIG. 7. The selection among the limitation to an actual model, the limitation to a virtual model, and the mixing of actual/virtual models is the selection of a search target of a replacement model, and the selection result thereof is used, for example, for the determination in Op1604 and Op1606 shown in FIG. 24.

In the fitting degree kind selecting area A2, the user selects which of the fitting degree of analysis-estimation and the fitting degree of prediction result should be taken more seriously in a search for a replacement model or a replacement factor. The selection result is used, for example, for calculating the similarity of a fitting degree of prediction result or a fitting degree of analysis-estimation in the calculation of the distance $d_m$ between model attributes in the calculation of a distance between factor values shown in FIG. 23 (Op83) and the calculation of the distance between respective attributes of a model in the calculation of an inter-model distance shown in FIG. 26.

In the replacement target factor selecting area A3, the user can select a factor desired to be replaced (factor targeted for replacement) in an existing model. The information on the factor to be replaced, selected herein, is passed by the model proposing part 11 to the similar factor space creating part 91 or the similar model space creating part 92 together with a request for processing, for example, in Op13 and Op16 shown in FIG. 7. Then, the information is used in the processing in the similar factor space creating part 91 or the similar model space creating part 92.

In the priority period specifying area A4, the user can select whether or not to acquire an analysis model always targeting latest information from the information processing apparatus. Furthermore, the user can also specify the length of an analysis application period to be a target of an analysis model. For example, the case where "10 days" is input as in an example shown in FIG. 31 means the following: the information processing apparatus conducts an analysis using the data in the past 10 days with the past 10 days as an analysis application period (i.e., generates a predicted model), and predicts the fluctuation of tomorrow, using that model. In this case, for example, the model information acquiring part 3 receives the generated predicted model, analysis application period (past 10 days), fitting degree of analysis-estimation, fitting degree of prediction result of the previous day, and the like, and the processing in which the model managing part 5 reflects these pieces of information to the data in the model recording part 6 may be repeated every day.

The search condition setting screen 2 (G4) is used for the user to select attributes of factor values to be taken seriously in a search for a replacement model or a replacement factor. In this screen, the user can select attributes of factor values to be taken seriously among "fitting degree enhancement property by a change in a factor", "fitting degree enhancement property by a change in an application period", "long-term stability", and "commoness". The attributes of the factor values selected herein are received, for example, by the similar factor space creating part 91 as search conditions in Op1401 shown in FIG. 22. Then, the similar factor space creating part 91 can narrow down similar factors to be replacement candidates to a group of factors having factor values of the attributes in Op1404.

For example, as shown in FIG. 31, an example of the case will be described in which "long-term stability is taken seriously" is selected, and "from the present time to 'one year' ago" is input as a period to be taken seriously on the search condition setting screen 2 (G4). In this case, in Op1404 shown in FIG. 22, the similar factor space creating part 91 refers to data "applicable period (D3 in FIG. 5)" in the factor value DB 65 of each of a group of factors taken in Op1403, and define only factors, in which at least a part of "the applicable period" is included in a period from the present time to one year ago, to be similar factors to be candidates for replacement factors. As a result, the factors indicating long-term stability in an achievement from the present time to one year ago are extracted as candidates for replacement factors.

As shown in the above embodiment, the factor values are classified into a plurality of attributes from various points of view and recorded in the factor value DB 65, whereby such a user's selection is enabled. Consequently, replacement models or replacement factors reflecting the user's intension can be presented.

(Screen Display Example: Screen of Proposing Replacement Factors)

Hereinafter, a transition example of a screen which the condition acquiring part 4 and the model proposing part 11 cause the information processing apparatus 15 that has made a request for creating replacement models of an existing model to display so as to present factors to be replaced. As an example, the case will be described in which the model represented by Ml shown in FIG. 12 is notified as the existing model, and a request for creating replacement models of that model is made.

In this case, the condition acquiring part 4 inquires about model condition data with respect to the information processing apparatus 15*a*. Specifically, the condition acquiring part 4 causes the information processing apparatus 15*a* to display the search condition setting screen 1 (G3) and the search condition setting screen 2 (G4) shown in FIG. 31, for example. The information input on these screens is passed to the model proposing part 11 so as to be included in the model condition data together with the information on the existing model. This processing corresponds to Op11 shown in FIG. 7.

The model proposing part 11 searches the factor value DB 65 for information on factor values of the respective factors X1 "beginning of next week", X2 "rainy season", and X3 "Wednesday, Thursday, Friday in winter" of the existing model, and passes the information to the condition acquiring part 4. The condition acquiring part 4 sends the information on the factor values of the respective factors to the information processing apparatus 15*a*, and causes the information processing apparatus 15*a* to display the information to the user.

Figure 32:
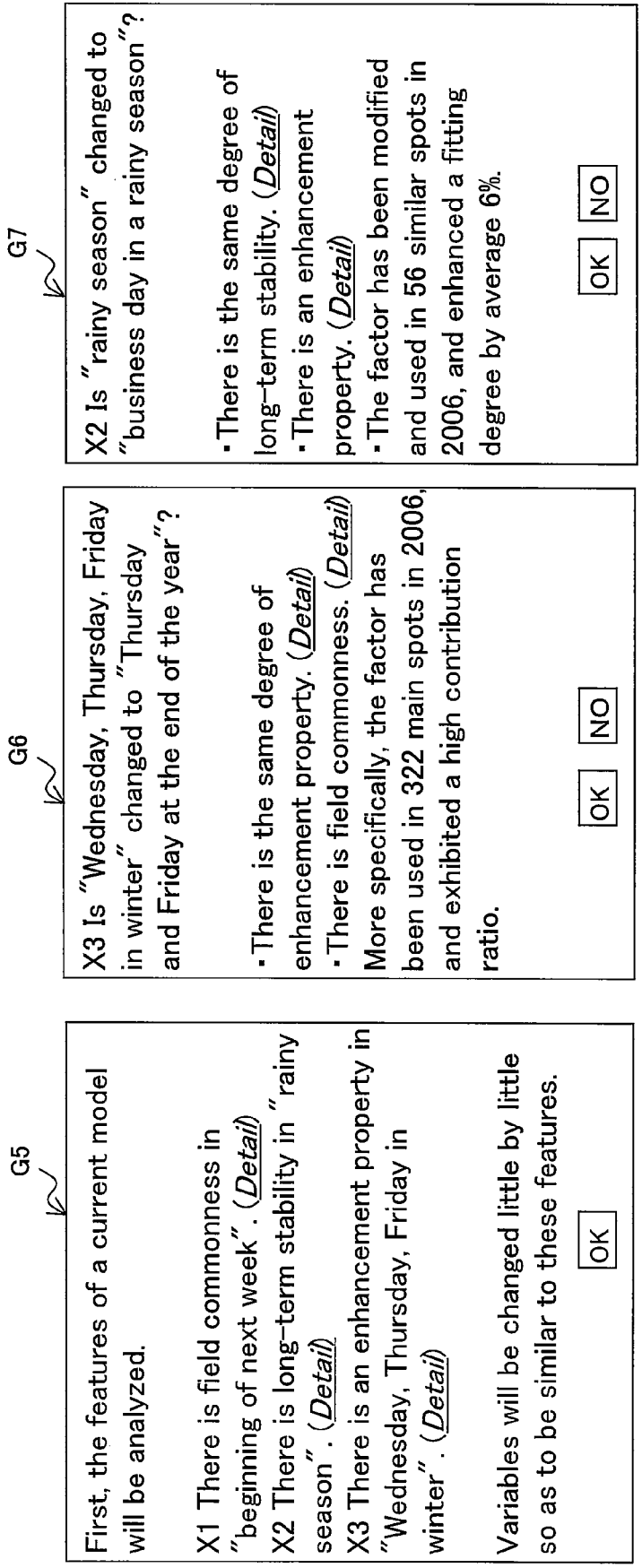
FIG. 32 shows examples of screens which a condition acquiring part allows an information processing apparatus to display.

The screen G5 shown in FIG. 32 is an exemplary screen which the condition acquiring part 4 causes the information processing apparatus 15*a* to display at this time. On the screen G5, factor value attributes "field commoness", "long-term stability", and "enhancement property" of the respective factors X1, X2, and X3 of the existing model are displayed respectively, and furthermore, an "OK" button for confirming that these factors are to be replaced is displayed. When the user clicks on the "OK" button, the information indicating that X1, X2, and X3 are factors to be replaced is sent to the condition acquiring part 4, and further passed to the model proposing part 11.

The model proposing part 11 performs the processing shown in FIG. 7 in accordance with the search conditions input on the screens G3 and G4 shown in FIG. 31. Herein, the case where "step replacement" and "factor-based replacement" are selected in the search procedure selecting area Al on the search condition setting screen 1 (G3) will be described. In this case, the model proposing part 11 determines that the search procedure is conducted by factor-based replacement ("on a factor basis" in Op12 shown in FIG. 7), and performs the processings in Op13 to Op15.

At this time, in the presentation of similar factors in Op14, similar factors that are candidates for replacement are presented to the user on the basis of a factor to be replaced so that the user can select the similar factors. Screens G6 and G7 shown in FIG. 32 are respectively exemplary screens presenting similar factors of the factors to be replaced X3 "Wednesday, Thursday, Friday in winter" and X2 "rainy season". The screen G6 presents a similar factor "Thursday and Friday at the end of the year" of the factor to be replaced X3 "Wednesday, Thursday, Friday in winter", and the explanations of the factor values "enhancement property" and "field commonness" of the similar factor are also displayed. When the user clicks on the "OK" button, the model proposing part 11 creates a replacement model obtained by replacing the factor to be replaced X1 "Wednesday, Thursday, Friday in winter" by "Thursday and Friday at the end of the year". When a "NO" button is clicked on, the model proposing part 11 displays another similar factor similar to the factor X3 "Wednesday, Thursday, Friday in winter". The screen G6 presents a similar factor "business days in a rainy season" of the factor to be replaced X2 "rainy season" together with factor value information. The screens G5 and G6 are successively displayed on the information processing apparatus 15a, whereby the user can determine replacement factors while considering factor values on a basis of a factor to be replaced.

When the replacement factors are determined with respect to the respective factors to be replaced X1, X2, and X3, the model proposing part 11 creates models replaced by these replacement factors and sends the models to the information processing apparatus 15a as the replacement models.

(New Model Creation Processing)

An operation example in the case where the condition acquiring part 4 receives a request for creating replacement models of an existing model has been mainly described. Hereinafter, an operation example of the condition acquiring part 4 and the model proposing part 11 will be described in the case where the condition acquiring part 4 receives a request for creating a new model from the information processing apparatus 15a.

Figure 33:
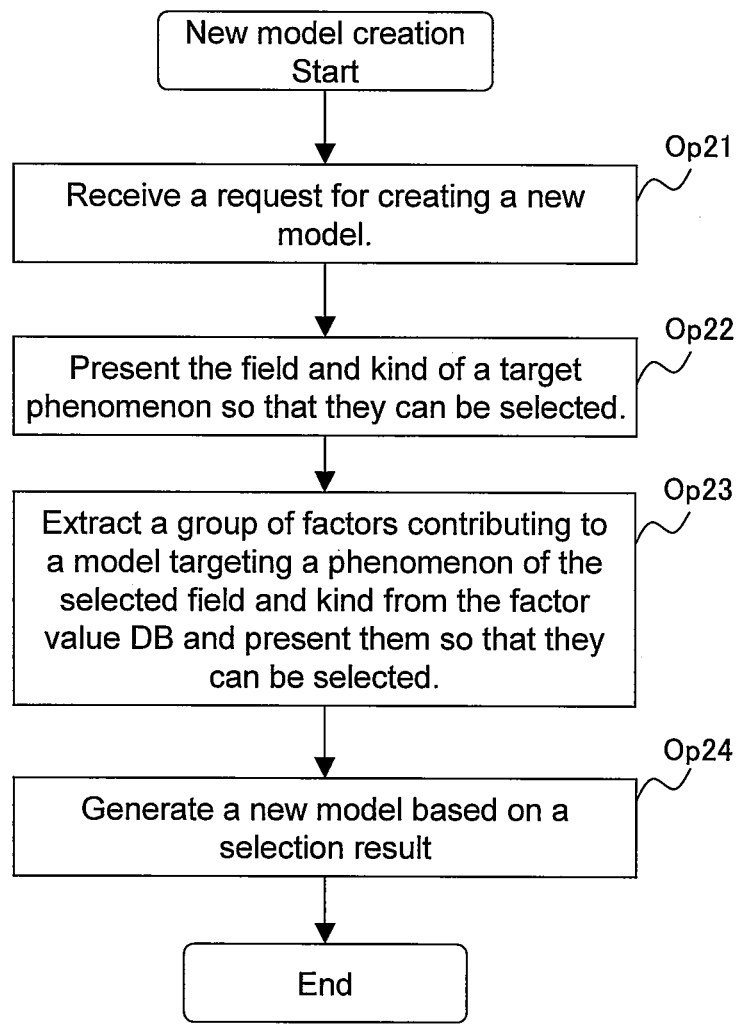
FIG. 33 is a flowchart illustrating an example of novel model creation processing.

FIG. 33 is a flowchart illustrating an example of new model creation processing of the condition acquiring part 4 and the model proposing part 11. In the example shown in FIG. 33, when receiving a request for creating a new model from the information processing apparatus 15a (Op21), the condition acquiring part 4 notifies the model proposing part 11 of a request for creating a new model. The model proposing part 11 acquires all the types of categories (fields) and kinds of a phenomenon to be a target of a model recorded in the objective variable DB 61, sends them to the information processing apparatus 15a, and causes the information processing apparatus 15a to present them to the user so that the user can select them (Op22).

Figure 34:
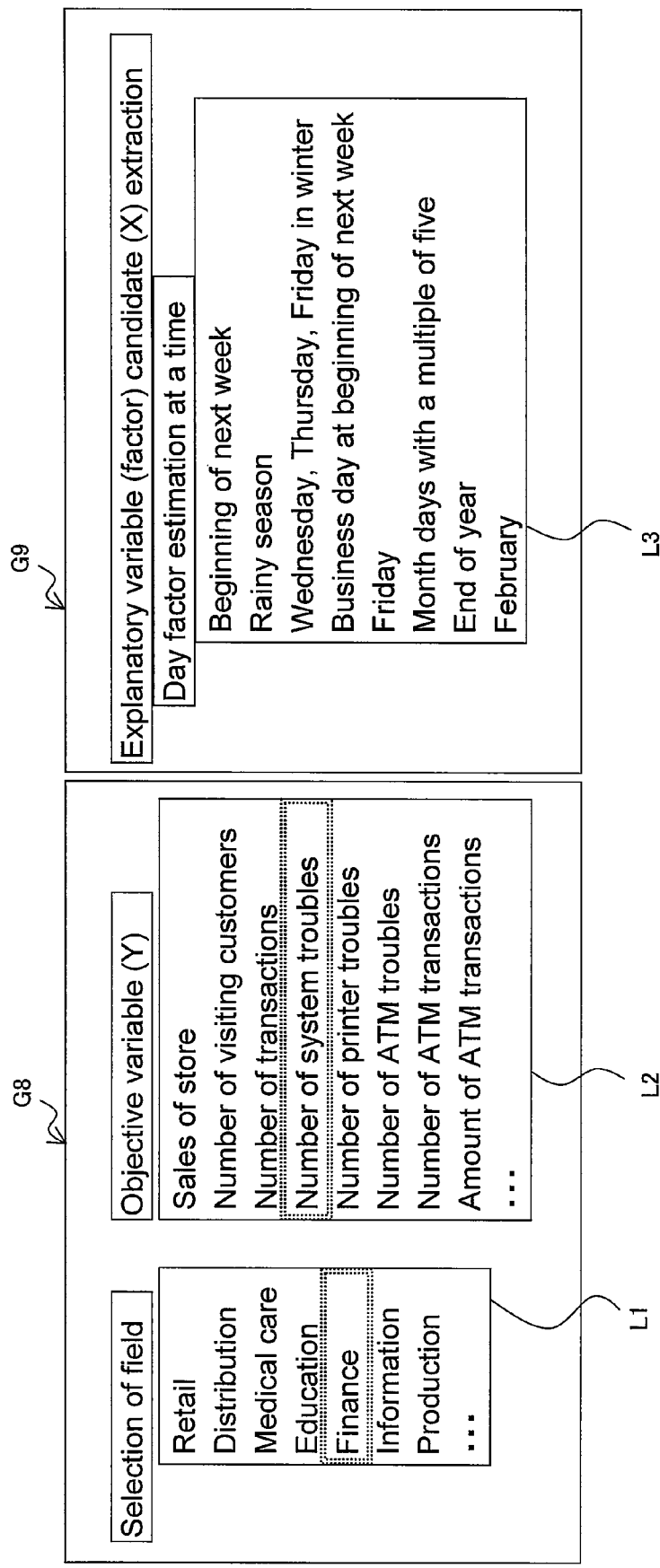
FIG. 34 is a diagram showing examples of screens in the case where the category (field) of a phenomenon and the kind of the phenomenon are displayed so as to be selected.

A screen G8 shown in FIG. 34 is an exemplary screen in the case where the categories (fields) of a phenomenon and the kinds thereof are displayed so as to be selected. The categories (fields) of the phenomenon acquired by the model proposing part 11 from the objective variable DB 61 are displayed in a list L1 of "field selection", and the kinds of the phenomenon are displayed in a list L2 of "objective variable (Y)", respectively.

The category (field) and the kind of the phenomenon selected by the user on the screen G8 are notified to the model proposing part 11. The model proposing part 11 acquires factors contributing to a model targeting the notified phenomenon from the factor value DB 65, and present them so that the user can select them (Op23 shown in FIG. 33). Specifically, the model proposing part 11 acquires an objective variable ID of the objective variable including both the selected category (field) and kind of the phenomenon from the objective variable DB 61 (see FIG. 3). Then, the model proposing part 11 acquires a record including the acquired objective variable ID from the model instance DB 63. Information on the contributing factors (explanatory variable IDs) indicated by the acquired record is sent to the information processing apparatus 15a and displayed so that the user can select the information.

A screen G9 shown in FIG. 34 is an exemplary screen displaying the factors extracted by the model proposing part 11 in a selectable list. A list L3 on the screen G9 displays names of the extracted factors so that they can be selected. The user selects at least one factor desired to be added to the model from the list L3. The model proposing part 11 is notified of the factor selected by the user. The model proposing part 11 generates a regression equation of the model including the selected factor and sends it to the information processing apparatus 15a (Op24 shown in FIG. 33).

Thus, the information processing apparatus 15a can obtain a new model. The above new model creation processing is an example and is not limited thereto. For example, the model proposing part 11 may further narrow down the factors extracted from the factor value DB 65 based on a numerical value indicating the degree of a factor value such as enhancement performance or an average fitting degree and determine a factor to be included in the model, instead of allowing the user to select a factor to be included in the model in Op23. This makes the user's selection operation unnecessary.

Embodiment 2

In the present embodiment, the case will be described where a model dealt with by the model creation support system 1 contains information indicating the relationship between explanatory variables in a regression equation. More specifically, the case where a model contains information indicating the relationship between factors in one model will be described.

Figure 35:
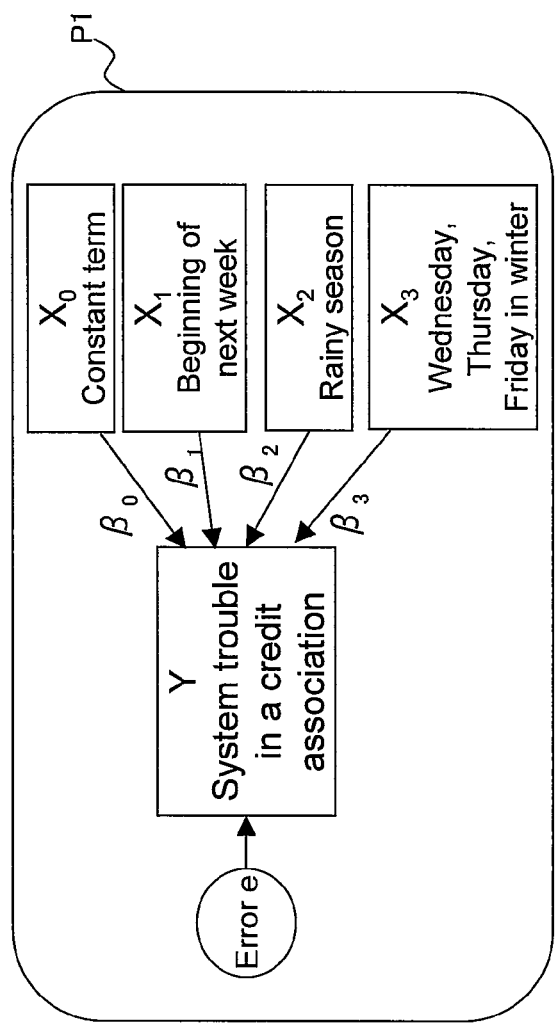
FIG. 35 illustrates a path chart of a model M1 shown in FIG. 12 and an equation thereof.

FIG. 35 shows a path chart P1 illustrating the relationship between variables in the model represented by M1 shown in FIG. 12, and an equation H1 representing the relationship in the path chart, using a matrix. In the path chart P1, arrows in one direction represent cause-and-effect relationships, and values ($\beta_0$ to $\beta_3$) on the sides of the arrows represent weights (parameters). It is understood that each objective variable Y (the number of system troubles of a credit association) is influenced by the respective explanatory variables $X_0$ to $X_3$ (a constant term, beginning of next week, rainy season, Wednesday, Thursday, Friday in winter). However, the relationship between the explanatory variables $X_0$ to $X_3$ is not shown. Therefore, in the equation H1 representing the relationship of the path chart P1, the first to fourth rows in the matrix do not substantially show anything.

Figure 36:
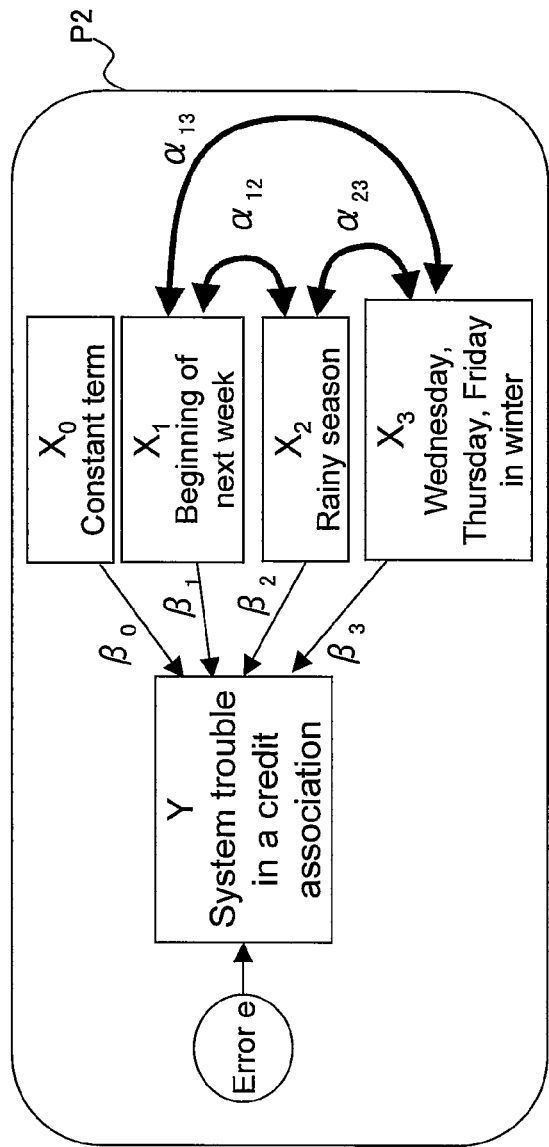
FIG. 36 illustrates a path chart including a relationship of explanatory variables $X_0$ to $X_3$ and an equation thereof.

FIG. 36 shows a path chart P2 including the relationship between the explanatory variables $X_0$ to $X_3$, and an equation H2 representing the relationship in the path chart, using a matrix. The path chart P2 has a configuration in which the relationship between the explanatory variables $X_0$ to $X_3$ is added to the relationship represented by the path chart P1 in FIG. 35. In the path chart P2, arrows in both directions represent correlations. Specifically, the explanatory variables $X_1$ and $X_2$ have correlations. The weight (coefficient) representing the correlation degree between $X_1$ and $X_2$ is $a_{12}$. Similarly, the explanatory variables $X_2$ and $X_3$ and the explanatory variables $X_1$ and $X_3$ also have correlations with weights (coefficients) $a_{23}$ and $a_{13}$.

The relationship represented by the path chart P2 is represented by the equation H2. In this case, the relationships between $X_1$ and $X_2$, $X_2$ and $X_3$, and $X_1$ and $X_3$ are in both directions (have correlations) instead of one direction. Therefore, the coefficients $a_{12}$, $a_{23}$, and $a_{13}$ representing the degrees of these relationships are described at two positions on both sides with respect to a diagonal line in a matrix K2. In the case where the relationship between $X_1$ and $X_2$ is in one direction from $X_2$ to $X_1$ (in the case where $X_1$ does not influence X2 although $X_2$ influences $X_1$), an element on the third row and second column in the matrix K2 becomes "0".

The equation H2 can be dealt with as a covariance structure equation. Therefore, for example, each coefficient in the matrix K2 is calculated using the procedure of a covariance structure analysis.

The data indicating the relationship (link) between explanatory variables is recorded in the model instance DB 63 as an inter-factor link and the weight of a link, for example. FIG. 37 shows an example of a record storing an inter-factor link and the weight of a link in the model instance DB 63. In a record A3 shown in FIG. 37, "X1-X2, X2-X1" is recorded as the inter-factor link. This is data indicating that the explanatory variable X1 influences the explanatory variable X2, and the explanatory variable X2 influences the explanatory variable X1. More specifically, this data indicates that there is a correlation between the factor of the explanatory variable X1 and the factor of the explanatory variable X2. Furthermore, as data indicating the weight of each link of the inter-factor link "X1-X2, X2-X1", "$a_{12}$, $a_{12}$" is recorded.

Next, exemplary calculations of the distances between factor values and between models by the distance calculating part 8 will be described in the case where information indicating the relationship between factors is included in a regression equation. First, the case of calculating the distance between factor values will be described. The distance calculating part 8 calculates the distance $d_m$ between model attributes in Op83 in the calculation of the distance between factor values shown in FIG. 23. At this time, in the case where both the models contain information indicating the relationship between factors, the distance calculating part 8 can further calculate the distance $d_{MZ-s}$ between links and the distance $d_{MZ-n}$ between weights of the link as one distance $d_m$.

The distance $d_{MZ-s}$ between links is a numerical value indicating the similarity between the relationship (link) between factors in one model and the relationship (link) between factors in the other model. The distance $d_{MZ-s}$ between links is calculated, for example, based on data on an inter-factor link recorded so as to be associated with records of both the models in the model instance DB 63. For example, the distance $d_{MZ-s}$ between links is calculated by the following Expression (16).

$$d_{MZ-s} = \frac{\text{Number of links of } A \cap B}{\text{Number of links of } A \cup B} \quad (16)$$

In Expression (16), the "number of links of A∩B" represents the total number of links common to a model A and a model B, and the "number of links of A∪B" represents the total number of links included in at least one of the model A and the model B.

The distance $d_{MZ-n}$ between weights of links is a numerical value representing the similarity of the weights of the links. The distance $d_{MZ-n}$ between weights of links is also calculated based on the weights of the links of records corresponding to both the models in the model instance DB 63. The distance $d_{MZ-n}$ is calculated by the following Expression (17).

$$d_{MZ-n} = 1 - \left| \frac{\min(\lceil \text{Weight of link } A \rceil, \lceil \text{Weight of link } B \rceil)}{\max(\lceil \text{Weight of link } A \rceil, \lceil \text{Weight of link } B \rceil)} \right| \quad (17)$$

In Op84 shown in FIG. 23, the distance $d_v$ between factor values is calculated using the distance $d_m$ including the distance $d_{MZ-s}$ and the distance $d_{MZ-n}$. Thus, the distance $d_v$ between factor values incorporating the distance between links and the distance between weights of links is calculated.

Even in the case of calculating the distance $d_m$ between models, similarly, the distance calculating part 8 can further calculate the distance $d_{MZ-s}$ between links and the distance $d_{MZ-n}$ between weights of links, when calculating the distance between model attributes (see Op802 in FIG. 26). Then, in Op803, the distance calculating part 8 substitutes the distance $d_{MZ-s}$ and the distance $d_{MZ-n}$ into the function g( ), thereby calculating the distance $d_m$ between models, in addition to the distance between the other attributes. Thus, the distance $d_m$ between models incorporating the distance between links and the distance between weights of links is calculated.

In the above, an example in which the distance calculating part 8 calculates both the distance $d_{MZ-s}$ between links and the distance $d_{MZ-n}$ between weights of links has been described. However, the distance calculating part 8 may calculate only one of the distance $d_{MZ-s}$ and the distance $d_{MZ-n}$, and may calculate a synthetic value of the distance $d_{MZ-s}$ and the distance $d_{MZ-n}$.

Embodiment 3

Figure 38:
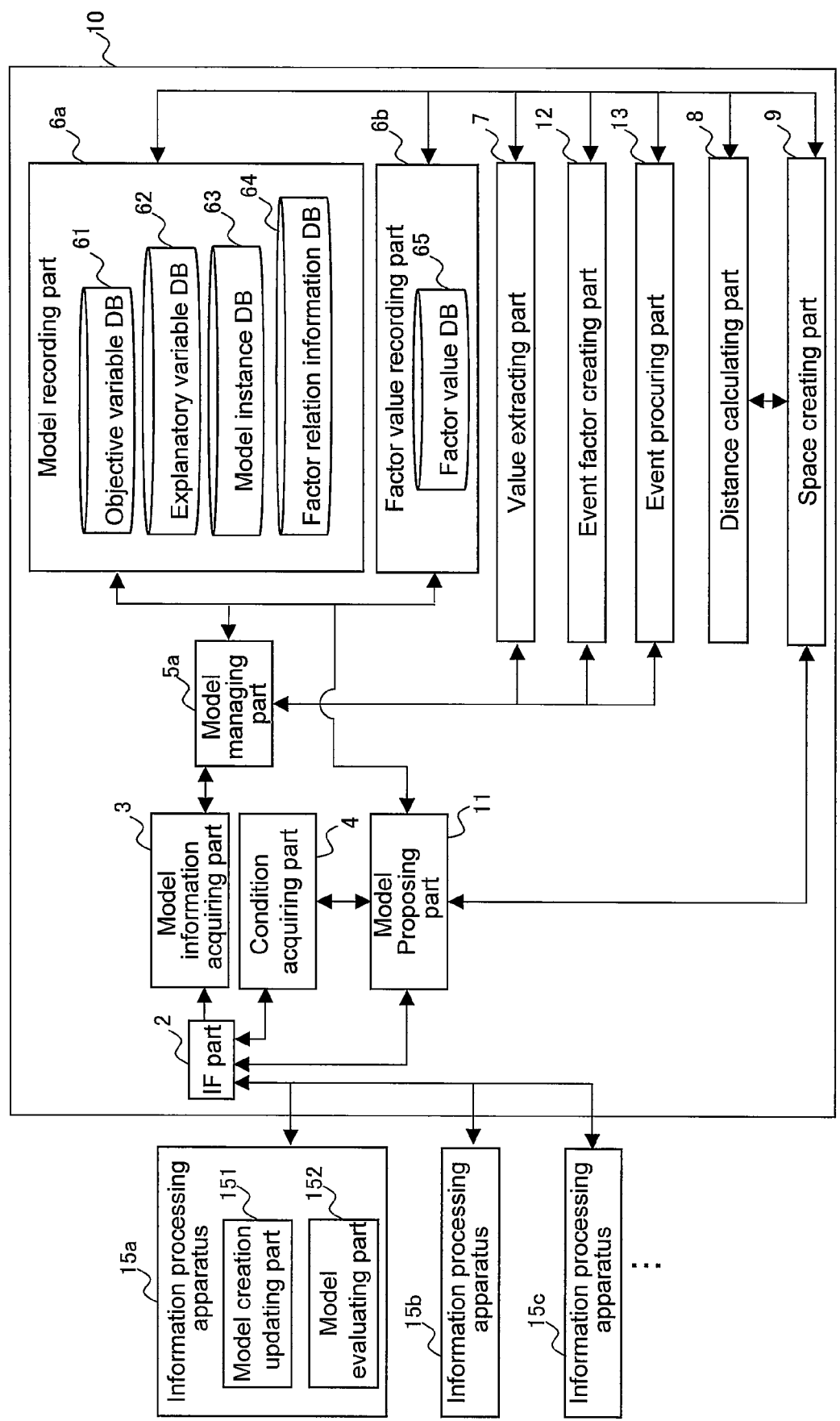
FIG. 38 is a functional block diagram showing a configuration of a model creation support system in Embodiment 3.

FIG. 38 is a functional block diagram showing a configuration of a model creation support system according to Embodiment 3. A model creation support system 10 shown in FIG. 38 has a configuration in which an event factor creating part 12 and a factor procuring part 13 are added to the model creation support system 1 shown in FIG. 1. In the model recording part 6a, a factor relation information DB is further recorded. In the factor relation information DB, for example, event information indicating the relationship between the characteristics of an event and the factors is recorded.

FIG. 39 is a diagram showing an example of data contents to be recorded as event information. A record E1 shown in FIG. 39 is data in which data indicating an event name, a period, a place, an institution, and a field are recorded so as to be associated with an event ID. The contents of the event information are not limited to the example shown in FIG. 39.

(Description of the Event Factor Creating Part 12)

In the present embodiment, the model managing part 5a instructs the event factor creating part 12 to create an event factor. For example, in the case of receiving a request for creating a replacement model from the information processing apparatuses 15a, 15b, or 15c, and further receiving a request for creating an event factor, the model managing part 5a provides an instruction to the event factor creating part 12. Furthermore, the model managing part 5a may provide, for example, an instruction of creating an event factor periodically as nighttime batch processing.

The event factor creating part 12 compares the information on a particular factor recorded in the explanatory variable DB 62 with event information recorded in the factor relation information DB in accordance with the instruction from the model managing part 5a, thereby determining whether or not there is an event corresponding to the particular factor. If there is an event corresponding to the factor, the event factor creating part 12 creates data indicating day factors (hereinafter, referred to as event factors) of the event. At this time, the data recorded on the explanatory variable DB 62 and the factor value DB 65 is used for creating event factors. Furthermore, the created data is recorded in the explanatory variable DB 62.

Figure 40:
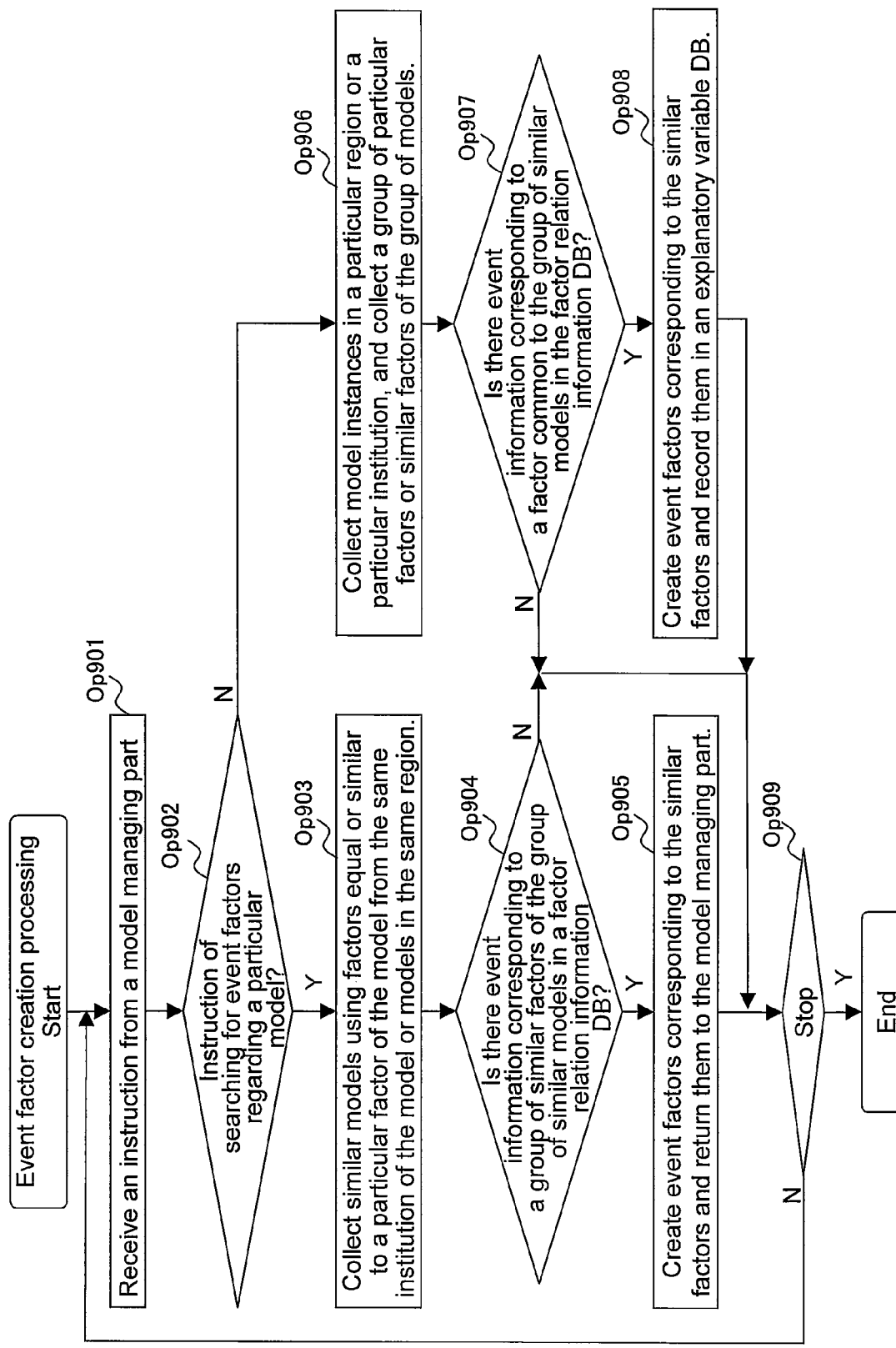
FIG. 40 is a flowchart illustrating an operation example of an event factor creating part.

FIG. 40 is a flowchart illustrating an operation example of the event factor creating part 12. In the example shown in FIG. 40, when receiving an instruction from the model managing part 5 (Op901), the event factor creating part 12 determines whether or not the instruction is for searching for an event factor corresponding to a particular factor included in a particular model (Op902). For example, in the case where the instruction from the model managing part 5 contains data indicating a particular model and factor, the event factor creating part 12 can determine that the instruction is for searching for an event factor corresponding to the particular factor.

For example, in the case of receiving a request for searching for an event factor corresponding to a particular model and factor from the model proposing part 11, the model managing part 5 can instruct the event factor creating part 12 to search for and create an event factor corresponding to the particular event and factor. On the other hand, for example, in the case where the model managing part 5 instructs the even factor creating part 12 to create an event factor as nighttime batch processing, data indicating the particular model and factor is not contained in the instruction.

In the case of Yes (Y) in Op902, the event factor creating part 12 collects a group of similar models having factors similar to those of the particular model from the model instance DB 63 (Op903). At this time, the event factor creating part 12 extracts a model having factors (similar factors) similar to the particular factor among models having the same category (region) or category (institution) of a target phenomenon of the particular model. For example, the distance between factor values of two factors is calculated by the processing in the distance calculating part 8 shown in FIG. 23, and the determination of the comparison between the two factors can be determined based on the distance.

The event factor creating part 12 determines whether or not event information corresponding to similar factors of the extracted group of similar models is recorded as event information of the factor relation information DB (Op904). The event factor creating part 12 compares, for example, a period specified by the similar factors with an event period. Specifically, in the case where the similar factors are day factors, a day specified by the similar factors is compared with a period of each event recorded in event information. When the degree to which the day specified by the similar factors is matched with the period of each event satisfies predetermined conditions, the event factor creating part 12 can determine that the event corresponds to the similar factors.

If there is an event corresponding to the similar factors, the event factor creating part 12 creates data on the event factor representing the event (Op905). The data on the event factor is, for example, represented by a matrix of one column and 365 rows with each day in one year from January 1 to December 31 as an element, as represented by the following Expression (18).

$$X_e = \begin{pmatrix} 1/1 \\ \vdots \\ 10/6 \\ 10/7 \\ 10/8 \\ 10/9 \\ 10/10 \\ \vdots \\ 12/31 \end{pmatrix} \begin{pmatrix} 0 \\ \vdots \\ 0 \\ 1 \\ 1 \\ 1 \\ 0 \\ \vdots \\ 0 \end{pmatrix} \quad (18)$$

The data on the event factor is, for example, sent to the model managing part 5. The model managing part 5 records information such as the data on the event factor, an event name, and an application range in the explanatory variable DB 62 so that they are associated with the explanatory variable ID.

At this time, the event factor creating part 12 may create factor value data on the event factor. There is a high possibility that the event factor created in Op905 has a factor value similar to that of the similar factor, so that the event factor creating part 12 can generate factor value data on the event factor, for example, using factor value data on the similar factor. The factor value data on the event factor is recorded in the factor value DB. Consequently, the event factor is also included in the search range of the similar factor space creating part 91. The applicable range of the event factor is limited in most cases. (For example, the influence of a festival in a shrine is limited to the vicinity of cities, towns and villages, and the effect of a sales event in a supermarket is limited to the catchment area thereof. Therefore, the similar factor space creating part 91 may determine whether or not the applicable range of the event factor recorded in the explanatory variable DB 62 includes a model to which the reference factor belongs, in searching for factors. In the case of No(N) in Op902, the event factor creating part 12 determines a particular region and institution to be searched for. Then, the event factor creating part 12 extracts a group of models targeting the phenomenon of the determined region and institution from the model instance DB 63 (Op907). Specifically, the event factor creating part 12 may extract objective variables at which the category (region) and the category (institution) are matched with the determined region and institution from the objective variable DB 61, and extract a record including the extracted objective variables from the model instance DB 63. Consequently, a group of models targeting the phenomenon of the region and institution are extracted.

Herein, as an example, models having a region and an institution in common are extracted; however, the conditions for extracting models are not limited thereto. For example, models having the same kind of region and phenomenon may be extracted.

The event factor creating part 12 determines whether or not event information corresponding to a factor included commonly in the extracted group of models is recorded as event information of the factor relation information DB (Op907). Herein, the processing of specifying the factor included commonly in the extracted group of models can be performed in the same way as in Op642 shown in FIG. 20.

In the case of Yes (Y) in Op907, the event factor creating part 12 creates data on the event factor indicating the event (Op908). The created data on the event factor is recorded in the explanatory variable DB 62. Furthermore, the event factor creating part 12 may also create factor value data on the event factor at this time.

The processings in Op901 to Op908 are repeated unless a stop instruction is provided (as long as N is obtained in Op909). Consequently, every time the model managing part 5 provides an instruction, an event factor is created in accordance with the instruction, and the data is recorded in the explanatory variable DB 62.

(Description of the Factor Procuring Part 13)

The factor procuring part 13 receives the designation of day factors from the model managing part 5*a*, and searches the explanatory variable B for more appropriate modified day species and outputs them as day species (hereinafter, referred to as designated day species) indicated by the designated day factors. For example, the factor procuring part 13 measures the existence criterion on a time coordinate of the designated day species, and searches the explanatory variable DB 62 for more appropriate day species as the designated day species based on the existence criterion. The existence criterion on the time coordinate includes, for example, a relative distance indicating the overlapping degree and adjacency between the period indicated by a day species and the period indicated by the designated day species, an appearance frequency in a predetermined period of the period indicated by the designated day species, and the like.

The factor procuring part 13 can calculate the above relative distance, for example, by comparing an element value of the designated day species with an element value of each day species recorded on the element value table of the explanatory variable DB 62. Furthermore, the factor procuring part 13 can calculate the above appearance frequency by calculating the scattering degree of a value "1" in the element values of the designated day species.

Next, an operation example of the factor procuring part 13 will be described. The model proposing part 11, for example, requests the model managing part 5*a* to modify a factors to be replaced, designated by the information processing apparatuses 15*a* to 15*c*, or a factor extracted as a replacement factor by the model proposing part 11. Herein, an operation example of the factor procuring part 13 in the case of receiving a request for modifying a particular day factor from the model proposing part 11 will be described with reference to FIG. 41.

Figure 41:
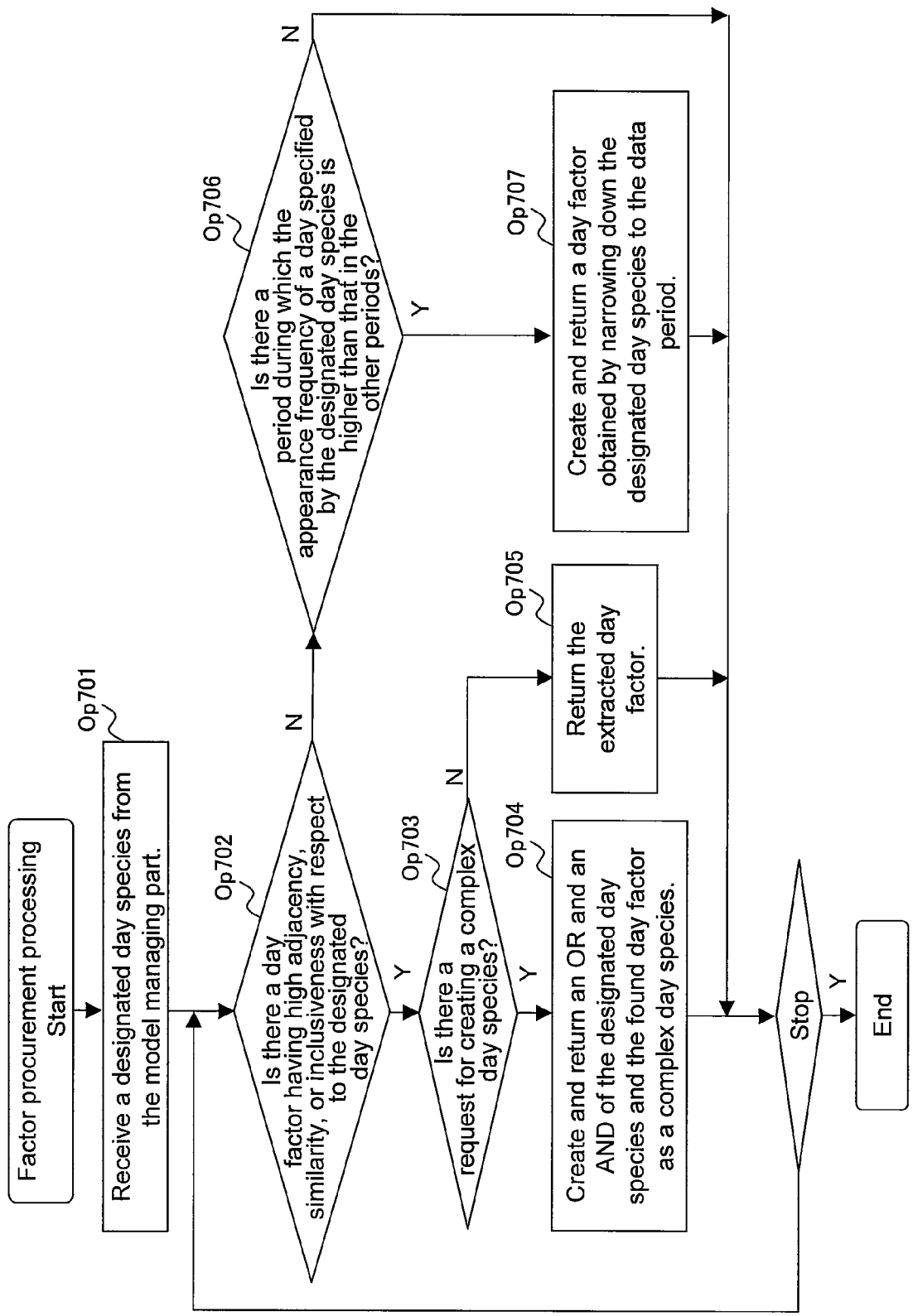
FIG. 41 is a flowchart illustrating an operation example of a factor procuring part.

In the example shown in FIG. 41, first, the factor procuring part 13 receives the designation of a day factor requested to be modified from the model managing part 5*a* (Op701). At this time, the factor procuring part 13 receives, for example, data on each element value of the day species (designated day species) indicated by the day factor, and data indicating the presence/absence of a request for creating a complex day species from the model managing part 5*a*. The factor procuring part 13 may receive the name of the designated day species instead of the data on each element value, and acquire each element value data on the designated day species, referring to the explanatory variable DB 62.

The factor procuring part 13 extracts a day species having high adjacency, similarity, or inclusiveness with respect to the designated day species (Op702). For example, the factor procuring part 13 compares each element value of the designated factor with the element value (see a record C100 in FIG. 4) of each day factor recorded in the explanatory variable DB 62, thereby determining the presence/absence of adjacency, similarity, and inclusiveness. Herein, referring to FIG. 42, a specific example of the determination processing will be described. The following determination processing is an example and is not limited thereto.

FIG. 42 shows an example of element values of day factors "GW (golden week)", "late spring", "beginning of summer" and "late spring to beginning of summer". The example shown in FIG. 42 is an example in 2004, and in the element values of "GW", "1" is set from April 29 to May 5, and "0" is set in the remaining days. In the element values of "late spring", "1" is set from April 14 to April 26. In the element values of "beginning of summer", "1" is set from April 30 to May 12. In the element values of "late spring to beginning of spring", "1" is set from April 14 to May 12. Day species representing 24 seasonal datum points (season sections in the lunar calendar) such as "late spring" and "beginning of summer" can be defined as a period of 6 days (13 days in total) before and after the applicable day (April 20 in the case of "late spring" and May 6 in the case of "beginning of summer") as in the example shown in FIG. 42.

The factor procuring part 13 specifies a period in which an element value "1" continues, with reference to element values of each day factor. The factor procuring part 13 compares the period in which the element value "1" continues between the day factors and determines the presence/absence of adjacency, similarity, and inclusiveness. For example, a period in which "1" continues in the "GW" and a period in which "1" continues in the "late spring" shown in FIG. 42 are adjacent to each other with two days (April 27 and April 28) interposed therebetween. In this case, the factor procuring part 13 can determine that there is adjacency between the "GW" and the "late spring". Thus, the adjacency can be determined based on the number of days interposed between the periods in which "1" continues.

Furthermore, the period in which "1" continues in the "GW" and the period in which "1" continues in the "late spring" overlap each other for 6 days (April 30 to May 5). In this case, the factor procuring part 13 can determine that there is similarity between the "GW" and the "beginning of summer". Thus, the similarity can be determined based on the number of overlapping days between the periods in which "1" continues.

Furthermore, the period (April 29 to May 5) in which "1" continues in the "GW" is completely included in the period (April 14 to May 12) in which "1" continues in the "later spring to beginning of summer". In this case, the factor procuring part 13 can determine that the "GW" is included in the "late spring to beginning of summer" (there is inclusiveness). Thus, the presence/absence of the inclusiveness may be determined based on whether or not the period in which "1" continues in one day species completely includes the period in which "1" continues in the other day species.

In the case where Yes(Y) is determined in Op702, it is determined whether or not there is a request for creating a complex day species based on the data received in Op701 (Op703). In the case where Yes(Y) is determined in Op703, the factor procuring part 13 creates day species data obtained by an OR and an AND of the extracted day species and the designated day species as a complex day factor and returns the day species data to the model managing part 5*a*. Furthermore, the factor procuring part 13 can record the created complex day factor in the explanatory variable DB 62.

Furthermore, the factor procuring part 13 may create factor value data on the created complex day factor and record the factor value data in the factor value DB 65. There is a high possibility that the complex day factor created in Op704 has a factor value similar to that of the designated day factor, so that the factor procuring part 13 can generate factor value data on the complex day factor, for example, using the factor value data on the designated day factor. Thus, the complex day factor created in Op704 can also be included in the search range of the similar factor space creating part 91.

In the case where No(N) is determined in Op703, the factor procuring part 13 creates day species data on the extracted day species in Op702, and returns the day species data to the model managing part 51 as a new day factor. The new day factor may also be recorded in the explanatory variable DB 62 in the same way as in the complex day factor. Furthermore, the factor procuring part 13 may generate factor value data on the new day factor and record the factor value data in the factor value DB 65.

On the other hand, in the case where No(N) is determined in Op702, i.e., in the case where day species having high adjacency, similarity, or inclusiveness with respect to the designated day species is not extracted, the factor procuring part 13 determines whether or not there is a period (uneven distribution period) in which the appearance frequency of a day specified by the designated day species is higher than that in the other periods (Op706). For example, processing in the case where the designated day species is "weekend and luckiest day" will be described. The following Table 5 shows days which have an element value "1" in one year of 2004.

TABLE 5

| |
|---|
| January 4 |
| February 1 |
| February 7 |
| February 29 |
| March 6 |
| April 11 |
| April 17 |
| May 9 |
| May 15 |
| June 13 |
| August 15 |
| October 16 |
| November 13 |
| December 12 |
| December 18 |

In the example shown in Table 5, there are 10 days in the first half (January to June) in 2004 during which the element value of "weekend and luckiest day" is "1", and there are 5 days in the second half (August to December). Thus, the days during which the element value of "weekend and luckiest day" is "1" are concentrated in the first half. In this case, the factor procuring part 13 detects the first half in 2004 as an uneven distribution period.

In the case where an uneven distribution period of the designated day species is extracted in Op706, the factor procuring part 13 creates a day factor in which the designated day species are narrowed down to the uneven distribution period and returns the day factor to the model managing part 5a (Op707). In the case of the above example "weekend and luckiest day" a day factor narrowed down to the first half of a year is created. The element value of the day factor can be set to be an AND of the element value of the "first half of a year" and the element value of the "weekend and luckiest day" ("first half of a year" AND "weekend and luckiest day"). The day factor created in Op707 may also be recorded in the explanatory variable DB 62 in the same way as in the complex day factor. Furthermore, the factor procuring part 13 may generate factor value data on the created day factor and record the factor value data in the factor value DB 65.

As described above, as a result of the processing of the factor procuring part 13 shown in FIG. 41, the appropriate day species that is to replace the designated day species is extracted automatically. Thus, the processing of extracting appropriate factors, which used to depend upon the experiment and hunch of an expertise conventionally, can be performed automatically. The model managing part 5a returns the data indicating the day factor that is to replace the designated day species to the model proposing part 11. The model proposing part 11 can send, for example, data indicating a day factor to the information processing apparatuses 15a to 15c as one of replacement factor candidates of an existing model. The processing of the factor procuring part 13 may be performed when the model proposing part 11 extracts replacement factors of the factor of the existing model or may be performed as nighttime batch processing, as described in the above example.

In the present embodiment, the processing of creating a day factor has been described. However, the factor created by the factor procuring part 13 is not limited to a day factor. A day species is an example of a time species, and a time factor other than the day species may be created. More specifically, the time species includes, for example, a time zone represented on an hour or minute basis, and the name of a period represented on the basis of a week, month, year, or other units, in addition to the day species. Examples of the name of a time zone expressed on an hour or minute basis include "midnight", "early morning", "lunch time", "0 minute per hour", and "commuting rush-hour". Furthermore, the factors created by the factor procuring part 13 may be those of an explanatory variable represented by a matrix or a vector with 0 or 1 as an element, without being limited a time species. For example, the characteristics factors indicating the characteristics characterized by a place, an event, or the like can also be targeted for creation by the factor procuring part 13.

The embodiments of the present invention have been described. The model creation support system of the above embodiments accumulates factors of a model used in an information processing apparatuses, extracts an appropriate factor fitted for a model requested by the information processing apparatus from the accumulated factors, and outputs the factors to the information processing apparatus as support data. Therefore, the model creation support system can accumulate information on the factors of the model and utilize the information for enhancing the fitting degree of the model.

As in the above embodiments, the model to be a target in the present invention is not necessarily expressed by a linear regression equation as in the above embodiments. For example, a model represented by a linear regression equation utilizing a logistic function is also included in a model to be a target in the present invention.

The present invention is applicable as a model creation support system enabling the information on factors of a model to be used for predicting various phenomena using a computer to be shared and utilized.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A model creation support system capable of accessing an information processing apparatus that predicts or analyzes a phenomenon and a factor contributing to the phenomenon to be a target for prediction or analysis, using a model that is data indicating a regression equation, the system comprising:

a model managing part that acquires, from the information processing apparatus, an identifier of the model, the regression equation of the model in which the phenomenon is represented by an objective variable and the factor is represented by an explanatory variable, phenomenon data that includes an objective variable ID identifying the objective variable of the regression equation and information indicating the phenomenon represented by the objective variable, factor data that includes an explanatory variable ID identifying the explanatory variable and information indicating the factor represented by the explanatory variable of the regression equation, and evaluation data containing a fitting degree of the model and accumulates them in a model recording part accessible from the model creation support system;

a factor value extracting part that extracts, by referring to the evaluation data on at least one model in the data accumulated in the model recording part, an objective variable ID and an explanatory variable ID identifying an explanatory variable representing a factor that contributes to enhancement of the fitting degree of the at least one model and records factor value data that associates the phenomenon data of the extracted objective variable ID, the factor data of the extracted explanatory variable ID and data indicating a degree of the contribution in a factor value recording part accessible from the model creation support system;

a condition acquiring part that receives a request for supporting model creation from the information processing apparatus, and further receives an input of model condition data containing data indicating a phenomenon to be a target of a requested model; and a model proposing part that matches the data indicating the phenomenon to be a target of the requested model contained in the model condition data with the phenomenon data associated by the factor value data in the factor value recording part, thereby extracting a recommended factor capable of contributing to the enhancement of a fitting degree of the requested model and outputting support data containing data indicating the extracted recommended factor to the information processing apparatus.

2. The model creation support system according to claim 1, wherein the factor value extracting part includes:

an inner-model factor value extracting part that detects a transition of the factor data specifying the explanatory variable indicating the factor included in the regression equation of the model regarding at least one phenomenon and a transition of the evaluation data from the data accumulated in the model recording part, thereby generating factor value data indicating a degree to which a factor indicated by an explanatory variable added or deleted with respect to the regression equation of the model contributes to the enhancement of a fitting degree of the model and records the factor value data in the factor value recording part; and an inter-model factor value extracting part that refers to factor data specifying explanatory variables indicating factors included in regression equations of a plurality of models and evaluation data in the data accumulated in the model recording part, thereby generating factor value data indicating a degree to which the factors contribute to enhancement of a fitting degree with respect to the plurality of models and recording the factor value data in the factor value recording part.

3. The model creation support system according to claim 2, wherein the inner-model factor value extracting part that, regarding the factor-indicated by the explanatory variable added or deleted with respect to the regression equation of the model in the detected transition of the factor data, detects a change in a fitting degree of the model before and after the addition or the deletion from the evaluation data accumulated in the model recording part and generates factor value data on the factor indicated by the explanatory variable based on a degree of the change.

4. The model creation support system according to claim 2, wherein the model managing part further acquires application period data indicating an application period of the model and significance data indicating significance of each factor indicated by each explanatory variable included in the regression equation of the model and accumulates the application period data and the significance data in the model recording part, and the inner-model factor value extracting part detects a change in the application period of the model based on the application period data accumulated in the model recording part regarding at least one phenomenon, extracts a factor that contributes to enhancement of a fitting degree of the model when the application period changes based on a change in the fitting degree of the model and a change in the significance data on each factor in the model before and after the change in the application period, and generates factor value data indicating a degree to which the extracted factor contributes to the model.

5. The model creation support system according to claim 2, wherein the model managing part further acquires significance data indicating significance of each factor indicated by each explanatory variable included in the regression equation of the model and accumulates the significance data in the model recording part, and the inter-model factor value extracting part refers to factor data indicating a group of factors indicated by a group of explanatory variables included in each regression equation of a plurality of models targeting a particular phenomenon and significance data indicating each of the group of factors in the data accumulated in the model recording part, thereby generating factor value data indicating a contribution degree of factors that influence the plurality of models commonly.

6. The model creation support system according to claim 2, wherein the model managing part further acquires application period data indicating an application period of the model and significance data indicating significance of the factor indicated by the explanatory variable in the regression equation of the model and accumulates the application period data and the significance data in the model recording part, and the inter-model factor value extracting part refers to factor data indicating a group of factors indicated by a group of explanatory variables in each regression equation of a plurality of models having different application periods, which target the same phenomenon, and significance data indicating each of the group of factors in the data accumulated in the model recording part, thereby generating factor value data indicating a contribution degree of the factors with respect to the plurality of models having the different application periods.

7. The model creation support system according to claim 1, wherein the condition acquiring part acquires a regression equation of an existing model that is being used or is to be used in the information processing apparatus and information specifying a target phenomenon of the existing model from the information processing apparatus as the model condition data, and the model proposing part acquires factor value data associated with phenomenon data specifying a objective variable indicating a phenomenon that is the same as or similar to the target phenomenon of the existing model among the factors indicated by the factor value data recorded in the factor value recording part, thereby extracting a recommended factor contributing to enhancement of a fitting degree of the existing model, creating a model of a regression equation including an explanatory variable indicating the extracted recommended factor, including the created model in the support data as a replacement model of the existing model, and outputting the created model to the information processing apparatus.

8. The model creation support system according to claim 7, wherein the model proposing part compares factor value data on a reference factor with factor value data on a plurality of factors other than the reference factor, using a factor indicated by an explanatory variable included in the regression equation of the existing model as the reference factor, thereby calculating a similarity of a degree of contribution to the enhancement of a fitting degree between the reference factor and each of the other plurality of factors, and extracting a recommended factor capable of contributing to the enhancement of a fitting degree of the existing model to create the replacement model, based on the similarity.

9. The model creation support system according to claim 1, wherein the condition acquiring part acquires a regression equation of an existing model that is being used or is to be used in the information processing apparatus and information specifying a target phenomenon of the existing model from the information processing apparatus as the model condition data, and
the model proposing part extracts a plurality of replacement model candidates to be candidates of the replacement model, calculates a similarity between the replacement model candidates and the existing model, and extracts the replacement model candidate having a relatively high similarity as a replacement model.

10. The model creation support system according claim 1, wherein the model managing part accumulates, regarding a model represented by a regression equation in which an explanatory variable is a characteristics factor value representing characteristics of a factor by a vector or a matrix using 0 or 1 as an element, an identifier of a model, phenomenon data specifying a objective variable indicating a target phenomenon of the model, a regression equation of the model, factor data specifying a explanatory variable indicating a factor included in the regression equation, and evaluation data containing a fitting degree of the model in the model recording part,
the system further comprising:
an event information recording part that records event information indicating characteristics of an event; and
an event factor creating part that matches the event information with the characteristics factor value that is an explanatory variable in the regression equation of the model recorded in the model recording part, generates factor data on an event factor indicating the characteristics of the event based on the characteristics factor value if there is the characteristics factor value corresponding to the event, and records the factor data in the model recording part.

11. The model creation support system according to claim 1, wherein the model managing part accumulates, regarding a model represented by a regression equation in which an explanatory variable is a time factor value representing time characteristics of a factor by a vector or a matrix using 0 or 1 as an element, an identifier of a model, phenomenon data specifying a objective variable indicating a target phenomenon of the model, a regression equation of the model, factor data containing a time factor value of an explanatory variable included in the regression equation, and evaluation data containing a fitting degree of the model in the model recording part,
the system further comprising a factor procuring part that acquires designated factor data indicating a designated factor requested to be modified from the information processing apparatus or the model proposing part, matches a time factor value of the designated factor with a time factor value of the factor data in the model recording part, thereby extracting a factor having a predetermined relationship with the designated factor from the model recording part and recording factor data represented by a time factor value of the extracted factor or a complex time factor value obtained by an OR or an AND of the time factor value of the extracted factor and a time factor of the designated factor in the model recording part as factor data on a modified factor of the designated factor.

12. A recording medium storing a model creation support program causing a computer to perform processing, which is capable of accessing an information processing apparatus that predicts or analyzes a phenomenon and a factor contributing to the phenomenon to be a target for prediction or analysis, using a model that is data indicating a regression equation,
the model creation support program causing the computer to perform the following:
model managing processing of acquiring, from the information processing apparatus, an identifier of the model, the regression equation of the model in which the phenomenon is represented by an objective variable and the factor is represented by an explanatory variable, phenomenon data that includes an objective variable ID identifying the objective variable of the regression equation and information indicating the phenomenon represented by the objective variable, factor data that includes an explanatory variable ID identifying the explanatory variable and information indicating the factor represented by the explanatory variable of the regression equation, and evaluation data containing a fitting degree of the model, and accumulating them in a model recording part accessible from the computer;
factor value extracting processing of referring to the evaluation data on at least one model in the data accumulated in the model recording part, thereby extracting an objective variable ID and an explanatory variable ID identifying an explanatory variable representing a factor that contributes to enhancement of the fitting degree of the at least one model and recording the factor value data that associates the phenomenon data of the extracted objective variable ID, the factor data of the extracted explanatory variable ID and data indicating a degree of the contribution in a factor value recording part accessible from the computer;
condition acquiring processing of receiving a request for supporting model creation from the information processing apparatus, and further receiving an input of model condition data containing data indicating a phenomenon to be a target of a requested model; and
model proposing processing that matches the data indicating the phenomenon to be a target of the requested model contained in the model condition data with the phenomenon data associated by the factor value data in the factor value recording part, thereby extracting a recommended factor capable of contributing to the enhancement of a fitting degree of the requested model and outputting support data containing data indicating the extracted recommended factor to the information processing apparatus.

13. A model creation support method performed by a computer capable of accessing an information processing apparatus that predicts or analyzes a phenomenon and a factor contributing to the phenomenon to be a target for prediction or analysis, using a model that is data indicating a regression equation, the method comprising:

acquiring, from the information processing apparatus, an identifier of the model, the regression equation of the model in which the phenomenon is represented by an objective variable and the factor is represented by an explanatory variable, phenomenon data that includes an objective variable ID identifying the objective variable of the regression equation and information indicating the phenomenon represented by the objective variable, factor data that includes an explanatory variable ID identifying the explanatory variable and information indicating the factor represented by the explanatory variable of the regression equation, and evaluation data containing a fitting degree of the model, and accumulating them in a model recording part accessible from the computer;

referring to the evaluation data on at lease one model in the data accumulated in the model recording part, thereby extracting an objective variable ID and an explanatory variable ID identifying an explanatory variable representing a factor that contributes to enhancement of the fitting degree of the at least one model and recording the factor value data that associates the phenomenon data of the extracted objective variable ID, the factor data of the extracted explanatory variable ID and data indicating a degree of the contribution in a factor value recording part accessible from the computer;

receiving a request for supporting model creation from the information processing apparatus, and further receiving an input of model condition data containing data indicating a phenomenon to be a target of a requested model; and matching the data indicating the phenomenon to be a target of the requested model indicated by the model condition data with the phenomenon data associated by the factor value data in the factor value recording part, thereby extracting a recommended factor capable of contributing to the enhancement of a fitting degree of the requested model and outputting support data containing data indicating the extracted recommended factor to the information processing apparatus.

* * * * *